United States Patent
Yamamoto

(10) Patent No.: US 12,488,489 B2
(45) Date of Patent: Dec. 2, 2025

(54) DATA-PROCESSING METHOD, DATA-PROCESSING DEVICE, AND RECORDING MEDIUM

(71) Applicant: OLYMPUS CORPORATION, Tokyo (JP)

(72) Inventor: Naoki Yamamoto, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 393 days.

(21) Appl. No.: 17/709,982

(22) Filed: Mar. 31, 2022

(65) Prior Publication Data

US 2022/0319038 A1 Oct. 6, 2022

(30) Foreign Application Priority Data

Apr. 5, 2021 (JP) ................................. 2021-064225

(51) Int. Cl.
*G06T 7/70* (2017.01)
*G06T 7/00* (2017.01)
*H04N 23/50* (2023.01)

(52) U.S. Cl.
CPC .............. *G06T 7/70* (2017.01); *G06T 7/0004* (2013.01); *H04N 23/555* (2023.01);
(Continued)

(58) Field of Classification Search
CPC ... G06T 7/0004; G06T 70/73; G06T 2200/24; G06T 2207/10016; G06T 2207/10068;
(Continued)

(56) References Cited

U.S. PATENT DOCUMENTS 9,041,794 B1 * 5/2015 Olsson ................... H04N 7/185
348/374
2007/0195712 A1 * 8/2007 Thayer ................ G06F 16/2272
370/254
(Continued)

FOREIGN PATENT DOCUMENTS

CN 110873717 A 3/2020
JP 5451718 B2 3/2014
(Continued)

OTHER PUBLICATIONS

Japanese Office Action dated Feb. 18, 2025 received in 2021-064225.
(Continued)

*Primary Examiner* — Katrina R Fujita
(74) *Attorney, Agent, or Firm* — Scully, Scott, Murphy & Presser, P.C.

(57) ABSTRACT

A data-processing method includes an information display step, a position selection step, and a processing step. A processor displays, on a display, position information indicating a positional relationship between two or more positions in a three-dimensional space including an object on the basis of position data indicating the two or more positions in the information display step. The processor selects at least one position included in the two or more positions in the position selection step. The processor processes meta-data associated with a still image in the processing step. The still image is associated with the at least one selected position.

24 Claims, 38 Drawing Sheets

(52) U.S. Cl.
CPC .............................. *G06T 2200/24* (2013.01);
*G06T 2207/10016* (2013.01); *G06T 2207/10068* (2013.01); *G06T 2207/30164* (2013.01)

(58) Field of Classification Search
CPC ........... G06T 2207/30108; G06T 2207/30164; H04N 23/555
See application file for complete search history.

(56) References Cited

U.S. PATENT DOCUMENTS

| | | | |
|---|---|---|---|
| 2012/0221569 A1* | 8/2012 | Sato | G16Z 99/00 707/736 |
| 2013/0345502 A1* | 12/2013 | Mitsunaga | A61B 1/0002 600/109 |
| 2014/0188435 A1* | 7/2014 | Coombs | H04N 23/661 702/188 |
| 2014/0205150 A1* | 7/2014 | Ogawa | G01B 11/14 382/106 |
| 2015/0029500 A1* | 1/2015 | Ward | B25J 9/1635 356/241.6 |
| 2015/0287236 A1* | 10/2015 | Winne | G06T 15/08 382/128 |
| 2016/0245718 A1* | 8/2016 | Chan | G01M 3/04 |
| 2017/0337705 A1* | 11/2017 | Bendall | G01B 11/24 |
| 2018/0103246 A1* | 4/2018 | Yamamoto | A61B 1/04 |
| 2018/0342074 A1* | 11/2018 | Sakamoto | G06T 5/70 |
| 2019/0053861 A1 | 2/2019 | Lwin et al. | |
| 2019/0281183 A1* | 9/2019 | Toyoda | H04N 7/181 |
| 2019/0306453 A1* | 10/2019 | Tatsuta | G10L 25/57 |
| 2019/0332952 A1* | 10/2019 | Nonaka | G06N 5/04 |
| 2019/0340805 A1* | 11/2019 | Xiong | G06T 19/00 |
| 2020/0173602 A1* | 6/2020 | Olsson | G06F 11/0709 |
| 2020/0250823 A1* | 8/2020 | Yamamoto | G06T 7/62 |
| 2020/0301126 A1 | 9/2020 | Sakamoto | |
| 2020/0397232 A1* | 12/2020 | Ulmschneider | H04N 23/54 |
| 2021/0374990 A1* | 12/2021 | Miyashita | G06T 7/62 |
| 2022/0051472 A1* | 2/2022 | Takahashi | G06T 15/205 |
| 2022/0083589 A1* | 3/2022 | Ogata | G06F 16/5866 |

FOREIGN PATENT DOCUMENTS

| | | |
|---|---|---|
| JP | 2017086274 A | 5/2017 |
| JP | 2017086685 A | 5/2017 |
| JP | 2018530379 A | 10/2018 |
| JP | 2019-200463 A | 11/2019 |
| JP | 2020034743 A | 3/2020 |
| JP | 2020129836 A | 8/2020 |
| JP | 2020154234 A | 9/2020 |
| JP | 2021040987 A | 3/2021 |
| WO | 2016208664 A1 | 12/2016 |

OTHER PUBLICATIONS

Japanese Office Action dated Jul. 29, 2025 received in 2021-064225.

* cited by examiner

FIG. 40

| INFORMATION-INPUT WINDOW | | |
|---|---|---|
| INSPECTION TARGET | HEAT EXCHANGE TUBE | IT10 |
| PORTION | 1ST STRAIGHT LINE | IT11 |
| OK or NG | NG | IT12 |
| COMMENTS | CORROSION | IT13 |
| ATTACHMENT OF STILL IMAGE TO REPORT | ○ | IT14 |
| ATTACHMENT OF PREVIOUS DATA | ○ | IT15 |
| ATTACHMENT OF 3D DATA | ○ | IT16 |

W50

DATA-PROCESSING METHOD, DATA-PROCESSING DEVICE, AND RECORDING MEDIUM

BACKGROUND OF THE INVENTION

Field of the Invention

The present invention relates to a data-processing method, a data-processing device, and a recording medium.

Priority is claimed on Japanese Patent Application No. 2021-064225, filed on Apr. 5, 2021, the content of which is incorporated herein by reference.

Description of Related Art

Industrial endoscope devices have been used for observation and inspection of internal damage, corrosion, and the like of boilers, pipes, aircraft engines, and the like. In an inspection using an endoscope, a user records a still image during the inspection in order to record whether an abnormality has occurred or record the degree of an abnormality as proof of the inspection. After the inspection is completed, a report of the inspection is generated. In general, text data are attached to the report along with the still image. The text data indicate a state or the like of an abnormality seen in the recorded still image.

After the inspection is completed, a user organizes the still image and other data. A file of the still image is saved in a folder in a recording medium. For example, the user moves the still image between folders or changes a name of a folder. Alternatively, the user edits text data attached to the report.

Japanese Patent No. 5451718 discloses a technique for associating a still image and a schema diagram with each other. The schema diagram schematically shows an internal structure of a living body. A user utters a voice during an inspection, and voice data are associated with a still image. The voice indicates a name of a portion of the living body. The voice data are used in order to associate the still image and the schema diagram with each other. Text data may be used instead of the voice data. When the schema diagram is displayed and a position on the schema diagram is designated, a still image corresponding to the position is displayed.

Japanese Unexamined Patent Application, First Publication No. 2019-200463 discloses a technique for classifying an image acquired in an inspection. A plurality of folders are set in advance in accordance with a plurality of inspection targets before an inspection. A user designates a folder during the inspection, and the image is recorded in the folder.

SUMMARY OF THE INVENTION

According to an aspect of the present invention, a data-processing method includes an information display step, a position selection step, and a processing step. A processor displays, on a display, position information indicating a positional relationship between two or more positions in a three-dimensional space including an object on the basis of position data indicating the two or more positions in the information display step. The processor selects at least one position included in the two or more positions in the position selection step after the position information is displayed. The processor processes meta-data associated with a still image in the processing step. The still image is included in one or more still images generated by photographing the object and is associated with the at least one selected position.

According to an aspect of the present invention, a data-processing method includes an information display step, a position selection step, and a processing step. A processor displays, on a display, position information indicating a positional relationship between two or more positions in a three-dimensional space including an object on the basis of position data indicating the two or more positions in the information display step. The processor selects at least one position included in the two or more positions in the position selection step. The processor processes meta-data associated with a still image in the processing step. The still image is included in one or more still images generated by photographing the object and is associated with the at least one selected position. The processor displays the at least one selected position on the display in the position display step.

According to an aspect of the present invention, a data-processing device includes a processor. The processor is configured to display, on a display, position information indicating a positional relationship between two or more positions in a three-dimensional space including an object on the basis of position data indicating the two or more positions. The processor is configured to select at least one position included in the two or more positions after the position information is displayed. The processor is configured to process meta-data associated with a still image. The still image is included in one or more still images generated by photographing the object and is associated with the at least one selected position.

According to an aspect of the present invention, a non-transitory computer-readable recording medium saves a program causing a computer to execute an information display step, a position selection step, and a processing step. The computer displays, on a display, position information indicating a positional relationship between two or more positions in a three-dimensional space including an object on the basis of position data indicating the two or more positions in the information display step. The computer selects at least one position included in the two or more positions in the position selection step after the position information is displayed. The computer processes meta-data associated with a still image in the processing step. The still image is included in one or more still images generated by photographing the object and is associated with the at least one selected position.

BRIEF DESCRIPTION OF THE DRAWINGS

FIG. 40 is a diagram showing an example of an information-input window displayed on a display unit in the sixth embodiment of the present invention.

DETAILED DESCRIPTION OF THE INVENTION

Hereinafter, embodiments of the present invention will be described with reference to the drawings.

First Embodiment

Figure 1:
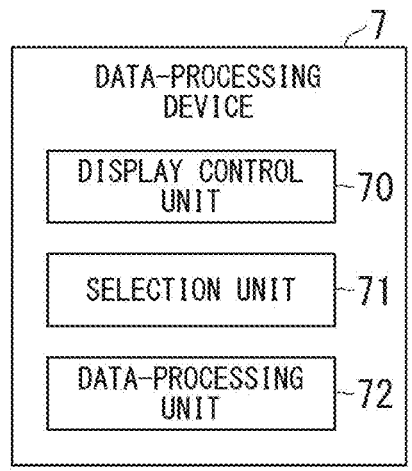
FIG. 1 is a block diagram showing a configuration of a data-processing device according to a first embodiment of the present invention.

FIG. 1 shows a configuration of a data-processing device 7 according to a first embodiment of the present invention. The data-processing device 7 shown in FIG. 1 includes a display control unit 70, a selection unit 71, and a data-processing unit 72.

The display control unit 70 displays position information indicating a positional relationship between two or more positions in a three-dimensional space including an object on a display on the basis of position data (information display step). The position data indicate the two or more positions. The selection unit 71 selects at least one position included in the two or more positions after the position information is displayed (position selection step). The data-processing unit 72 processes meta-data (processing step). The meta-data are associated with a still image. The still image is included in one or more still images generated by photographing the object and is associated with the at least one selected position.

Each unit shown in FIG. 1 may be constituted by at least one of a processor and a logic circuit. For example, the processor is at least one of a central processing unit (CPU), a digital signal processor (DSP), and a graphics-processing unit (GPU). For example, the logic circuit is at least one of an application-specific integrated circuit (ASIC) and a field-programmable gate array (FPGA). Each unit shown in FIG. 1 may include one or a plurality of processors. Each unit shown in FIG. 1 may include one or a plurality of logic circuits.

A computer of the data-processing device 7 may read a program and execute the read program. The program includes commands defining the operations of the display control unit 70, the selection unit 71, and the data-processing unit 72. In other words, the functions of the display control unit 70, the selection unit 71, and the data-processing unit 72 may be realized by software.

The program described above, for example, may be provided by using a "computer-readable storage medium" such as a flash memory. The program may be transmitted from the computer storing the program to the data-processing device 7 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). The functions described above may be realized by a combination of a program that has already been recorded in a computer and a differential program.

For example, the position data indicate three-dimensional coordinates (3D coordinates) corresponding to a position in the three-dimensional space (3D space). The position data may indicate two-dimensional coordinates (2D coordinates) corresponding to a position on a two-dimensional image. The position data may indicate a distance from a reference position in the 3D space. For example, in a case in which the object is a pipe, the position data may indicate a distance from the entrance of the pipe to a position inside the pipe.

The above-described two or more positions are different from each other. The two or more positions are included in a 3D space including the object. The two or more positions may indicate positions on the surface of the object or positions inside the object. In other words, the two or more positions may be included in the object. The two or more positions are not necessarily included in the object. For example, in a case in which the object is a pipe, the two or more positions may indicate positions in a 3D space surrounded by the inner wall of the pipe. The two or more positions may indicate positions of a camera that acquires a still image. The position of the camera is not on the object. The two or more positions may include at least one position on the object and at least one position that is not on the object. The position data may indicate three or more positions in a 3D space including the object.

Each still image is associated with one or more positions in a 3D space including the object. Two or more still images may be associated in common with one position.

Figure 2:
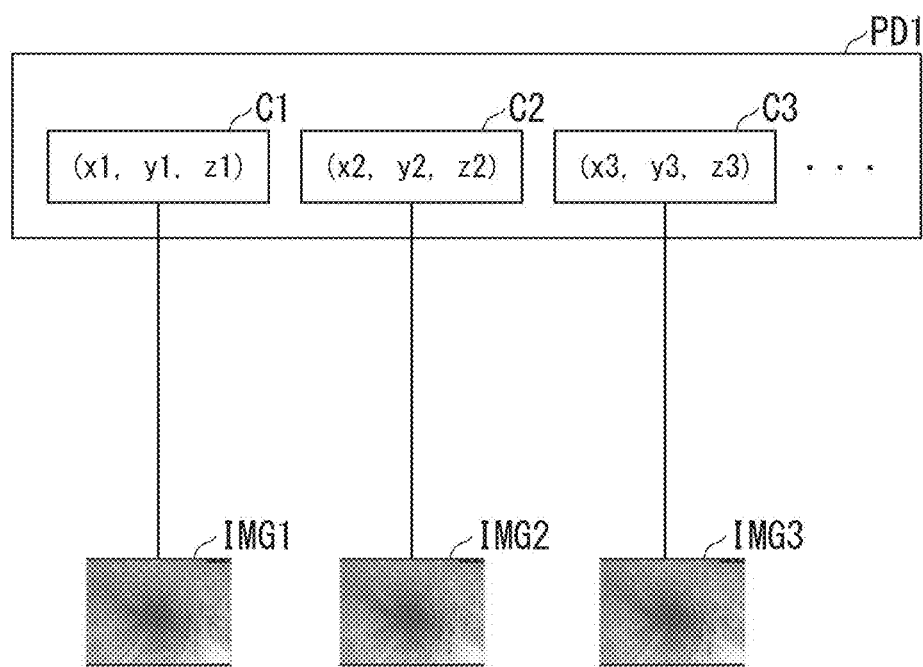
FIG. 2 is a diagram showing an example of position data in the first embodiment of the present invention.

FIG. 2 shows an example of the position data. Position data PD1 shown in FIG. 2 include coordinate data C1, coordinate data C2, and coordinate data C3. Each piece of the coordinate data indicates a position in a 3D space including an object. Each piece of the coordinate data indicates 3D coordinates including an X-coordinate, a Y-coordinate, and a Z-coordinate.

The camera photographs the object and acquires a still image IMG1, a still image IMG2, and a still image IMG3. Each still image is associated with one or more pieces of coordinate data. The still image IMG1 is associated with the coordinate data C1. The still image IMG2 is associated with the coordinate data C2. The still image IMG3 is associated with the coordinate data C3.

The data-processing device 7 may include a recording medium that stores the position data and the one or more still images. Alternatively, the recording medium may be connected to the data-processing device 7. The position data may be stored on a first recording medium, and the one or more still images may be stored on a second recording medium different from the first recording medium. The position data may be stored on the first recording medium and the second recording medium. The one or more still images may be stored on the first recording medium and the second recording medium.

Figure 3:
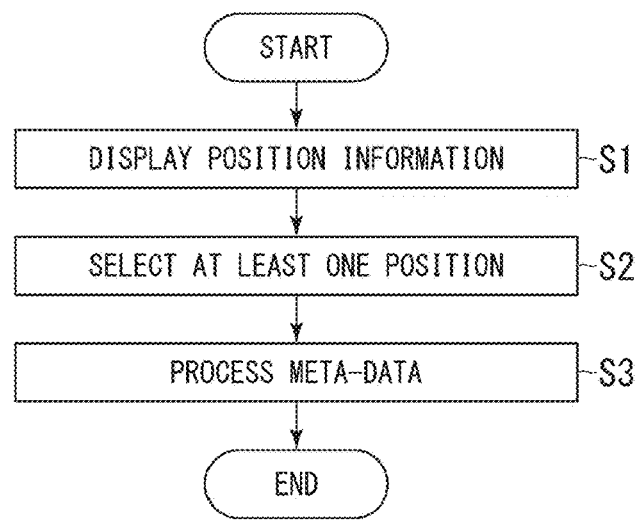
FIG. 3 is a flow chart showing a procedure of data processing in the first embodiment of the present invention.

Data processing in the first embodiment will be described by using FIG. 3. FIG. 3 shows a procedure of the data processing.

The display control unit 70 displays position information indicating a positional relationship between two or more positions in a 3D space including an object on a display on the basis of the position data (Step S1). Step S1 corresponds to the information display step.

In a case in which the position data indicate a distance from a reference position, the display control unit 70 displays two or more distances on the display. The distance corresponds to the position of a subject. For example, a user can check the position of the subject in the object by collating the distance with a design value of the size of the structure in the object. In a case in which the position data indicate 2D coordinates or 3D coordinates, the display control unit 70 displays two or more positions on the display. The user can figure out the position of the subject in the object.

After Step S1, the selection unit 71 selects at least one position (Step S2). Step S2 corresponds to the position selection step.

The data-processing device 7 may include an input device used by a user to input information. Alternatively, the input device may be connected to the data-processing device 7. The selection unit 71 may select a position on the basis of an instruction input into the input device. The instruction indicates a position that should be selected.

The above-described two or more positions may include a first position selected in Step S2 and a second position not selected in Step S2. The display control unit 70 may display the first position and the second position on the display so that a user can distinguish the first position and the second position from each other.

After Step S2, the data-processing unit 72 processes meta-data (Step S3). Step S3 corresponds to the processing step. The meta-data are associated with a still image associated with the position selected in Step S2. When Step S3 is executed, the data processing is completed.

For example, the selection unit 71 selects a position corresponding to the coordinate data C1 shown in FIG. 2. The still image IMG1 is associated with the coordinate data C1. The data-processing unit 72 processes meta-data associated with the still image IMG1.

Meta-data are data indicating the attribute of a still image or are data attached to the still image. For example, the meta-data are included in data of a still image. Alternatively, the meta-data are not included in data of a still image. The meta-data are recorded on a recording medium that stores the position data and the still images. Alternatively, the meta-data are recorded on a different recording medium from that storing the position data and the still images.

For example, the data-processing unit 72 processes meta-data on the basis of a result of an inspection of an object. The data-processing unit 72 may process the meta-data on the basis of an instruction input into an input device. The instruction indicates the content of processing.

The data-processing unit 72 may generate new meta-data, thus processing the meta-data. The data-processing unit 72 may edit already generated meta-data, thus processing the meta-data. The data-processing unit 72 may modify or change data included in meta-data, thus editing the meta-data. The data-processing unit 72 may add new data to meta-data, thus editing the meta-data. The data-processing unit 72 may delete data included in meta-data, thus editing the meta-data. The data-processing unit 72 may delete the entire meta-data, thus processing the meta-data.

A data-processing method according to each aspect of the present invention includes the information display step (Step S1), the position selection step (Step S2), and the processing step (Step S3).

In the first embodiment, the data-processing device 7 displays two or more positions in a 3D space including an object on a display. A still image is associated with at least one position. Since the position associated with the still image is displayed, a user can check a region seen in the still image. The data-processing device 7 processes meta-data associated with a still image of a region checked by the user. Therefore, the data-processing device 7 can improve efficiency of work for processing meta-data.

Second Embodiment

A second embodiment of the present invention will be described. Hereinafter, an example in which the data-processing device is an endoscope device will be described. The data-processing device has only to be a device having the functions shown in the first embodiment and is not limited to an endoscope device. The data-processing device may be built-in equipment mounted on a specific device or a system. The data-processing device may be a personal computer (PC) or a tablet terminal. Some of the functions of the data-processing device may be realized by a cloud environment. A subject is an industrial product.

In the following examples, the data-processing device is an industrial endoscope device. The data-processing device may be a medical endoscope device.

Figure 4:
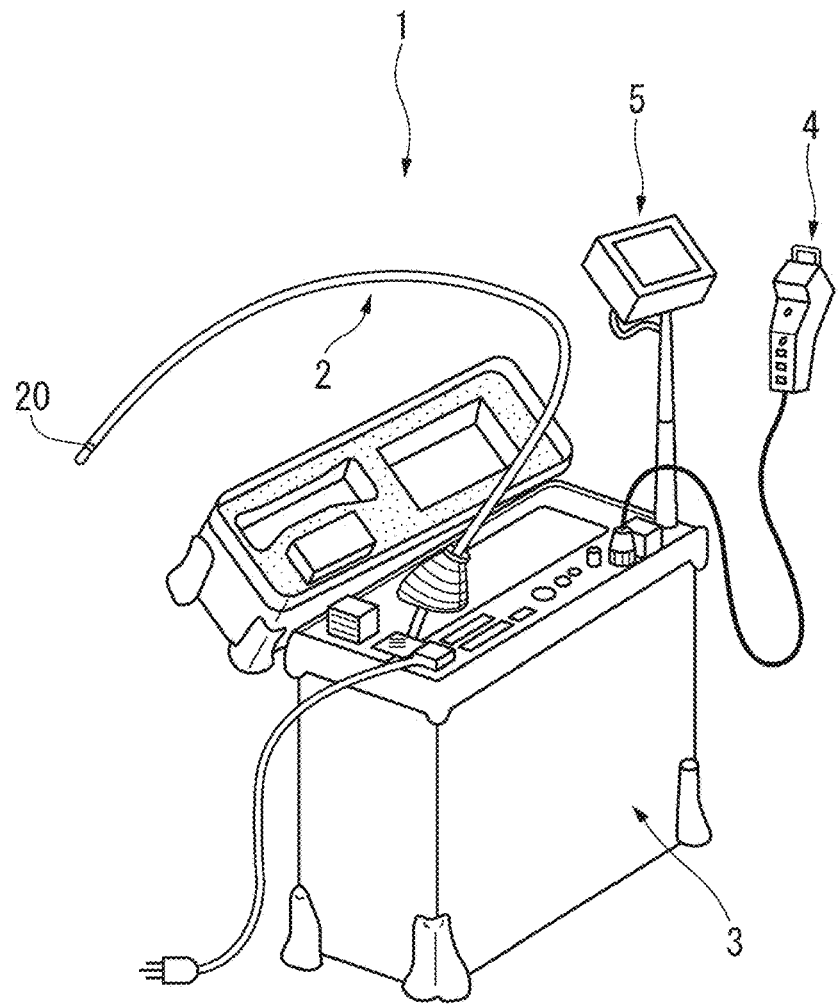
FIG. 4 is a perspective view showing an entire configuration of an endoscope device according to a second embodiment of the present invention.
Figure 5:
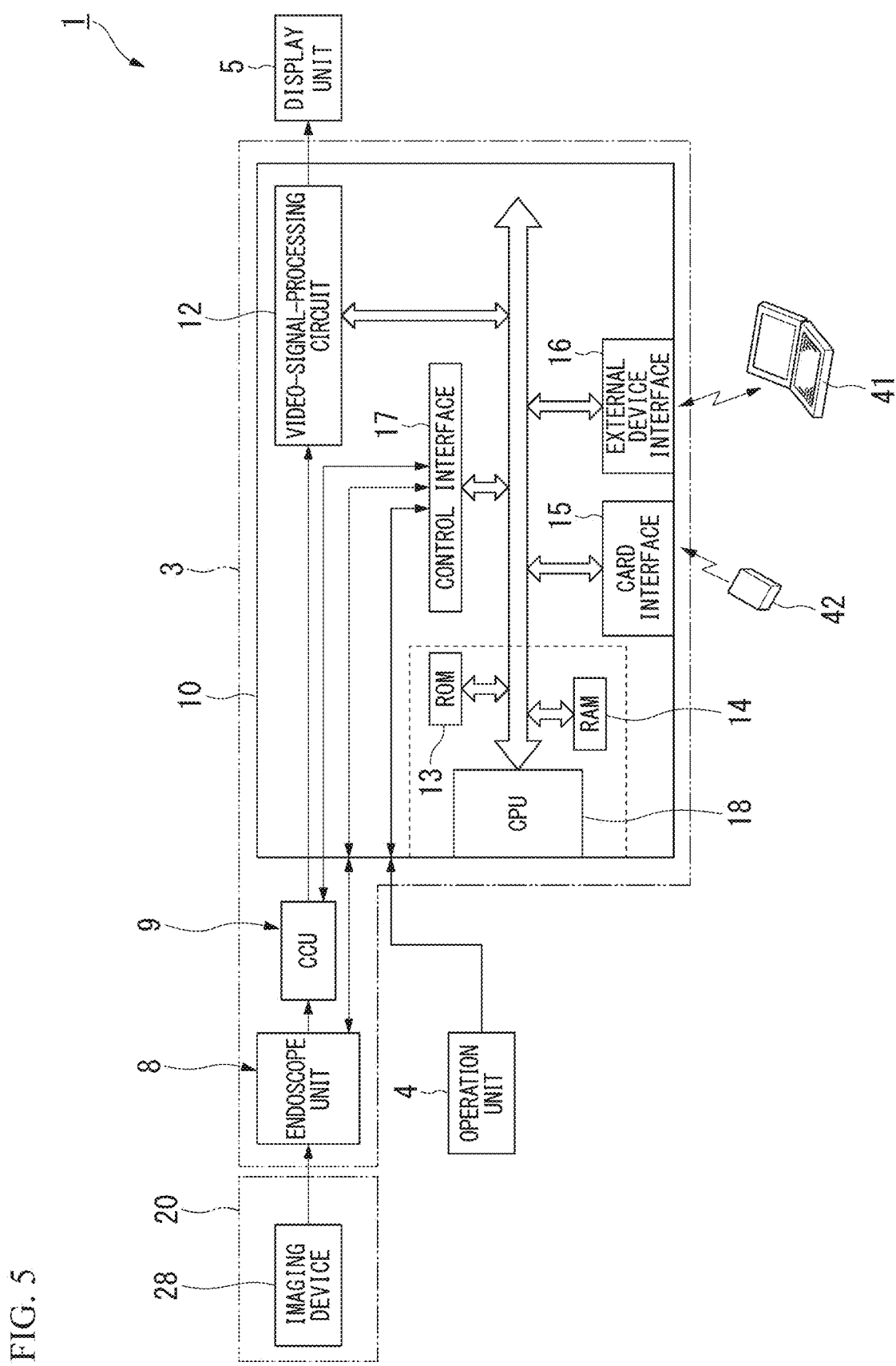
FIG. 5 is a block diagram showing an internal configuration of the endoscope device according to the second embodiment of the present invention.

FIG. 4 shows an external appearance of an endoscope device 1 according to the second embodiment. FIG. 5 shows an internal configuration of the endoscope device 1. The endoscope device 1 images a subject and generates an image. In order to observe various subjects, an inspector can perform replacement of an optical adaptor mounted at the distal end of an insertion unit 2, selection of a built-in video-processing program, and addition of a video-processing program.

The endoscope device 1 shown in FIG. 4 includes the insertion unit 2, a main body unit 3, an operation unit 4, and a display unit 5.

The insertion unit 2 is inserted into the inside of a subject. The insertion unit 2 has a long and thin bendable tube shape from a distal end 20 to a base end portion. The insertion unit 2 images a subject and outputs an imaging signal to the main body unit 3. An optical adapter is mounted on the distal end 20 of the insertion unit 2. The main body unit 3 is a control device including a housing unit that houses the insertion unit 2. The operation unit 4 accepts an operation for the endoscope device 1 from a user. The display unit 5 includes a display screen and displays an image of a subject acquired by the insertion unit 2, an operation menu, and the like on the display screen.

The operation unit 4 is a user interface (input device). For example, the operation unit 4 is at least one of a button, a switch, a key, a mouse, a joystick, a touch pad, a track ball, and a touch panel. The display unit 5 is a monitor (display) such as a liquid crystal display (LCD). The display unit 5 may be a touch panel. In such a case, the operation unit 4 and the display unit 5 are integrated. A user touches the display screen of the display unit 5 by using a part of the body or a tool. For example, the part of a body is a finger.

The main body unit 3 shown in FIG. 5 includes an endoscope unit 8, a camera control unit (CCU) 9, and a control device 10. The endoscope unit 8 includes a light source device and a bending device not shown in the drawing. The light source device supplies illumination light that is necessary for observation. The bending device bends a bending mechanism built in the insertion unit 2. An imaging device 28 is built in the distal end 20 of the insertion unit 2. The imaging device 28 is an image sensor. The imaging device 28 photo-electrically converts an optical image of a subject formed by an optical adaptor and generates an imaging signal. The CCU 9 drives the imaging device 28. The imaging signal output from the imaging device 28 is input into the CCU 9. The CCU 9 performs preprocessing including amplification, noise elimination, and the like for the imaging signal acquired by the imaging device 28. The CCU 9 converts the imaging signal on which the preprocessing is performed into a video signal such as an NTSC signal. The imaging device 28 constitutes an endoscope.

The control device 10 includes a video-signal-processing circuit 12, a read-only memory (ROM) 13, a random-access memory (RAM) 14, a card interface 15, an external device interface 16, a control interface 17, and a central processing unit (CPU) 18.

The video-signal-processing circuit 12 performs predetermined video processing on the video signal output from the CCU 9. For example, the video-signal-processing circuit 12 performs video processing related to improvement of visibility. For example, the video processing is color reproduction, gray scale correction, noise suppression, contour enhancement, and the like. The video-signal-processing circuit 12 combines the video signal output from the CCU 9 and a graphic image signal generated by the CPU 18. The graphic image signal includes an image of the operation screen, an image of a subject, measurement information, and the like. The measurement information includes a measurement result and the like. The video-signal-processing circuit 12 outputs a combined video signal to the display unit 5. In addition, the video-signal-processing circuit 12 outputs image data to the CPU 18 on the basis of the video signal output from the CCU 9.

The ROM 13 is a nonvolatile recording medium on which a program for the CPU 18 to control the operation of the endoscope device 1 is recorded. The RAM 14 is a volatile recording medium that temporarily stores information used by the CPU 18 for controlling the endoscope device 1. The CPU 18 controls the operation of the endoscope device 1 on the basis of the program recorded on the ROM 13.

A memory card 42, which is a removable recording medium, is connected to the card interface 15. The card interface 15 inputs control-processing information, image information, and the like stored on the memory card 42 into the control device 10. In addition, the card interface 15 records control-processing information, image information, and the like generated by the endoscope device 1 on the memory card 42.

An external device such as a USB device is connected to the external device interface 16. For example, a personal computer (PC) 41 is connected to the external device interface 16. The external device interface 16 transmits information to the PC 41 and receives information from the PC 41. In this way, a monitor of the PC 41 can display information. In addition, by inputting an instruction into the PC 41, a user can perform an operation related to control of the endoscope device 1.

The control interface 17 performs communication with the operation unit 4, the endoscope unit 8, and the CCU 9 for operation control. The control interface 17 notifies the CPU 18 of an instruction input into the operation unit 4 by a user. The control interface 17 outputs control signals used for controlling the light source device and the bending device to the endoscope unit 8. The control interface 17 outputs a control signal used for controlling the imaging device 28 to the CCU 9.

A program executed by the CPU 18 may be recorded on a computer-readable recording medium. The program recorded on this recording medium may be read and executed by a computer other than the endoscope device 1. For example, the program may be read and executed by the PC 41. The PC 41 may control the endoscope device 1 by transmitting control information used for controlling the endoscope device 1 to the endoscope device 1 in accordance with the program. Alternatively, the PC 41 may acquire a video signal from the endoscope device 1 and may process the acquired video signal.

As described above, the endoscope device 1 includes the imaging device 28 and the CPU 18. The imaging device 28 images a subject and generates an imaging signal. The imaging signal includes an image of the subject. Accordingly, the imaging device 28 acquires the image of the subject generated by imaging the subject. The image is a two-dimensional image (2D image). The 2D image acquired by the imaging device 28 is input into the CPU 18 via the video-signal-processing circuit 12.

The imaging device 28 has a function of an image acquisition unit that acquires an image of a subject. The image acquisition unit may be an image input device. For example, in a case in which the PC 41 operates as a data-processing device, the image acquisition unit is a communication interface (communicator) that performs communication with the endoscope device 1. The image acquisition unit may be a wireless communicator. The image acquisition unit may be a reading circuit that reads an image from a recording medium on which the image is recorded.

Figure 6:
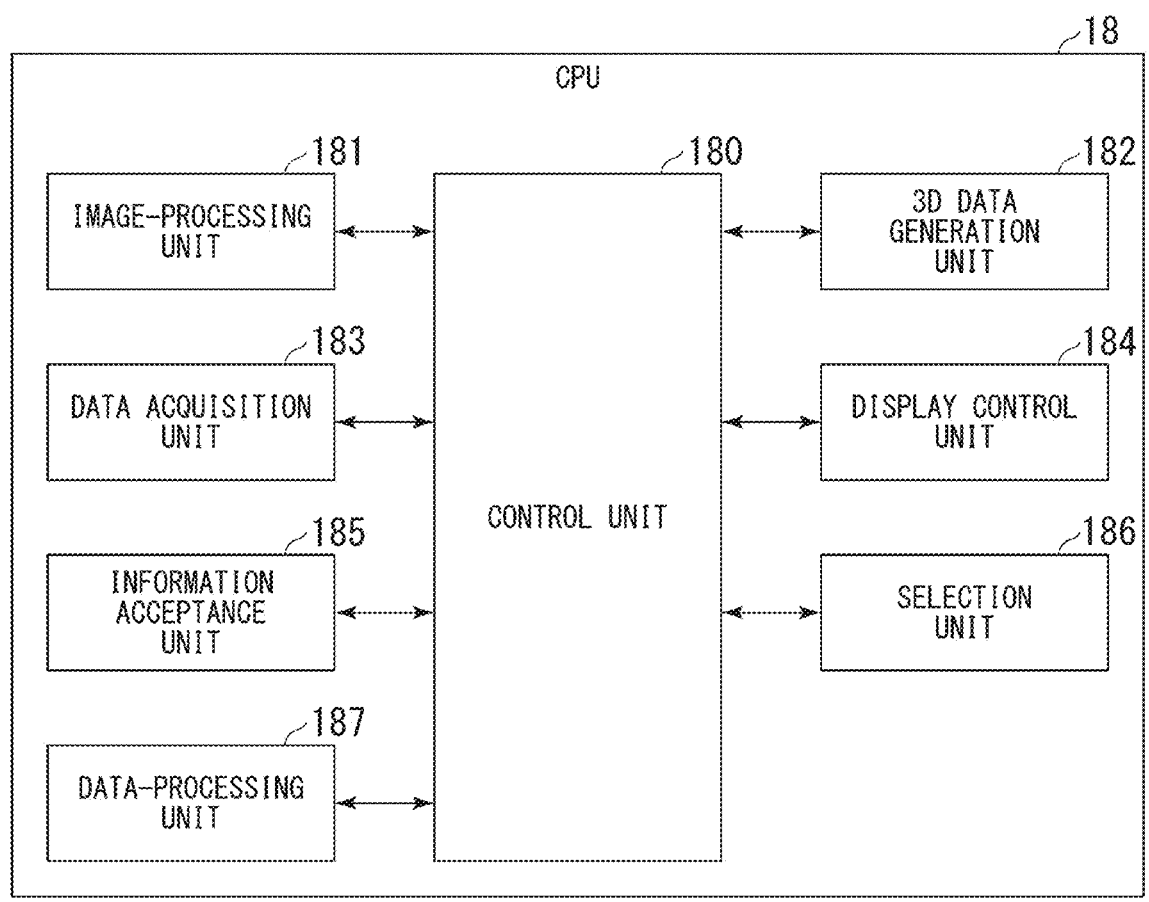
FIG. 6 is a block diagram showing a functional configuration of a CPU included in the endoscope device according to the second embodiment of the present invention.

FIG. 6 shows a functional configuration of the CPU 18. The CPU 18 has functional units including a control unit 180, an image-processing unit 181, a 3D data generation unit 182, a data acquisition unit 183, a display control unit 184, an information acceptance unit 185, a selection unit 186, and a data-processing unit 187. At least one of the blocks shown in FIG. 6 may be constituted by a different circuit from the CPU 18.

Each unit shown in FIG. 6 may be constituted by at least one of a processor and a logic circuit. Each unit shown in FIG. 6 may include one or a plurality of processors. Each unit shown in FIG. 6 may include one or a plurality of logic circuits.

The control unit 180 acquires a 2D image (image data) of a subject from the video-signal-processing circuit 12 and controls processing executed by each unit shown in FIG. 6.

The image-processing unit 181 processes the 2D image acquired by the imaging device 28 during an inspection and generates a video or a still image having a predetermined file format. The video includes two or more frames. Each of the frames is constituted by a 2D image acquired by the imaging device 28. The video and the still image generated by the image-processing unit 181 is stored on a recording medium in the PC 41 or on the memory card 42.

The 3D data generation unit 182 calculates 3D coordinates of two or more points on a subject on the basis of one or more 2D images of the subject and generates three-dimensional data (3D data) including the 3D coordinates of the two or more points. For example, the 3D data are constituted by point cloud data, surface data, or volume data. The 3D data generated by the 3D data generation unit 182 are stored on a recording medium in the PC 41 or on the memory card 42.

The 3D data include the 3D coordinates of the two or more points. The 3D data may include 3D coordinates of three or more points. The 3D data include an X-coordinate, a Y-coordinate, and a Z-coordinate of each point. For example, the X-axis and the Y-axis are perpendicular to the optical axis of an optical system of a camera that acquires a 2D image. For example, the Z-axis is parallel to the optical axis. The 3D data correspond to the position data. The 3D coordinates included in the 3D data correspond to the coordinate data C1, the coordinate data C2, and the coordinate data C3 shown in FIG. 2. Hereinafter, a point having 3D coordinates included in the 3D data will be referred to as "a point included in the 3D data."

The 3D data generation unit 182 may generate the 3D data by using one or more stereo images. Each of the stereo images includes a 2D image (first 2D image) of a subject seen from a first viewpoint and a 2D image (second 2D image) of the subject seen from a second viewpoint different from the first viewpoint. A stereo optical system having two different visual fields is mounted as an optical adaptor on the distal end 20 of the insertion unit 2.

The stereo optical system includes a first optical system and a second optical system. The endoscope device 1 may switch between a first state and a second state. In the first state, only light passing through the first optical system is incident on the imaging device 28. In the second state, only light passing through the second optical system is incident on the imaging device 28. The imaging device 28 may generate a first 2D image in the first state and may generate a second 2D image in the second state. A combination of the first 2D image and the second 2D image constitutes a stereo image. The 3D data generation unit 182 may generate the 3D data by using one or more first 2D images and one or more second 2D images.

A single-eye optical system having a single visual field may be mounted as an optical adaptor on the distal end 20 of the insertion unit 2. The 3D data generation unit 182 may generate the 3D data on the basis of a principle of an active stereo method. Hereinafter, an example using the active stereo method will be described.

For example, the 3D data generation unit 182 may generate the 3D data by using one or more 2D images acquired when light having a predetermined pattern including bright parts and dark parts is projected on a subject. For example, the pattern is a random pattern. The 3D data generation unit 182 may generate the 3D data by using two or more 2D images acquired when light having a stripe pattern is projected on a subject. The 3D data generation unit 182 may generate the 3D data by using one or more 2D images acquired when laser light (spotlight) or slit light is projected on a subject. In a case in which no patterns are on the surface of a subject, the 3D data generation unit 182 can stably generate the 3D data.

The 3D data generation unit 182 may generate the 3D data by using a technique called simultaneous localization and mapping (SLAM) or structure from motion (SfM). For example, the 3D data generation unit 182 may generate the 3D data by applying SLAM or SfM to two or more images. The two or more images are acquired when a single-eye optical system is mounted on the distal end 20 of the insertion unit 2.

The 3D data generation unit 182 may generate the 3D data by applying SLAM or SfM to two or more stereo images. The two or more stereo images are acquired when a stereo optical system is mounted on the distal end 20 of the insertion unit 2. In other words, the 3D data generation unit 182 may generate the 3D data by applying SLAM or SfM to two or more first 2D images and two or more second 2D images. The 3D data generation unit 182 may generate the 3D data by applying SLAM or SfM to two or more 2D images acquired on the basis of the principle of the active stereo method.

In a method in which SLAM is applied to stereo images, the 3D data are stably generated. In a method in which 2D images are acquired on the basis of the principle of the active stereo method and SLAM is applied to the 2D images, the 3D data are stably generated.

One or more images may be acquired by using a technique called time of flight (ToF). The 3D data generation unit 182 may generate the 3D data by using the one or more images. In a case in which ToF is used, the 3D data generation unit 182 measures the length of time during which light (infrared light or the like) or ultrasound travels from a first timing to a second timing. The first timing indicates a time point at which the light or the ultrasound is projected on a subject from a camera. The 3D data generation unit 182 calculates a distance on the basis of the length of time from the first timing to the second timing. The second timing indicates a time point at which light or ultrasound reflected by a subject reaches a camera. The endoscope device 1 acquires a color image and a distance image at the same time by using a camera called a TOF camera. The value of each pixel of the distance image indicates the distance from the camera to the subject. In this case, each pixel of the color image and each pixel of the distance image are associated with each other.

As long as the 3D data are generated by using one or more 2D images, a method of generating the 3D data is not limited to the above-described examples.

Hereinafter, an example in which the 3D data generation unit 182 generates the 3D data by using SLAM will be described. The 3D data generation unit 182 uses only two or more frames included in a video. The 3D data generation unit 182 does not need to use all the two or more frames in order to generate the 3D data. The 3D data generation unit 182 may generate the 3D data by using some of the two or more frames.

The 3D data may include 2D coordinates of one or more points in a 2D image used for generating the 3D data. Each set of 3D coordinates and each set of 2D coordinates are associated with each other in the 3D data. In other words, each point included in the 3D data may be associated with a pixel of the 2D image. The 2D image may be a frame of a video. In a case in which each set of 3D coordinates and each set of 2D coordinates are associated with each other in the 3D data, a 2D image including the 2D coordinates is associated with the 3D coordinates.

The 3D data may include a camera coordinate. The camera coordinate indicates a position (camera position) of a camera that acquires a 2D image. The camera includes the imaging device 28 and an observation optical system. The camera coordinate corresponds to the 3D coordinates of the camera and is associated with the 2D image acquired by the camera. The camera coordinate corresponds to the 3D coordinates of the viewpoint of the camera when the 2D image is acquired. When the 3D data generation unit 182 generates the 3D data by using SLAM or SfM, the 3D data generation unit 182 calculates the camera coordinate. Hereinafter, a camera coordinate of a camera that acquires an image will be referred to as "a camera coordinate of the image." Hereinafter, a camera position of a camera that acquires an image will be referred to as "a camera position of the image."

Hereinafter, an example in which the 3D data include 3D coordinates of two or more points and 2D coordinates of one or more points in each 2D image and the two or more points include camera coordinates of one or more viewpoints of the camera will be described.

The data acquisition unit 183 accesses a recording medium in the PC 41 or the memory card 42 and acquires the 3D data from the recording medium or the memory card 42. In addition, the data acquisition unit 183 acquires a video and a still image from the recording medium or the memory card 42. Information or data generated or processed by the CPU 18 are stored on the RAM 14. The data acquisition unit 183 acquires the information and the data from the RAM 14.

The display control unit 184 has the function of the display control unit 70 shown in FIG. 1. The display control unit 184 displays position information indicating a positional relationship between two or more positions in a 3D space including an object on the display unit 5 on the basis of the 3D data. Specifically, the display control unit 184 displays a three-dimensional image (3D image) including two or more pixels corresponding to the two or more points included in the 3D data on the display unit 5. The 3D image is an image of a three-dimensional shape (3D shape) indicated by the 3D data. The 3D image indicates a 3D shape of a subject seen in a predetermined visual line direction from a predetermined viewpoint. The 3D image visualizes the two or more points included in the 3D data. In other words, the 3D image visually shows a positional relationship between the two or more points included in the 3D data. The 3D image indicates the distribution (3D map) of two or more points constituting a subject.

For example, the display control unit 184 outputs a 3D video signal or a 2D video signal to the display unit 5 via the video-signal-processing circuit 12. The 3D video signal includes color data of each pixel of the 3D image. The 2D video signal includes color data of each pixel of a video or a still image.

The display control unit 184 outputs the 3D video signal or the 2D video signal to the video-signal-processing circuit 12. The display control unit 184 controls processing executed by the video-signal-processing circuit 12. The video-signal-processing circuit 12 outputs the 3D video signal or the 2D video signal to the display unit 5. The display unit 5 displays a 3D image on the basis of the 3D video signal output from the video-signal-processing circuit 12. Alternatively, the display unit 5 displays a 2D image on the basis of the 2D video signal output from the video-signal-processing circuit 12.

The display control unit 184 causes the video-signal-processing circuit 12 to output the video signal output from the CCU 9 to the display unit 5. In this way, the display control unit 184 displays the 2D image generated by the imaging device 28 as a live image on the display unit 5.

The display control unit 184 displays various kinds of information on the display unit 5. In other words, the display control unit 184 displays various kinds of information on an image. The various kinds of information include a measurement result and the like. The various kinds of information may include a cursor. The cursor is a mark used by a user to designate a specific point on an image.

For example, the display control unit 184 generates a graphic image signal of the various kinds of information. The display control unit 184 outputs the generated graphic image signal to the video-signal-processing circuit 12. The video-signal-processing circuit 12 combines the video signal output from the CCU 9 and the graphic image signal output from the CPU 18. In this way, the various kinds of information are superimposed on an image. The video-signal-processing circuit 12 outputs the combined video signal to the display unit 5. The display unit 5 displays an image on which the various kinds of information are superimposed.

A user inputs various kinds of information into the endoscope device 1 by operating the operation unit 4. The operation unit 4 outputs the information input by the user. The information is input into the control interface 17, which is an input unit. The information is output from the control interface 17 to the CPU 18. The information acceptance unit 185 accepts the information input into the endoscope device 1 via the operation unit 4.

For example, a user inputs position information of a cursor into the endoscope device 1 by operating the operation unit 4. In a case in which the display unit 5 is constituted as a touch panel, the user inputs position information indicating a position on an image into the endoscope device 1 by touching the screen of the display unit 5. The information acceptance unit 185 accepts the position information input into the endoscope device 1. The information acceptance unit 185 calculates the position on the image on the basis of the position information. The display control unit 184 displays a cursor at the position calculated by the information acceptance unit 185.

The selection unit 186 has the function of the selection unit 71 shown in FIG. 1. The selection unit 186 selects at least one position included in the two or more positions after the position information is displayed. In this way, the selection unit 186 selects at least one three-dimensional position (3D position) in a 3D space including an object. The 3D position selected by the selection unit 186 corresponds to 3D coordinates included in the 3D data. In other words, the 3D position corresponds to a point included in the 3D data.

The data-processing unit 187 has the function of the data-processing unit 72 shown in FIG. 1. The data-processing unit 187 processes meta-data. The meta-data generated by the data-processing unit 187 are stored on a recording medium in the PC 41 or on the memory card 42.

Figure 7:
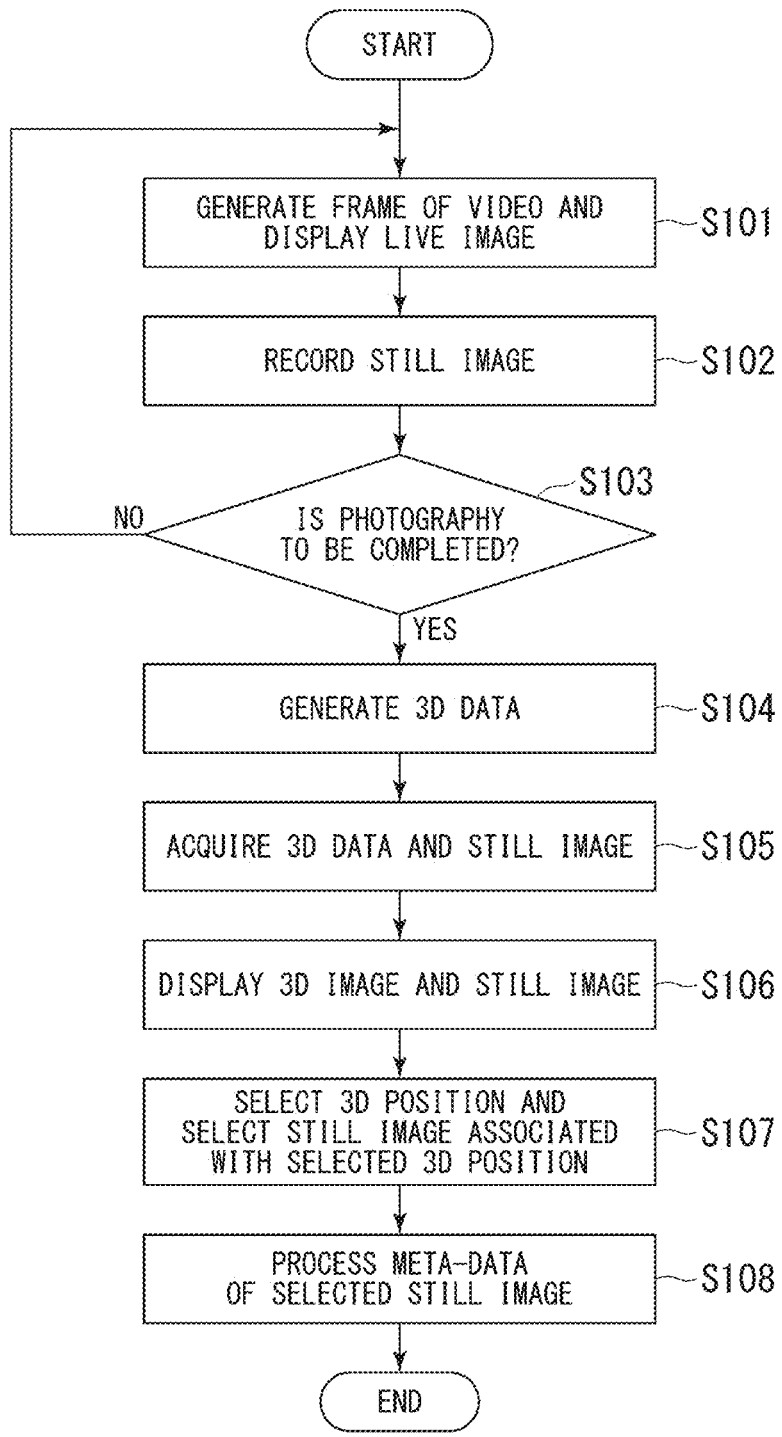
FIG. 7 is a flow chart showing a procedure of data processing in the second embodiment of the present invention.

Data processing in the second embodiment will be described by using FIG. 7. FIG. 7 shows a procedure of the data processing.

When an inspection is started, a user inputs a start instruction for starting photography into the endoscope device 1 by operating the operation unit 4. The information acceptance unit 185 accepts the start instruction. In this way, photography for acquiring a video is started.

The imaging device 28 sequentially generates an imaging signal. In other words, the imaging device 28 generates an imaging signal of each frame corresponding to a live image. The image-processing unit 181 processes the imaging signal and generates each frame of a video. The display control unit 184 displays the live image on the display unit 5 by controlling the video-signal-processing circuit 12 (Step S101). The live image is sequentially updated at a predetermined frame rate.

While the live image is displayed on the display unit 5, a user observes the live image. When a region such as damage is found on a subject, the user inputs a recording instruction for recording a still image into the endoscope device 1 by operating the operation unit 4. The information acceptance unit 185 accepts the recording instruction. The image-processing unit 181 generates a still image on the basis of the frame generated in Step S101. For example, the image-processing unit 181 compresses the frame at a predetermined compression ratio and generates a still image. The image-processing unit 181 records the generated still image on a recording medium in the PC 41 or on the memory card 42 (Step S102). When the user has not input the recording instruction into the endoscope device 1, Step S102 does not need to be executed.

The image-processing unit 181 generates a still image by using the frame generated in Step S101. The still image is a 2D image of a subject. The timing at which the still image is acquired is the same as that at which the frame is acquired. The composition of the still image is the same as that of the frame. Time information is attached to the still image and the frame. The time information indicates a time point of the photography. The still image and the frame are associated with each other by the time information. The time point indicated by the time information of the still image is the same as that indicated by the time information of the frame associated with the still image.

In general, a compression ratio of a still image is different from that of a frame of a video. Therefore, strictly speaking, the still image is different from the frame. Hereinafter, it is assumed that the still image is the same as the frame for ease of description.

In a case in which a flag is attached to a frame by using a method described later and the frame is used as a still image, the still image and the frame are associated with each other by the flag. Each set of 2D coordinates of a point in a still image and each set of 2D coordinates of a point in a frame are associated with each other.

Since a still image is the same as a frame, 2D coordinates of a point in the still image are the same as those of a point in the frame. Since the 3D data include 2D coordinates of a point in the frame, the 3D data include 2D coordinates of a point in the still image. Due to this relationship, the still image is associated with 3D coordinates included in the 3D data.

Since a still image is the same as a frame, the camera coordinate of the still image is the same as that of the frame. Since the 3D data include the camera coordinate of the frame, the 3D data include the camera coordinate of the still image. Due to this relationship, the still image is associated with 3D coordinates included in the 3D data.

After Step S102, the control unit 180 determines whether to complete the photography (Step S103). For example, a user inputs a completion instruction for completing the photography into the endoscope device 1 by operating the operation unit 4. The information acceptance unit 185 accepts the completion instruction. At this time, the control unit 180 determines to complete the photography. When the information acceptance unit 185 has not accepted the completion instruction, the control unit 180 determines not to complete the photography. The photography may be executed in the background.

When the control unit 180 determines not to complete the photography in Step S103, Step S101 is executed. The imaging device 28 continues to acquire a live image and the display control unit 184 continues to display the live image on the display unit 5 until the photography is completed. When the control unit 180 determines to complete the photography in Step S103, the image-processing unit 181 records a file of a video on a recording medium in the PC 41 or on the memory card 42. In this way, the photography is completed. In other words, the inspection is completed.

After the photography is completed, the 3D data generation unit 182 calculates 3D coordinates of two or more points on a subject on the basis of one or more 2D images of the subject and generates 3D data including the 3D coordinates of the two or more points. In this example, the 3D data generation unit 182 generates the 3D data by executing SLAM using only a video. The 3D data generation unit 182 records the 3D data on a recording medium in the PC 41 or on the memory card 42 (Step S104).

A user may input a generation instruction for generating the 3D data into the endoscope device 1 by operating the operation unit 4. The information acceptance unit 185 may accept the generation instruction. At this time, the 3D data generation unit 182 may generate the 3D data.

While the photography is executed, the 3D data generation unit 182 may sequentially generate the 3D data. In this case, a period of time during which a user waits until the 3D data are generated is short.

After Step S104, the data acquisition unit 183 accesses a recording medium in the PC 41 or the memory card 42 and acquires the 3D data and still images from the recording medium or the memory card 42 (Step S105).

After Step S105, the display control unit 184 displays a 3D image on the display unit 5 on the basis of the 3D data and displays one or more still images on the display unit 5 (Step S106). Step S106 corresponds to the information display step. Each pixel of the 3D image is associated with 3D coordinates included in the 3D data.

Figure 8:
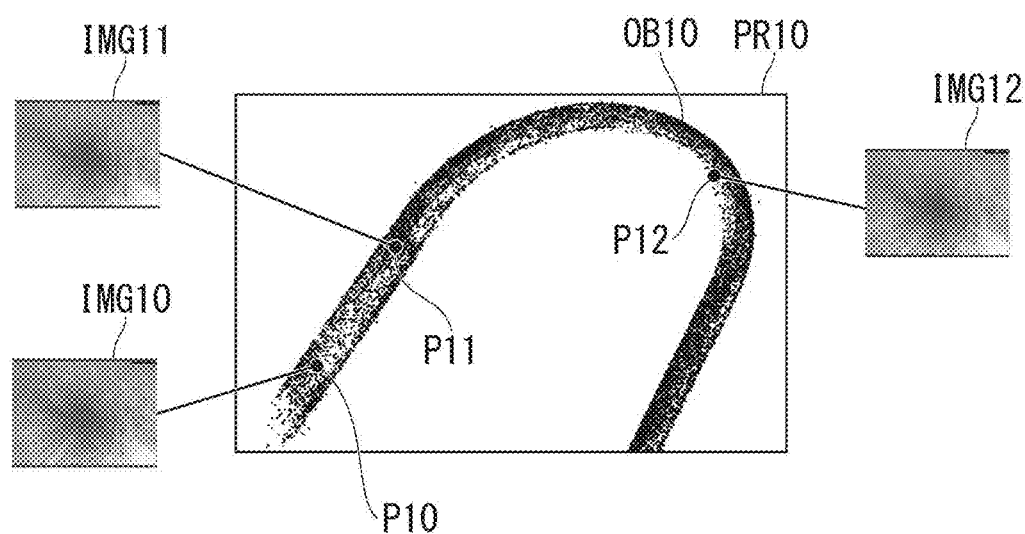
FIG. 8 is a diagram showing an example of an image displayed on a display unit in the second embodiment of the present invention.

FIG. 8 shows an example of an image displayed on the display unit 5 in Step S106. The display control unit 184 displays a 3D image PR10, a still image IMG10, a still image IMG11, and a still image IMG12 on the display unit 5. The 3D image PR10 shows a 3D shape of a subject OB10. The subject OB10 is displayed as a point cloud.

There is no point cloud in the white region in the 3D image PR10. The 3D data do not include 3D coordinates of points in the region.

The display control unit 184 displays a point P10, a point P11, and a point P12 on the display unit 5. Each point is superimposed on the 3D image PR10. A predetermined mark is displayed at the position of each point. Each point indicates the position of a camera that acquires a still image. As described above, the 3D data include the camera coordinate of the still image.

The point P10 indicates the position of the camera that acquires the still image IMG10. The point P11 indicates the position of the camera that acquires the still image IMG11. The point P12 indicates the position of the camera that acquires the still image IMG12. In the image displayed on the display unit 5, each of the point P10, the point P11, and the point P12 is connected to the still image by a line. Therefore, a user can figure out a position at which each still image is acquired.

There is a case in which a user does not have a blueprint of a subject (pipe or the like) or the blueprint is made of paper. In such a case, the user does not possess data of the blueprint. Alternatively, there is a case in which construction work of pipes is not performed in accordance with the design and the actual structure of the pipes is different from the designed structure. In these cases, it is difficult for the user to figure out an inspection position on the basis of the 2D image acquired by the imaging device 28. Since the 3D data are displayed, the user can easily figure out an inspection position in the entire subject.

After Step S106, the selection unit 186 selects at least one of the two or more points included in the 3D data. In this way, the selection unit 186 selects one or more 3D positions. Furthermore, the selection unit 186 selects one or more still images associated with the one or more 3D positions (Step S107). Step S107 corresponds to the position selection step.

Figure 9:
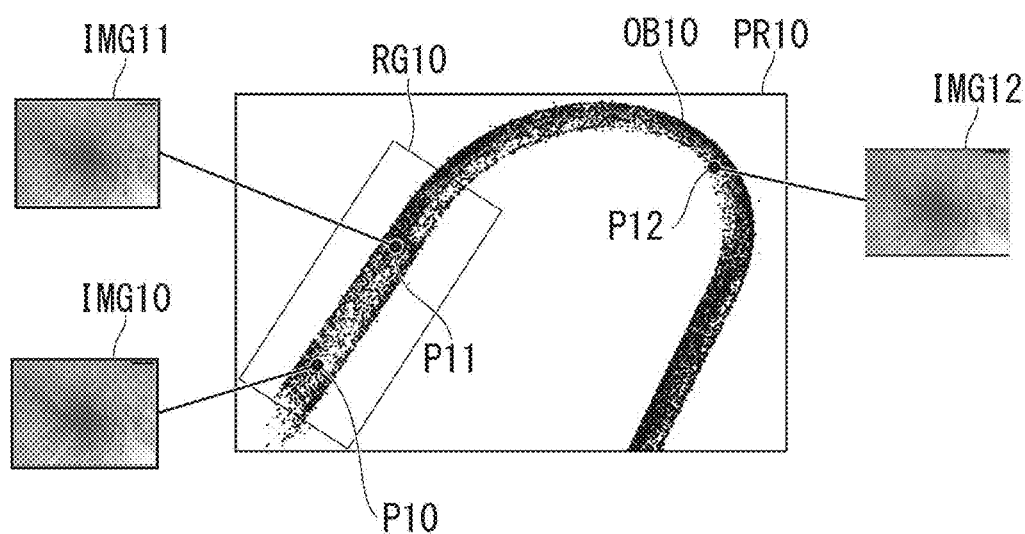
FIG. 9 is a diagram showing an example of an image displayed on the display unit in the second embodiment of the present invention.

FIG. 9 shows an example of an image displayed on the display unit 5 in Step S107. The same parts as those shown in FIG. 8 will not be described.

A user selects a region of a subject for recording the content of the inspection. The user selects a region RG10 shown in FIG. 9 by operating the operation unit 4. Specifically, the user inputs a selection instruction for selecting a position on the 3D image PR10 into the endoscope device 1 by operating the operation unit 4. The information acceptance unit 185 accepts the selection instruction. The selection instruction indicates a position on the 3D image PR10.

In an example in which a cursor is displayed on a 3D image, the user moves the cursor to an intended position on the 3D image and performs a drag operation or the like. At this time, the information acceptance unit 185 accepts the position. In an example in which the display unit 5 is constituted as a touch panel, the user touches the screen of the display unit 5 and performs a pinch operation or the like. At this time, the information acceptance unit 185 accepts the position designated through the operation.

The selection unit 186 identifies a 3D position corresponding to the position indicated by the selection instruction. In the example shown in FIG. 9, the selection unit 186 selects a 3D position included in the region RG10 on the basis of the selection instruction. The region RG10 has a depth in the visual line direction. The 3D data include 3D coordinates of 3D positions. The 3D data include 2D coordinates of one or more points in the 2D image used for generating the 3D data. Since a still image is the same as a frame, the 3D data include 2D coordinates of a point in the still image. Each set of 3D coordinates and each set of 2D coordinates are associated with each other in the 3D data. The selection unit 186 selects a still image having 2D coordinates associated with the selected 3D position.

In the example shown in FIG. 9, 2D coordinates of a point in each of the still image IMG10 and the still image IMG11 are associated with 3D coordinates in the region RG10. Therefore, the selection unit 186 selects the still image IMG10 and the still image IMG11.

The 3D data include a camera coordinate. Since a still image is the same as a frame, the 3D data include the camera coordinate of the still image. The selection unit 186 may identify a camera coordinate of a still image included in the region RG10. The selection unit 186 may select the still image associated with the identified camera coordinate. In the example shown in FIG. 9, the point P10 and the point P11 are included in the region RG10. Therefore, the selection unit 186 may select the point P10 and the point P11. The selection unit 186 may select the still image IMG10 associated with the point P10 and may select the still image IMG11 associated with the point P11.

The display control unit 184 displays the region RG10 on the display unit 5. In the example shown in FIG. 9, the display control unit 184 displays a box indicating the region RG10 on the display unit 5. In this way, the display control unit 184 displays one or more 3D positions selected by the selection unit 186 on the display unit 5. A user can figure out the position of the selected region RG10. The user may remember the position of the region RG10 without the display control unit 184 displaying the region RG10.

The display control unit 184 may display 3D positions corresponding to the region RG10 in a first color and may display 3D positions corresponding to a region not included in the region RG10 in a second color different from the first color. In other words, the display control unit 184 may display the 3D positions corresponding to the region RG10 and the 3D positions corresponding to the region not included in the region RG10 in different colors.

The display control unit 184 highlights the still image IMG10 and the still image IMG11. For example, the display control unit 184 displays a box around each of the still image IMG10 and the still image IMG11. A user can easily check a still image acquired at the position selected in Step S107.

The selection unit 186 may determine whether a still image is associated with a 3D position corresponding to the region RG10. In a case in which one or more still images are associated with the 3D position, the selection unit 186 may select the one or more still images. In a case in which no still image is associated with the 3D position, the processing shown in FIG. 7 may be completed. Alternatively, the display control unit 184 may display a warning on the display unit 5, and a user may select a position on the 3D image PR10 again.

After Step S107, the data-processing unit 187 processes meta-data of the still image selected in Step S107 (Step S108). Step S108 corresponds to a data-processing step. When Step S108 is executed, the data processing is completed.

For example, the data-processing unit 187 generates a folder in a recording medium in the PC 41 or the memory card 42. The data-processing unit 187 saves one or more still images associated with the selected one or more 3D positions in the folder. The data-processing unit 187 records the name (file path) of the folder in the meta-data.

The data-processing unit 187 may change the file names of one or more still images associated with the selected one or more 3D positions. In this case, the meta-data are the file names of the still images. For example, the data-processing unit 187 may add shared characters or numbers to the file names of two or more still images. The data-processing unit 187 may change the file name of each still image such that the file names of two or more still images conform to a predetermined rule. For example, at least some of the file names of the two or more still images are changed to sequence numbers. As described above, the data-processing unit 187 may process meta-data of two or more still images at the same time.

The data-processing unit 187 may delete one or more still images associated with the selected one or more 3D positions. The data-processing unit 187 may compress the one or more still images. The data-processing unit 187 may transfer the one or more still images to an external server.

In the above-described example, the data-processing device 7 shown in FIG. 1 corresponds to the endoscope device 1. The data-processing device 7 may be a different device from the endoscope device 1. For example, the data-processing device 7 may be an external device like the PC 41. In a case in which the data-processing device 7 is an external device, the endoscope device 1 executes Steps S101 to S104 and the external device executes Steps S105 to S108. Accordingly, the data-processing device 7 does not need to execute Steps S101 to S104.

Another example of a method of generating a still image will be described. In the following example, a fame of a video is used as a still image.

When a user has found a feature region during an inspection, the user inputs a frame instruction for designating a fame of a video into the endoscope device 1 by operating the operation unit 4. For example, the feature region is a region in which there is damage. The feature region may be a region having a predetermined shape or a predetermined color. The information acceptance unit 185 accepts the frame instruction. The image-processing unit 181 determines, in Step S101, whether the frame instruction has been accepted.

When the image-processing unit 181 determines that the frame instruction has been accepted, the image-processing unit 181 attaches a flag to the generated frame. The flag functions as processing information indicating the content of processing executed on the frame. The flag indicates that the generated frame is used as a still image. The flag is included in a file of a video. When the image-processing unit 181 determines that the frame instruction has not been accepted, the image-processing unit 181 does not attach a flag to the generated frame.

In this example, Step S102 does not need to be executed. When the data acquisition unit 183 acquires a still image in Step S105, the data acquisition unit 183 acquires a frame to which the flag is attached as a still image.

Figure 10:
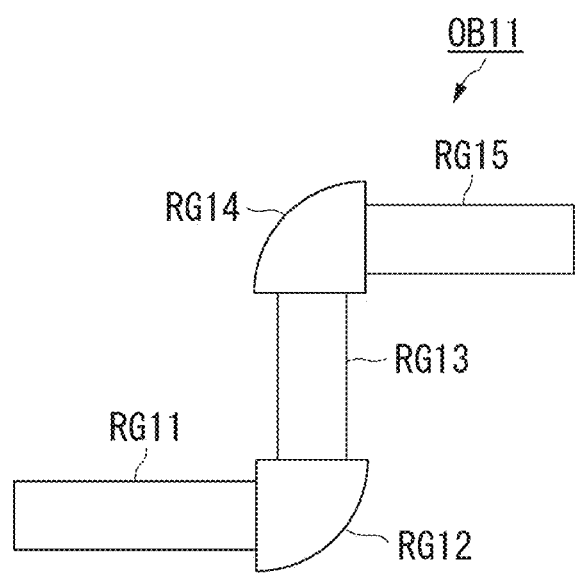
FIG. 10 is a diagram showing an example of a subject in the second embodiment of the present invention.

When the scene has changed in an inspection, a user may input the frame instruction into the endoscope device 1 by operating the operation unit 4. FIG. 10 shows an example of a subject. A subject OB11 shown in FIG. 10 includes a region RG11, a region RG12, a region RG13, a region RG14, and a region RG15. Each of the region RG11, the region RG13, and the region RG15 is a region having a straight line shape in the subject. Each of the region RG12 and the region RG14 is a corner.

When the distal end 20 of the insertion unit 2 moves between two adjacent regions, the scene changes. For example, the scene changes between the region RG11 and the region RG12. A user can notice the change of the scene on the basis of the live image displayed on the display unit 5. The flag attached to a frame indicates the change of the scene.

When the data acquisition unit 183 acquires a still image in Step S105, the data acquisition unit 183 acquires a frame to which the flag is attached as a still image. Alternatively, the data acquisition unit 183 acquires a frame between a frame to which the flag is attached and another frame to which another flag is attached as a still image.

The image-processing unit 181 may process a frame and may attach a flag to the frame on the basis of a processing result of the frame. For example, the image-processing unit 181 may detect a feature region seen in the frame. When the feature region is detected, the image-processing unit 181 may attach a flag to the frame. The image-processing unit 181 may detect a change of the scene on the basis of two or more consecutive frames. When the change of the scene is detected, the image-processing unit 181 may attach a flag to any one of the two or more frames.

In a case in which a frame of a video is used as a still image, the still image is the same as any one of the two or more frames used for generating the 3D data. Since a still image is the same as a frame, 2D coordinates of a point in the still image are the same as those of a point in the frame. Since the 3D data include 2D coordinates of a point in the frame, the 3D data include 2D coordinates of a point in the still image. The still image is associated with 3D coordinates included in the 3D data.

Another example of a method of generating a still image will be described. Hereinafter, a still image is generated by executing SfM using two or more frames included in a video.

The 3D data generation unit 182 executes Step S104. In addition, the 3D data generation unit 182 executes the following processing before or after Step S104.

The 3D data generation unit 182 executes SfM using at least two of two or more frames included in a video. The 3D data generation unit 182 calculates 3D coordinates of two or more points on a subject and generates a still image including the 3D coordinates of the two or more points. The generated still image constitute data similar to the 3D data. In this example, Step S102 does not need to be executed.

The 3D data generation unit 182 does not need to use all the two or more frames included in a video. The 3D data generation unit 182 uses some of the two or more frames included in the video and executes SfM. The 3D data generated in Step S104 include 3D coordinates of a first region in a subject. The still image generated by using the above-described method includes 3D coordinates of a second region in the subject. In an example in which SLAM is used for generating the 3D data and SfM is used for generating the still image, the density of points included in the second region in the still image is higher than that of points included in the first region in the 3D data.

A set of 3D coordinates included in the 3D data and a frame used for calculating the 3D coordinates are associated with each other. In a case in which a still image is generated from a frame by using SfM, the still image and the frame used for generating the still image are associated with each other. Since both the set of the 3D coordinates included in the 3D data and the still image are associated with the frame, the set of the 3D coordinates and the still image are associated with each other. Due to this relationship, the still image is associated with 3D coordinates included in the 3D data.

When the 3D data generation unit 182 generates a still image from a frame by using SfM, the still image gets associated with the 3D coordinates (camera coordinate) of the camera that acquires the frame. Since both the set of the 3D coordinates included in the 3D data and the camera coordinate are associated with the frame, the set of the 3D coordinates and the camera coordinate are associated with each other. Due to this relationship, the still image is associated with 3D coordinates included in the 3D data.

The 3D data generation unit 182 calculates 3D coordinates corresponding to the camera coordinate of the still image. For example, the 3D data generation unit 182 selects a typical camera coordinate among camera coordinates of two or more frames used for generating the still image. For example, the typical camera coordinate is the camera coordinate of the frame acquired first among the two or more frames. The typical camera coordinate may be a centroid coordinate of the camera coordinates of the two or more frames. The 3D data generation unit 182 may calculate a camera coordinate such that a point cloud seen in the still image is within the visual field.

The endoscope device 1 may execute Steps S101 to S104, and an external device may generate a still image by using SfM and may execute Steps S105 to S108.

Another example of a method of processing meta-data will be described. Hereinafter, an example using a flag included in a video will be described.

The data-processing unit 187 saves a still image in a folder prepared for each scene. For example, one or more frames preceding a predetermined frame are used as still images, and one or more frames following the predetermined frame are used as still images. A flag is attached to the predetermined frame. The flag indicates a change of the scene. The data-processing unit 187 detects a frame to which the flag is attached. The data-processing unit 187 saves one or more still images preceding the detected frames in a first folder. The data-processing unit 187 saves one or more still images following the detected frames in a second folder different from the first folder.

The display control unit 184 may superimpose information corresponding to the flag on a 3D image. For example, the display control unit 184 may superimpose information indicating a position at which the flag is attached on a 3D image. Alternatively, the display control unit 184 may display two or more regions separated from each other at the position to which the flag is attached in different colors. A user can check the position at which the scene changes.

Figure 11:
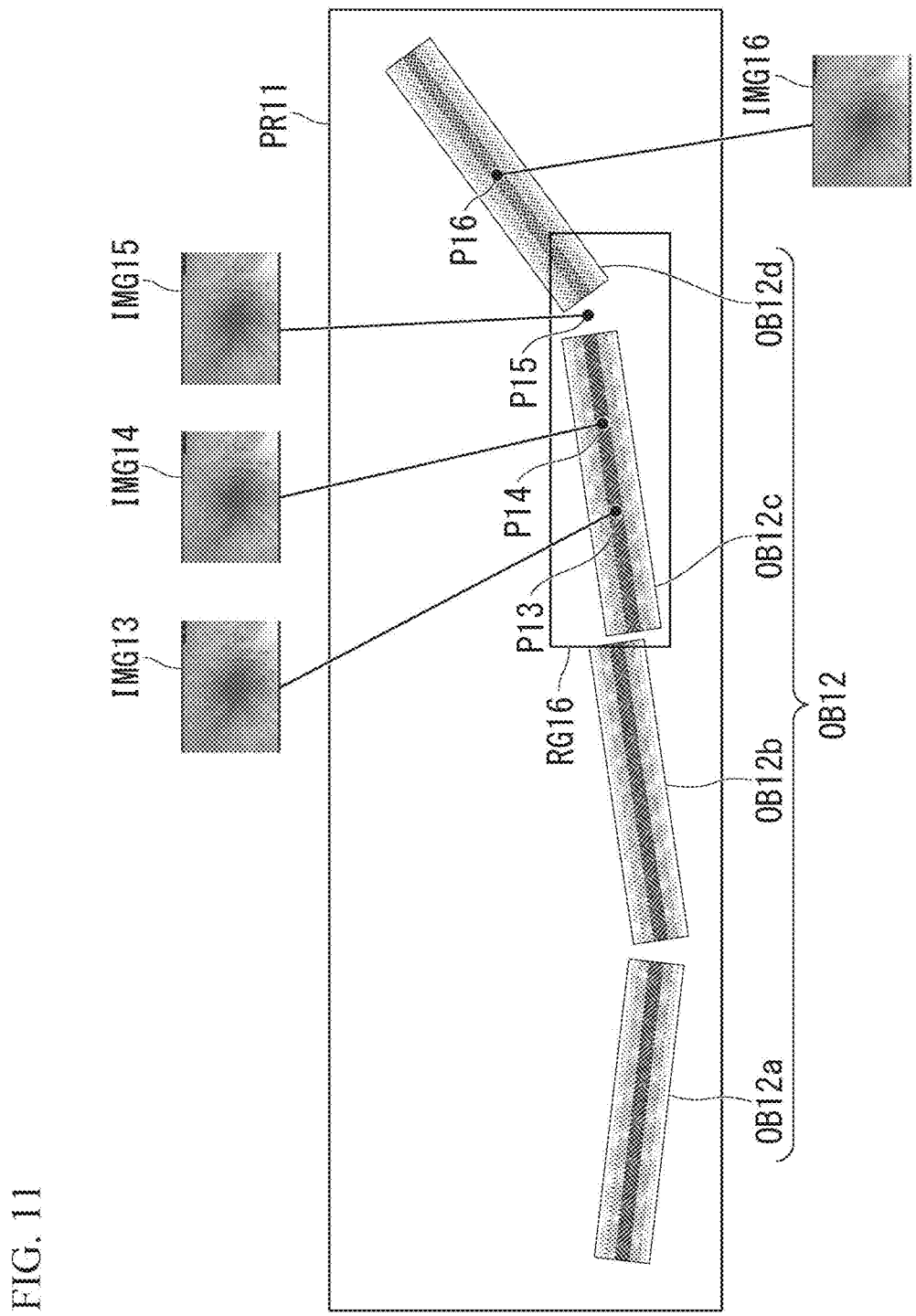
FIG. 11 is a diagram showing an example of an image displayed on the display unit in the second embodiment of the present invention.

Another example of a three-dimensional image will be described. FIG. 11 shows an example of an image displayed on the display unit 5 in Step S106. The display control unit 184 displays a 3D image PR11, a still image IMG13, a still image IMG14, a still image IMG15, and a still image IMG16 on the display unit 5. The 3D image PR11 shows a 3D shape of a subject OB12. The subject OB12 is displayed as a 3D shape to which texture is attached.

The display control unit 184 displays a point P13, a point P14, a point P15, and a point P16 on the display unit 5. Each point is superimposed on the 3D image PR11. A predetermined mark is displayed at the position of each point. The point P13 indicates the position of the camera that acquires the still image TMG13. The point P14 indicates the position of the camera that acquires the still image IMG14. The point P15 indicates the position of the camera that acquires the still image IMG15. The point P16 indicates the position of the camera that acquires the still image IMG16.

In a case in which the distal end 20 of the insertion unit 2 moves fast or no patterns are on the surface of a subject, there is a possibility that the 3D data generated by using SLAM or SfM do not include data corresponding to a part of the subject. In other words, there is a possibility that data corresponding to a part of the subject are lost in the 3D data.

FIG. 11 shows an example in which data are lost in the 3D data. A subject OB12 includes a region OB12a, a region OB12b, a region OB12c, and a region OB12d. In other words, the subject OB12 is divided into four regions. Data corresponding to a region between the region OB12a and the region OB12b are lost. Data corresponding to a region between the region OB12b and the region OB12c are lost. Data corresponding to a region between the region OB12c and the region OB12d are lost. Hereinafter, a region in which data are lost will be referred to as a data-lost region.

The 3D data generation unit 182 cannot calculate 3D coordinates of a point cloud in a data-lost region in Step S104. The 3D data generation unit 182 cannot calculate a camera coordinate in the data-lost region in Step S104. The 3D data do not include the 3D coordinates of the point cloud in the data-lost region. Therefore, a 3D shape of the data-lost region is not displayed.

In a case in which a region of a subject is divided into a plurality of regions in a 3D image as in the example shown in FIG. 11, the display control unit 184 estimates a positional relationship between two regions close to each other on the basis of the shapes of the two regions. For example, since each of the region OB12a and the region OB12b is a region having a straight line shape, the display control unit 184 determines that there is a data-lost region having a straight line shape between the region OB12a and the region OB12b.

The display control unit 184 estimates the length of a data-lost region between two regions close to each other. For example, the display control unit 184 estimates the length of the data-lost region on the basis of the time information of frames of a video used for generating the two regions. For example, the display control unit 184 estimates the length of the data-lost region between the region OB12a and the region OB12b. The display control unit 184 displays the region OB12a and the region OB12b in light of the length of the data-lost region.

The 3D data include 3D coordinates of a point cloud in each of the region OB12a, the region OB12b, the region OB12c, and the region OB12d. In addition, the 3D data include 3D coordinates of each of the point P13, the point P14, the point P15, and the point P16. For example, the 3D data generation unit 182 calculates the 3D coordinates of each of the point P13, the point P14, and the point P16 in Step S104.

When a camera is positioned in a data-lost region, the camera acquires the still image IMG15. The 3D data generation unit 182 cannot calculate the camera coordinate of the still image IMG15 in Step S104. The 3D data do not include the camera coordinate of the still image IMG15.

The 3D data generation unit 182 calculates a camera coordinate of a still image in a data-lost region by using the time information of a 2D image used for generating the 3D data and using the time information of the still image. For example, the time information of the still image IMG15 indicates a time point t3 between a time point t1 indicated by first time information and a time point t2 indicated by second time information. The first time information indicates the time point t1 at which a first 2D image is acquired. The first 2D image is used for calculating 3D coordinates of a point in the region OB12c. The second time information indicates the time point t2 at which a second 2D image is acquired. The second 2D image is used for calculating 3D coordinates of a point in the region OB12d. The region OB12c and the region OB12d are adjacent to a data-lost region.

The 3D data generation unit 182 calculates the camera coordinate of the still image IMG15 on the basis of the time point t1, the time point t2, and the time point t3. The first 2D image is associated with first 3D coordinates in the region OB12c. The second 2D image is associated with second 3D coordinates in the region OB12d. For example, the length of a period between the time point t1 and the time point t3 is T13, and the length of a period between the time point t2 and the time point t3 is T23. The 3D data generation unit 182 calculates the camera coordinate of the still image IMG15 on the basis of the length T13 and the length T23.

Specifically, the 3D data generation unit 182 calculates an X-coordinate Xc included in the camera coordinate by using the following Expression (1). An X-coordinate X1 in Expression (1) is included in the first 3D coordinates. An X-coordinate X2 in Expression (1) is included in the second 3D coordinates. The 3D data generation unit 182 calculates a Y-coordinate and a Z-coordinate included in the camera coordinate by using a similar expression to Expression (1). After the camera coordinate of the still image IMG15 is calculated, the 3D data may include the camera coordinate.

$$Xc=X1+(X2-X1)\times(T13-T23)/T13 \qquad (1)$$

When a user selects the region RG16 shown in FIG. 11, the selection unit 186 identifies 3D positions corresponding to the positions included in the region RG16. The selection unit 186 selects a camera position included in the identified 3D positions. The 3D data include a camera coordinate of each of the point P13, the point P14, and the point P16. Since the point P13 and the point P14 are included in the region RG16, the selection unit 186 selects the point P13 and the point P14.

The 3D data do not include the 3D coordinates of the point P15. The point P15 is included in the region RG16. The selection unit 186 selects the point P15 having the 3D coordinates calculated by the 3D data generation unit 182. Accordingly, the selection unit 186 selects the point P13, the point P14, and the point P15 included in the region RG16. The data-processing unit 187 processes meta-data of a still image associated with each of the points selected by the selection unit 186.

Each aspect of the present invention may include the following modified example. One or more still images correspond to one or more frames of a video generated by photographing an object.

Each aspect of the present invention may include the following modified example. The one or more still images visualize 3D coordinates of two or more points. The 3D coordinates of the two or more points are calculated by applying SfM to two or more images generated by photographing an object.

Each aspect of the present invention may include the following modified example. A flag is attached to at least one frame included in two or more frames. The two or more frames are included in a video generated by photographing an object. One or more frames to which the flag is attached among the two or more frames are selected as the one or more still images.

Each aspect of the present invention may include the following modified example. Two or more positions in a 3D space including an object do not include a second position (point P15) at which a second still image (still image IMG15) included in the one or more still images is acquired. The selection unit 186 selects the estimated second position in the position selection step (Step S107). The meta-data processed in the processing step (Step S108) are associated with the second still image acquired at the selected second position.

Each aspect of the present invention may include the following modified example. The one or more still images are generated by a first device. Position data (3D data) are generated by a second device different from the first device. For example, the first device may be the endoscope device 1, and the second device may be the PC 41.

Each aspect of the present invention may include the following modified example. Position data (3D data) are generated by applying SLAM to two or more images generated by photographing an object.

Each aspect of the present invention may include the following modified example. The two or more images are generated on the basis of the principle of the active stereo method.

Each aspect of the present invention may include the following modified example. A single-eye optical system is used in photography for generating the two or more images. The single-eye optical system corresponds to a single visual field.

Each aspect of the present invention may include the following modified example. A stereo optical system is used in photography for generating the two or more images. The stereo optical system corresponds to a first visual field and a second visual field different from each other. The two or more images correspond to two or more images of an object captured in the first visual field and two or more images of the object captured in the second visual field.

Each aspect of the present invention may include the following modified example. The one or more still images are acquired by an endoscope (imaging device 28) when the endoscope photographs an object.

In the second embodiment, the endoscope device 1 displays a 3D image of a subject on the display unit 5. A user can intuitively figure out a region of an inspection target in the 3D image and can easily select the region. The endoscope device 1 processes meta-data associated with a still image of the region selected by the user. Therefore, the endoscope device 1 can improve the efficiency of work for processing the meta-data.

First Modified Example of Second Embodiment

A first modified example of the second embodiment of the present invention will be described. The endoscope device 1 displays an information-input window used by a user to input information. The endoscope device 1 processes meta-data on the basis of the information input into the information-input window. The endoscope device 1 includes the CPU 18 shown in FIG. 6.

The display control unit 184 displays an information-input window (user interface) including one or more items on the display unit 5 (user-interface display step). When the content of at least one item included in the one or more items is input into the user interface, the data-processing unit 187 processes meta-data on the basis of the content in the processing step.

A user inputs necessary information for processing meta-data into the information-input window. The endoscope device 1 has a function of a graphical user interface (GUI). The user performs an operation using GUI, thus inputting information (text) into the information-input window. For example, the type of items included in the information-input window is included in a program recorded on the ROM 13.

Figure 12:
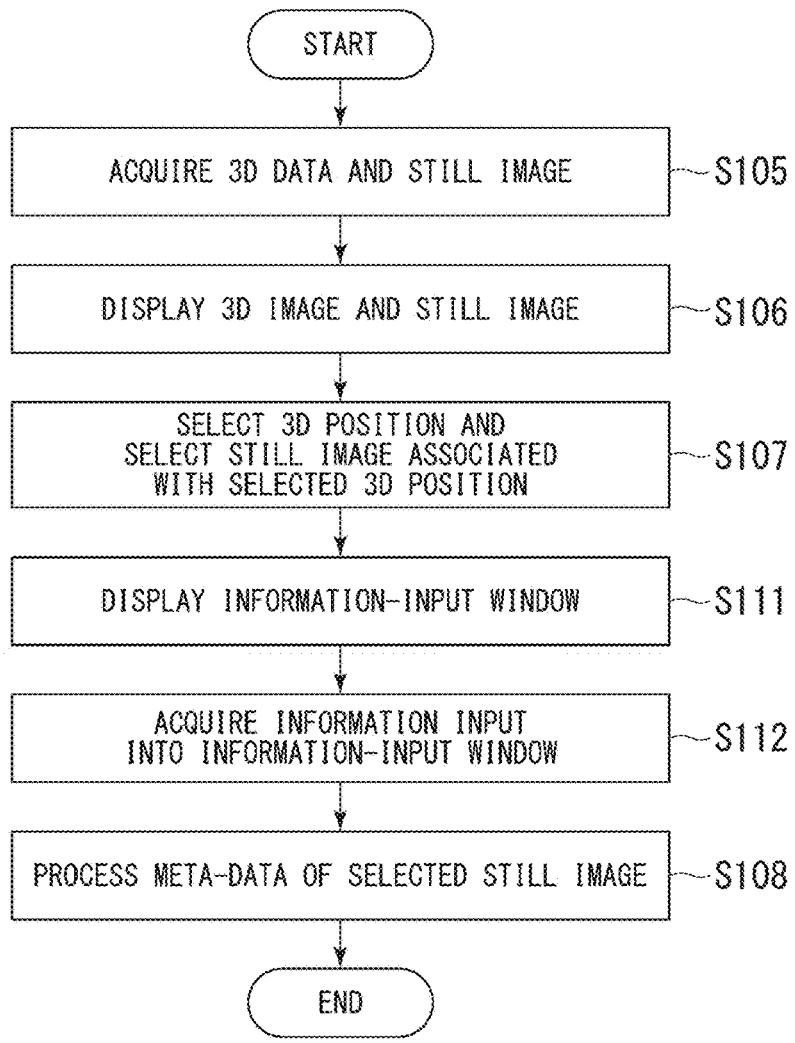
FIG. 12 is a flow chart showing a procedure of data processing in a first modified example of the second embodiment of the present invention.

Data processing in the first modified example of the second embodiment will be described by using FIG. 12. FIG. 12 shows a procedure of the data processing. FIG. 12 shows processing executed after the control unit 180 determines to complete the photography in Step S103 shown in FIG. 7. The same processing as that shown in FIG. 7 will not be described.

After Step S107, the display control unit 184 displays the information-input window on the display unit 5 (Step S111). Step S111 corresponds to the user-interface display step.

Figure 13:
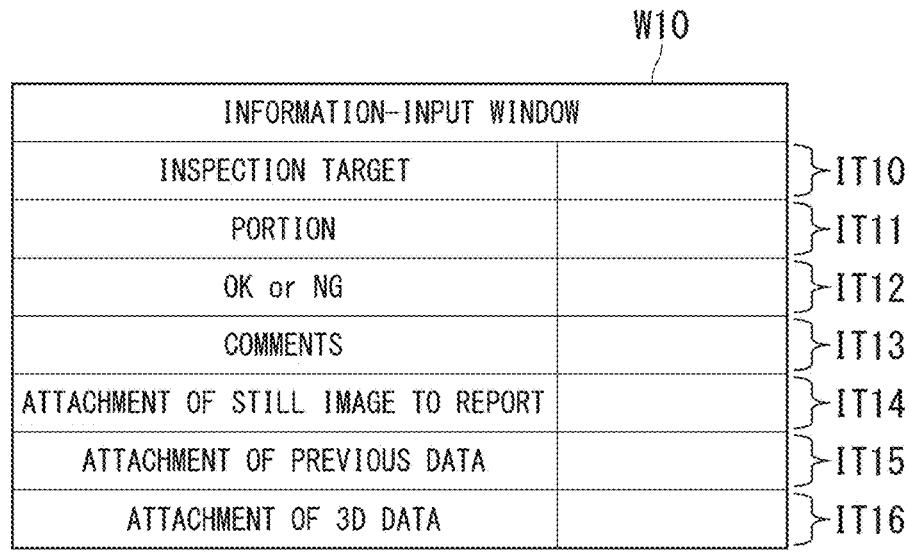
FIG. 13 is a diagram showing an example of an information-input window displayed on the display unit in the first modified example of the second embodiment of the present invention.

FIG. 13 shows an example of the information-input window displayed on the display unit 5 in Step S111. An information-input window W10 shown in FIG. 13 includes an item IT10, an item IT11, an item IT12, an item IT13, an item IT14, an item IT15, and an item IT16.

The item IT10 indicates an inspection target. The inspection target is an aircraft engine, a pipe, a heat exchange tube, or the like. The item IT11 indicates a portion to be inspected. The portion is a nozzle guide vane of an aircraft engine, a straight part of a pipe, a straight part of a heat exchange tube, or the like. The item IT12 indicates an inspection result. For example, the inspection result indicates that there is no abnormality or there is an allowable abnormality. Alternatively, the inspection result indicates that there is an abnormality or there is an unallowable abnormality. The item IT13 indicates comments. The item IT14 indicates whether a still image is attached to a report used for reporting the inspection result. The item IT15 indicates whether data (a still image or the like) generated in a previous inspection are attached to a report. The item IT16 indicates whether the 3D data are attached to a report.

The information-input window W10 does not need to include all the seven items shown in FIG. 13. The information-input window W10 may include one or more of the seven items shown in FIG. 13. The information-input window W10 may include items other than the seven items shown in FIG. 13.

When the information-input window is displayed in Step S111, the name of each item is displayed, but the content of each item has not been input. After the information-input window is displayed, a user inputs the content of each item into the endoscope device 1 by operating the operation unit 4. The information acceptance unit 185 accepts the content input into the endoscope device 1. In this way, the information acceptance unit 185 acquires the information input into the information-input window (Step S112).

After Step S112, the data-processing unit 187 processes meta-data of a still image in Step S108. The still image is associated with the one or more 3D positions selected in Step S107.

For example, the data-processing unit 187 generates a folder in a recording medium in the PC 41 or the memory card 42. The name of the folder includes the name of the inspection target input into the item IT10 or the name of the portion input into the item IT11. The data-processing unit 187 saves the still image in the folder. The data-processing unit 187 records the name (file path) of the folder in the meta-data.

The data-processing unit 187 changes the file name of the still image on the basis of the inspection result input into the item TT12 or the comments input into the item IT13. For example, the data-processing unit 187 changes the file name of the still image to a file name including a predetermined character string. The predetermined character string indicates the content of the inspection result or the comments. The data-processing unit 187 records the changed file name in the meta-data.

Any one of first information and second information is input into the item IT14. The first information indicates that the still image is attached to a report. The second information indicates that a still image is not attached to a report. The data-processing unit 187 records the first information or the second information in the meta-data.

Any one of third information and fourth information is input into the item IT15. The third information indicates that previous data are attached to a report. The fourth information indicates that previous data are not attached to a report. The data-processing unit 187 records the third information or the fourth information in the meta-data.

Any one of fifth information and sixth information is input into the item IT16. The fifth information indicates that the 3D data are attached to a report. The sixth information indicates that the 3D data are not attached to a report. The data-processing unit 187 records the fifth information or the sixth information in the meta-data.

When generation of a report is executed, the first to sixth information recorded in the meta-data is used. When the first information is included in the meta-data, the still image is attached to a report. When the third information is included in the meta-data, previous data are attached to a report. When the fifth information is included in the meta-data, the 3D data are attached to a report.

There is a case in which a still image is associated with one or more 3D positions selected in Step S107 and data have already been recorded in meta-data of the still image. In such a case, the data recorded in the meta-data may be displayed in the information-input window in Step S111. A user may correct the data displayed in the information-input window. The data-processing unit 187 may correct the data included in the meta-data on the basis of information input into the information-input window.

A timing at which Step S111 is executed is not limited to the timing shown in FIG. 12. Step S111 may be executed before any one of Steps S105 to S107 is executed. In such a case, Step S112 may be executed before any one of Steps S105 to S107 is executed.

The content of the information-input window may change in accordance with the number of still images selected in Step S107. For example, when one still image is selected in Step S107, the information-input window including an item used for changing a file name is displayed. When two or more still images are selected in Step S107, it is highly probable that the name of a folder in which the still images are saved is to be changed. Therefore, the information-input window including an item used for changing a folder name is displayed.

Each aspect of the present invention may include the following modified example. The display control unit 184 displays an information-input window including one or more items on the display unit 5 in the user-interface display step (Step S111). When the content of at least one item included in the one or more items is input into the information-input window, the data-processing unit 187 processes meta-data on the basis of the content in the processing step (Step S108).

Each aspect of the present invention may include the following modified example. Meta-data are at least one of the file name of a still image and the name of a folder in which the still image is stored. The meta-data may be one of the file name and the name of the folder. The meta-data may be both the file name and the name of the folder.

Each aspect of the present invention may include the following modified example. Meta-data include data (item IT14) indicating whether a still image is attached to a report.

In the first modified example of the second embodiment, the endoscope device 1 displays an information-input window. A user sets data recorded as meta-data by inputting information into the information-input window. The endoscope device 1 records the set data in the meta-data. The user can efficiently perform work for setting data recorded as meta-data.

Second Modified Example of Second Embodiment

A second modified example of the second embodiment of the present invention will be described. The endoscope device 1 displays, on a 3D image, the position of a camera that acquires a still image. A user selects a camera position instead of selecting a region of the 3D image. The endoscope device 1 selects a still image acquired at the camera position selected by the user and processes meta-data associated with the still image. The endoscope device 1 includes the CPU 18 shown in FIG. 6.

The display control unit 184 displays, on the display unit 5, a 3D image (position information) indicating a positional relationship between two or more positions in a 3D space including an object in the information display step. The two or more positions include a first position at which a first still image included in one or more still images is acquired. The selection unit 186 selects the first position in the position selection step.

Figure 14:
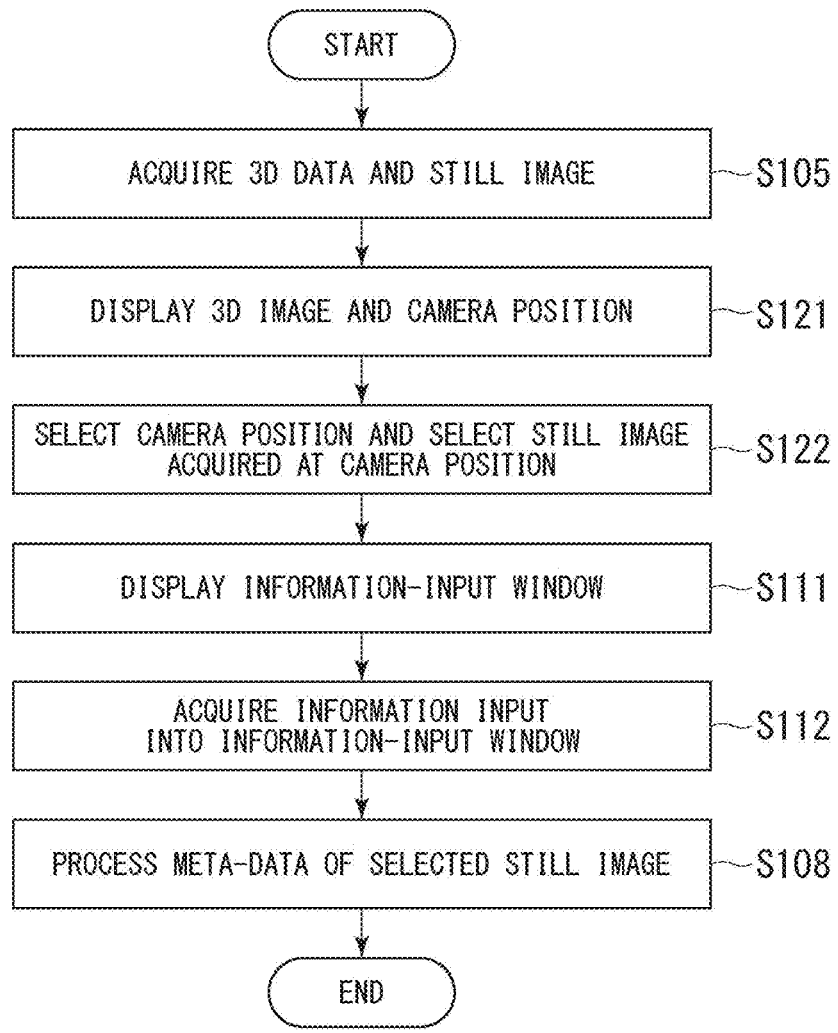
FIG. 14 is a flow chart showing a procedure of data processing in a second modified example of the second embodiment of the present invention.

Data processing in the second modified example of the second embodiment will be described by using FIG. 14. FIG. 14 shows a procedure of the data processing. FIG. 14 shows processing executed after the control unit 180 determines to complete the photography in Step S103 shown in FIG. 7. The same processing as that shown in FIG. 12 will not be described.

After Step S105, the display control unit 184 displays a 3D image on the display unit 5 on the basis of the 3D data and displays camera positions of one or more still images on the display unit 5 (Step S121). Step S121 corresponds to the information display step. The display control unit 184 superimposes information indicating a camera coordinate of each still image on the 3D image, thus displaying the camera position of the still image. The 3D data include 3D coordinates of two or more points including one or more camera positions (first positions) of still images. The display control unit 184 does not need to display a still image in Step S121.

After Step S121, the selection unit 186 selects at least one of one or more camera positions included in the 3D data. Furthermore, the selection unit 186 selects one or more still images associated with the one or more camera positions (Step S122). Step S122 corresponds to the position selection step. After Step S122, Step S111 is executed.

Figure 15:
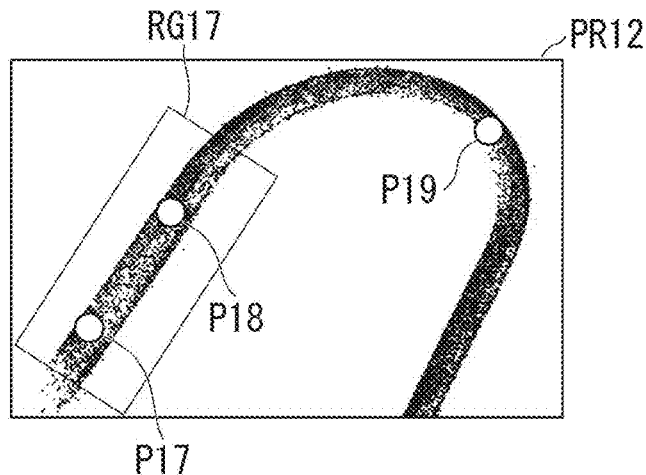
FIG. 15 is a diagram showing an example of an image displayed on a display unit in the second modified example of the second embodiment of the present invention.

FIG. 15 shows an example of an image displayed on the display unit 5 in Step S121. The display control unit 184 displays a 3D image PR12, a point P17, a point P18, and a point P19 on the display unit 5. Each point is superimposed on the 3D image PR12. A predetermined mark is displayed at the position of each point. Each point corresponds to a camera coordinate of a still image.

A user selects a region RG17 shown in FIG. 15 by operating the operation unit 4. Specifically, the user inputs a selection instruction for selecting a position on the 3D image PR12 into the endoscope device 1 by operating the operation unit 4. The information acceptance unit 185 accepts the selection instruction. The selection instruction indicates a position on the 3D image PR12.

The selection unit 186 identifies a 3D position corresponding to the position indicated by the selection instruction. In the example shown in FIG. 15, the selection unit 186 identifies a 3D position included in the region RG17 on the basis of the selection instruction. The region RG17 has a depth in the visual line direction. The 3D data include a camera coordinate. Since a still image is the same as a frame, the 3D data include the camera coordinate of the still image. The selection unit 186 identifies a camera coordinate of a still image included in the region RG17. The selection unit 186 selects a still image associated with the identified camera coordinate. In the example shown in FIG. 15, the point P17 and the point P18 are included in the region RG17. Therefore, the selection unit 186 selects the point P17 and the point P18. The selection unit 186 selects a still image associated with each point.

The display control unit 184 displays the region RG17 on the display unit 5. In the example shown in FIG. 15, the display control unit 184 displays a box indicating the region RG17 on the display unit 5. In this way, the display control unit 184 displays the one or more camera positions selected by the selection unit 186 on the display unit 5. A user can figure out the position of the selected region RG17. The user may remember the position of the region RG17 without the display control unit 184 displaying the region RG17.

Step S111 and Step S112 do not need to be executed. After Step S122 is executed, Step S108 may be executed without executing Step S111 or Step S112.

The display control unit 184 may execute Step S106 shown in FIG. 7 instead of Step S121. In other words, the display control unit 184 may display a 3D image and a still image on the display unit 5. Alternatively, the display control unit 184 may display a 3D image, a still image, and a camera position. A user may select a still image by operating the operation unit 4. The selection unit 186 may select the still image selected by the user. Selection of a still image means selection of a camera position.

Each aspect of the present invention may include the following modified example. Two or more positions in a 3D space including an object include a first position (the point P17 and the point P18) at which a first still image included in one or more still images is acquired. The selection unit 186 selects the first position in the position selection step (Step S122).

In the second modified example of the second embodiment, the endoscope device 1 selects a still image associated with a camera position selected by a user and processes meta-data associated with the still image. Therefore, the endoscope device 1 can improve the efficiency of work for processing the meta-data.

Third Modified Example of Second Embodiment

A third modified example of the second embodiment of the present invention will be described. The endoscope device 1 displays a 3D image. At this time, a still image and a camera position are not displayed. A user selects a region of the 3D image. The endoscope device 1 selects a still image acquired at a camera position in the region selected by the user and processes meta-data associated with the still image. The endoscope device 1 includes the CPU 18 shown in FIG. 6.

Figure 16:
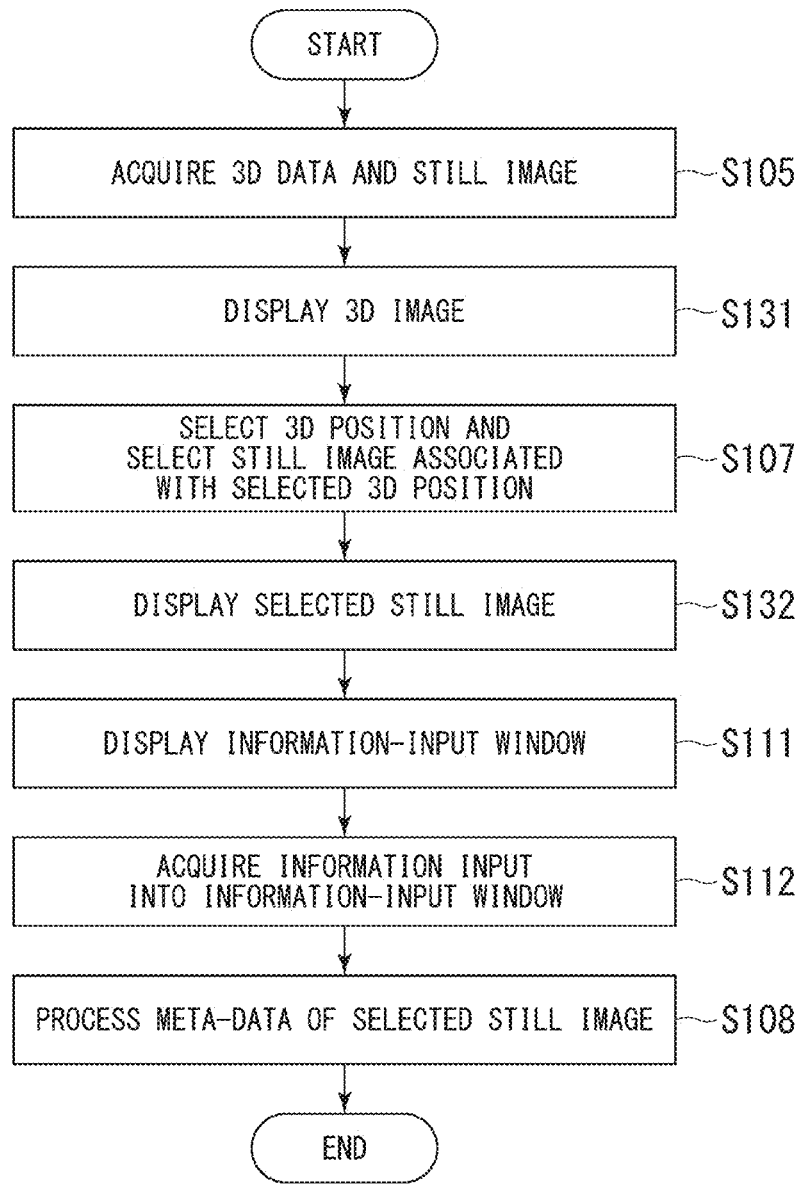
FIG. 16 is a flow chart showing a procedure of data processing in a third modified example of the second embodiment of the present invention.

Data processing in the third modified example of the second embodiment will be described by using FIG. 16. FIG. 16 shows a procedure of the data processing. FIG. 16 shows processing executed after the control unit 180 determines to complete the photography in Step S103 shown in FIG. 7. The same processing as that shown in FIG. 12 will not be described.

After Step S105, the display control unit 184 displays a 3D image on the display unit 5 on the basis of the 3D data (Step S131). Step S131 corresponds to the information display step.

After Step S131, the selection unit 186 selects at least one of the two or more points included in the 3D data in Step S107. In this way, the selection unit 186 selects one or more 3D positions. Furthermore, the selection unit 186 selects one or more still images associated with the one or more 3D positions.

After Step S107, the display control unit 184 displays the one or more still images selected in Step S107 on the display unit 5 (Step S132). After Step S132, Step S111 is executed.

Figure 17:
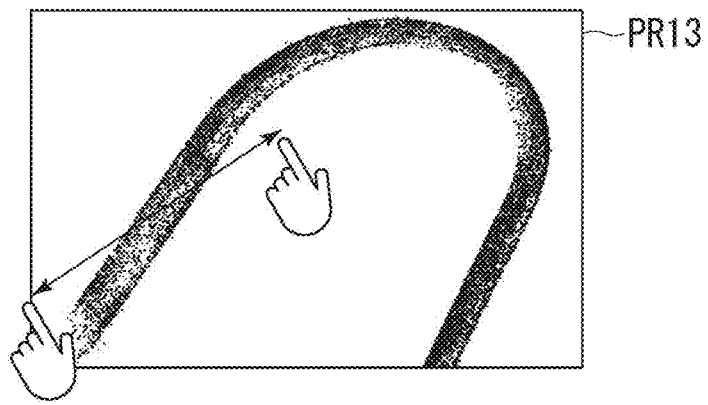
FIG. 17 is a diagram showing an example of an image displayed on a display unit in the third modified example of the second embodiment of the present invention.

FIG. 17 shows an example of an image displayed on the display unit 5 in Step S131. The display control unit 184 displays a 3D image PR13 on the display unit 5. The display control unit 184 does not display a still image and a camera position on the display unit 5.

A user selects a region on the 3D image PR13 by operating the operation unit 4. Specifically, the user inputs a selection instruction for selecting a position on the 3D image PR13 into the endoscope device 1 by operating the operation unit 4. The information acceptance unit 185 accepts the selection instruction. The selection instruction indicates a position on the 3D image PR13.

The selection unit 186 identifies a 3D position corresponding to the position indicated by the selection instruction. Thereafter, the selection unit 186 selects a still image associated with the 3D position by using the method in the second embodiment.

Figure 18:
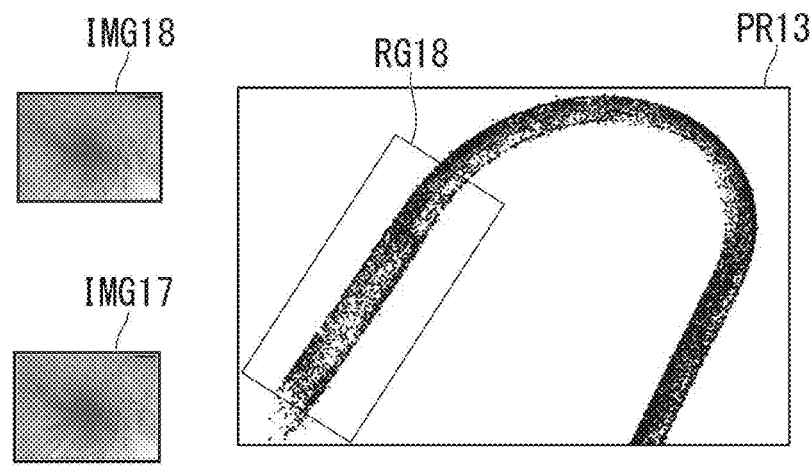
FIG. 18 is a diagram showing an example of an image displayed on the display unit in the third modified example of the second embodiment of the present invention.

FIG. 18 shows an example of an image displayed on the display unit 5 in Step S132. The display control unit 184 displays a 3D image PR13, a region RG18, a still image IMG17, and a still image IMG18 on the display unit 5.

The region RG18 includes the 3D position selected in Step S107. Each of the still image IMG17 and the still image IMG18 is a still image acquired at a camera position in the region RG18. The display control unit 184 highlights the still image IMG17 and the still image IMG18. For example, the display control unit 184 displays a box around the still image IMG17 and the still image IMG18.

Step S111 and Step S112 do not need to be executed. After Step S132 is executed, Step S108 may be executed without executing Step S111 or Step S112.

In the third modified example of the second embodiment, the endoscope device 1 does not display a still image and a camera position. When a region on the 3D image is selected by a user, the endoscope device 1 displays a still image acquired at a camera position in the region. The user can easily check a still image acquired at the position selected in Step S107.

Fourth Modified Example of Second Embodiment

A fourth modified example of the second embodiment of the present invention will be described. The endoscope device 1 displays a 3D image without displaying a still image. A user selects a region of the 3D image. The endoscope device 1 displays at least one still image acquired at camera positions in the region selected by the user. The user selects a still image included in the at least one still image. The endoscope device 1 processes meta-data associated with the selected still image. The endoscope device 1 includes the CPU 18 shown in FIG. 6.

The display control unit 184 displays, on the display unit 5, at least one still image associated with at least one position selected in the position selection step among one or more still images (image display step). After the at least one still image is displayed, the selection unit 186 selects a still image included in the at least one still image (image selection step). The data-processing unit 187 processes meta-data associated with the selected still image in the processing step.

Figure 19:
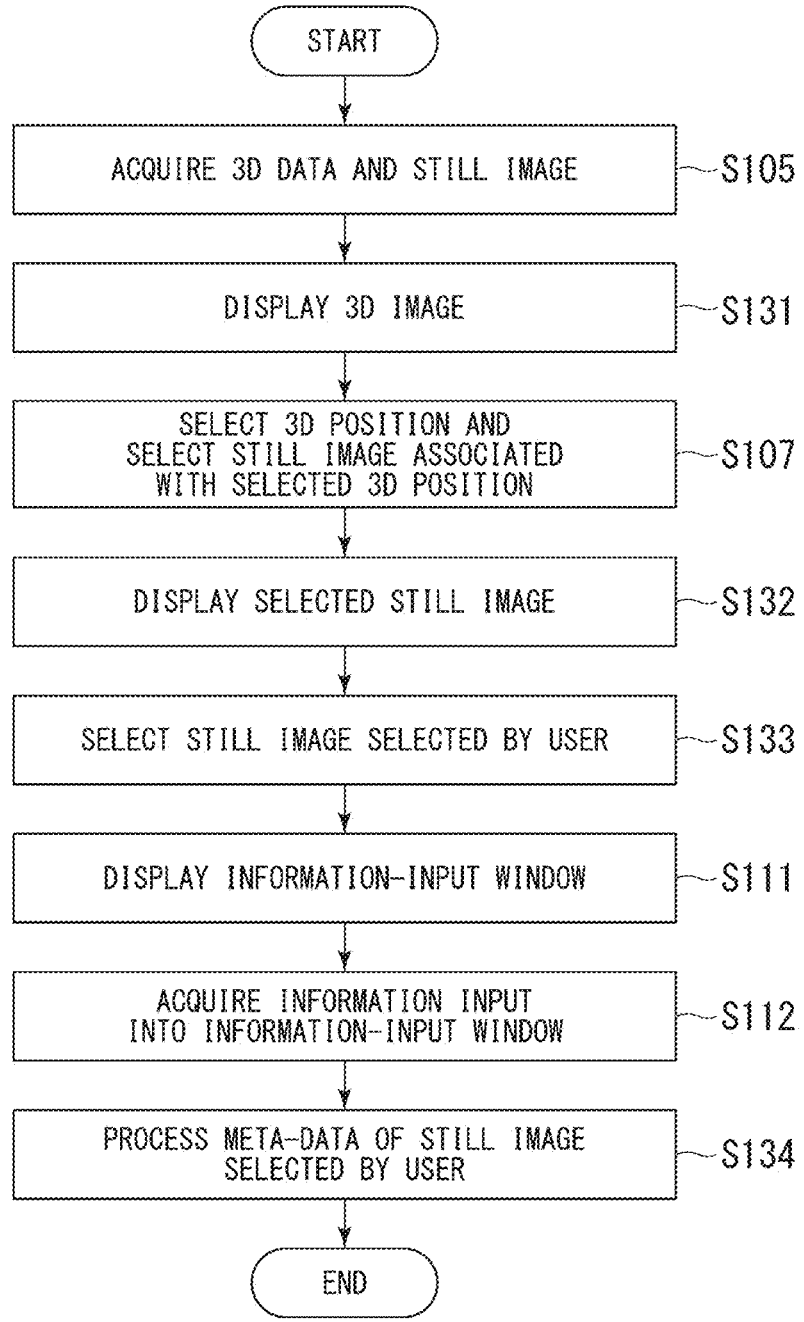
FIG. 19 is a flow chart showing a procedure of data processing in a fourth modified example of the second embodiment of the present invention.

Data processing in the fourth modified example of the second embodiment will be described by using FIG. 19. FIG. 19 shows a procedure of the data processing. FIG. 19 shows processing executed after the control unit 180 determines to complete the photography in Step S103 shown in FIG. 7. The same processing as that shown in FIG. 16 will not be described.

After the still image is displayed in Step S132, a user selects at least one still image included in the one or more still images displayed in Step S132 by operating the operation unit 4. Specifically, the user inputs a selection instruction for selecting a still image into the endoscope device 1 by operating the operation unit 4. The information acceptance unit 185 accepts the selection instruction. The selection instruction indicates a still image. The selection unit 186 selects the still image indicated by the selection instruction (Step S133). Step S133 corresponds to the image selection step. After Step S133, Step S111 is executed.

Figure 20:
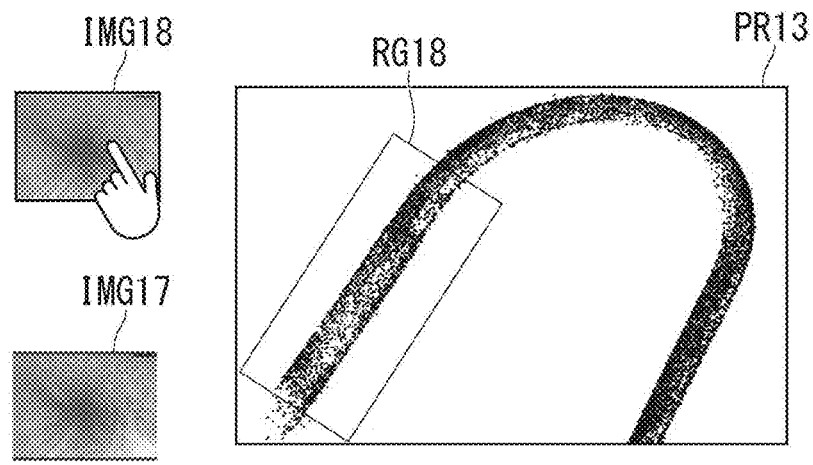
FIG. 20 is a diagram showing an example of an image displayed on a display unit in the fourth modified example of the second embodiment of the present invention.

FIG. 20 shows an example of an image displayed on the display unit 5 in Step S132. The display control unit 184 displays a 3D image PR13, a region RG18, a still image IMG17, and a still image IMG18 on the display unit 5. The same parts as those shown in FIG. 18 will not be described.

After the still image IMG17 and the still image IMG18 are displayed, a user selects the still image IMG18 by operating the operation unit 4. The display control unit 184 highlights the still image IMG18. For example, the display control unit 184 displays a box around the still image IMG18.

After Step S112, the data-processing unit 187 processes meta-data of the still image selected in Step S133 (Step S134). Step S134 corresponds to the data-processing step. When Step S134 is executed, the data processing is completed.

Step S111 and Step S112 do not need to be executed. After Step S132 is executed, Step S134 may be executed without executing Step S111 or Step S112.

Each aspect of the present invention may include the following modified example. The selection unit 186 selects at least one position in the position selection step (Step S107). The display control unit 184 displays at least one still image associated with the at least one position on the display unit 5 in the image display step (Step S132). After the at least one still image is displayed, the selection unit 186 selects an arbitrary still image from the at least one still image in the image selection step (Step S133). The data-processing unit 187 processes meta-data associated with the selected still image in the processing step (Step S134).

In the fourth modified example of the second embodiment, when a region on a 3D image is selected by a user, the endoscope device 1 displays a still image acquired at a camera position in the region. When a still image is selected by the user, the endoscope device 1 processes meta-data associated with the still image. Therefore, the endoscope device 1 can improve the efficiency of work for processing the meta-data. The user can easily select a preferred still image.

Fifth Modified Example of Second Embodiment

A fifth modified example of the second embodiment of the present invention will be described. The endoscope device 1 executes batch processing of meta-data generated in two or more inspections. Alternatively, the endoscope device 1 executes batch processing of meta-data of two or more inspection targets. The endoscope device 1 includes the CPU 18 shown in FIG. 6.

There is a case in which an inspection target is periodically inspected and 3D data and meta-data are generated in each inspection. First 3D data and first meta-data are generated in a first inspection. Second 3D data and second meta-data are generated in a second inspection after the first inspection. The data-processing unit 187 executes batch processing of the first meta-data and the second meta-data.

There is a case in which two or more inspection targets are inspected and 3D data and meta-data are generated for each inspection target. For example, two heat exchange tubes are sequentially inspected, and 3D data and meta-data of each heat exchange tube are generated. Alternatively, two access ports of an aircraft engine are sequentially inspected, and 3D data and meta-data of each access port are generated. First 3D data and first meta-data are generated in an inspection of a first inspection target. Second 3D data and second meta-data are generated in an inspection of a second inspection target different from the first inspection target. The data-processing unit 187 executes batch processing of the first meta-data and the second meta-data.

A still image does not need to be associated with specific 3D coordinates included in the 3D data. A still image may be associated with typical 3D coordinates included in the 3D data. A still image may be associated with all the 3D coordinates included in the 3D data.

In the fifth modified example of the second embodiment, the endoscope device 1 executes batch processing of meta-data generated in two or more inspections or meta-data of two or more inspection targets. Therefore, the endoscope device 1 can improve efficiency of work for processing meta-data.

Third Embodiment

A third embodiment of the present invention will be described. The endoscope device 1 displays a 3D image and displays a tree structure of folders. A user selects an item on the 3D image and performs an operation using a GUI. In this way, the user moves the item to a predetermined folder. In addition, the user performs an operation using a GUI in the tree structure, thus editing various kinds of data included in meta-data. The endoscope device 1 includes the CPU 18 shown in FIG. 6.

Figure 21:
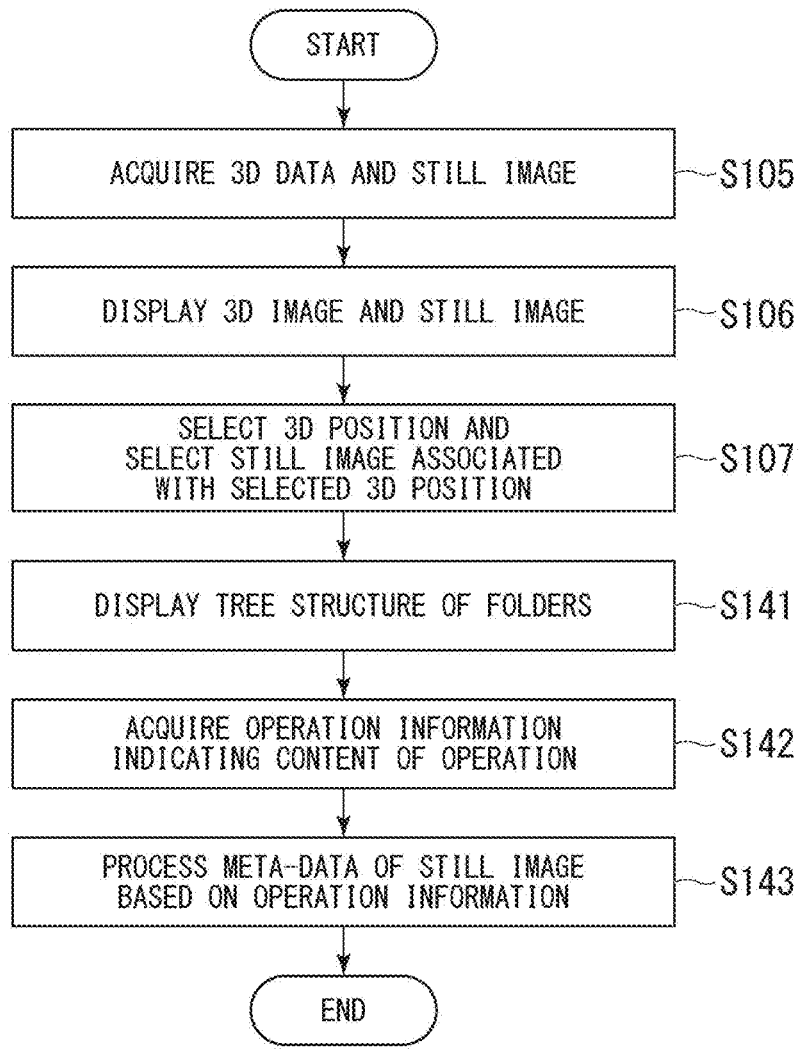
FIG. 21 is a flow chart showing a procedure of data processing in a third embodiment of the present invention.

Data processing in the third embodiment will be described by using FIG. 21. FIG. 21 shows a procedure of the data processing. FIG. 21 shows processing executed after the control unit 180 determines to complete the photography in Step S103 shown in FIG. 7. The same processing as that shown in FIG. 7 will not be described.

After Step S107, the display control unit 184 displays a tree structure of folders on the display unit 5 (Step S141).

After the tree structure is displayed in Step S141, a user performs a predetermined operation by operating the operation unit 4. Specifically, the user inputs operation information indicating the content of the operation into the endoscope device 1 by operating the operation unit 4. The information acceptance unit 185 accepts the operation information (Step S142).

After Step S142, the data-processing unit 187 processes meta-data of the still image selected in Step S107. At this time, the data-processing unit 187 processes the meta-data on the basis of the operation information accepted in Step S142 (Step S143). Step S143 corresponds to the data-processing step. When Step S143 is executed, the data processing is completed.

Figure 22:
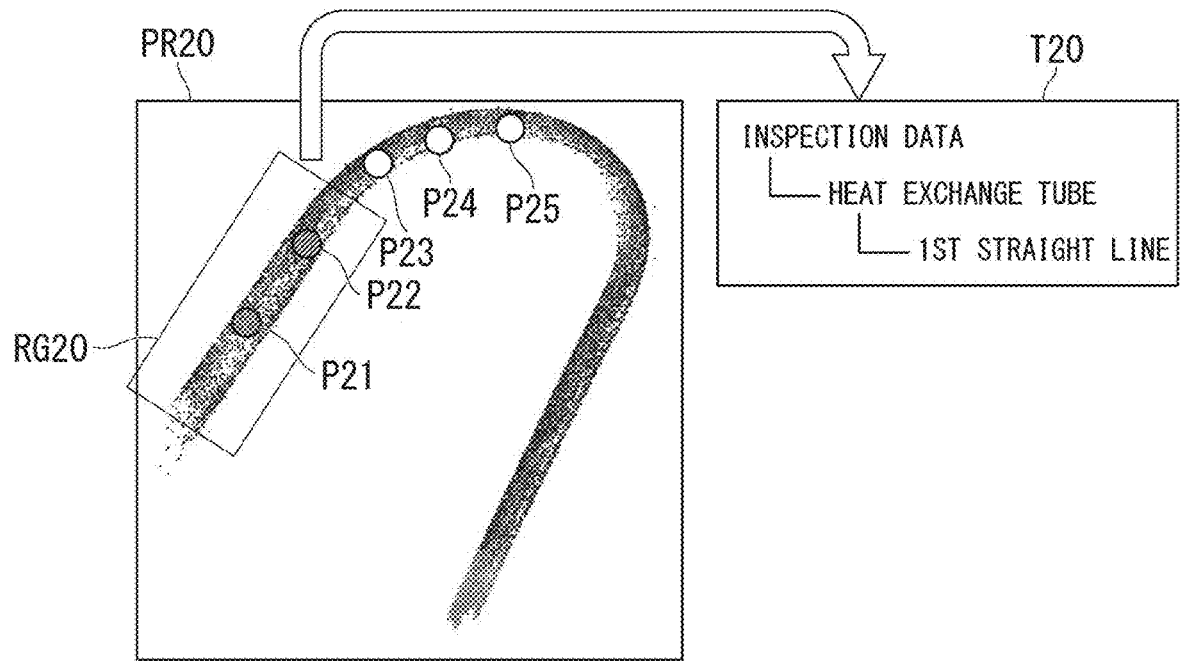
FIG. 22 is a diagram showing an example of an image displayed on a display unit in the third embodiment of the present invention.

FIG. 22 shows an example of an image displayed on the display unit 5 in Step S141. The display control unit 184 displays a 3D image PR20 and a tree structure T20 on the display unit 5. The display control unit 184 displays a still image on the display unit 5, but the still image is not shown in FIG. 22.

The tree structure T20 indicates a hierarchical structure of folders generated in advance in a recording medium in the PC 41 or the memory card 42. The tree structure T20 indicates a hierarchical structure of an "inspection data" folder, a "heat exchange tube" folder, and a "1st straight line" folder. The "inspection data" folder is the top folder. The "heat exchange tube" folder is located under the "inspection data" folder. The "1st straight line" folder is located under the "heat exchange tube" folder. The name of each folder is displayed on the tree structure T20.

The display control unit 184 displays a point P21, a point P22, a point P23, a point P24, and a point P25 on the display unit 5. Each point is superimposed on the 3D image PR20. A predetermined mark is displayed at the position of each point. Each point corresponds to a camera coordinate of a still image. When an operation using a GUI is performed, each point functions as an item that moves in accordance with the operation.

A user selects a region RG20 shown in FIG. 22 by operating the operation unit 4. The selection unit 186 selects the point P21 and the point P22 included in the region RG20 by using the method in the second embodiment. The display control unit 184 changes the color of the point P21 and the point P22 to a different color from that of the point P23, the point P24, and the point P25.

The user performs a drag-and-drop operation by operating the operation unit 4. In this way, the user moves the point P21 and the point P22 to a predetermined folder in the tree structure T20.

Figure 23:
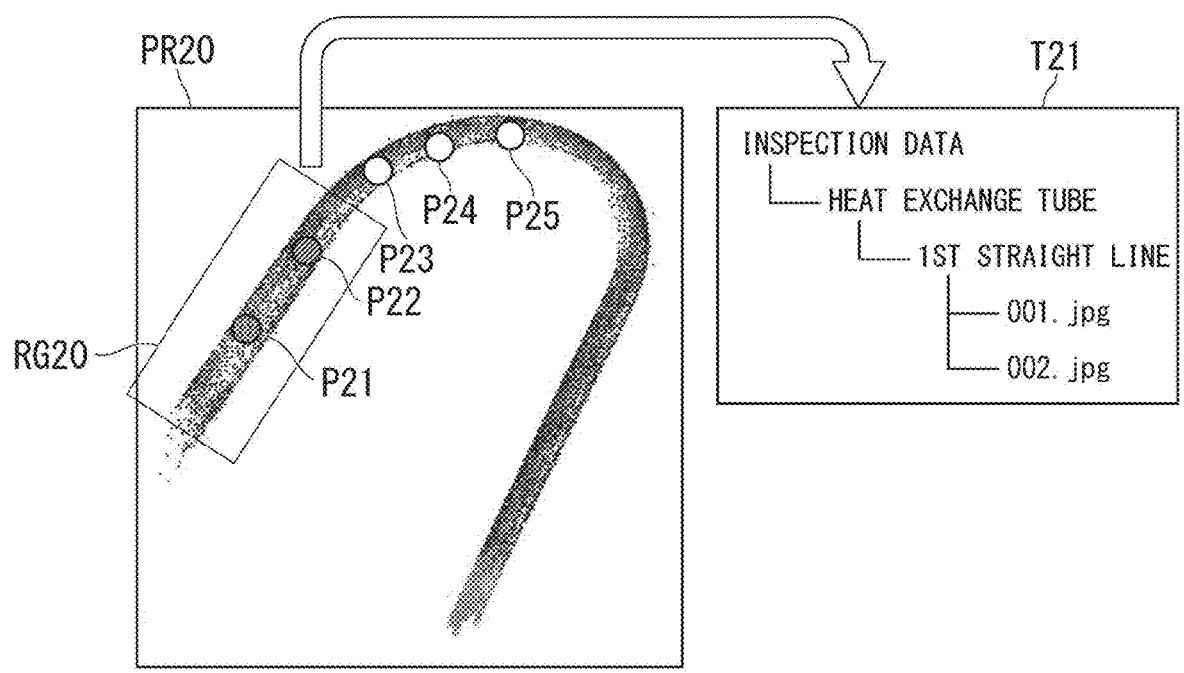
FIG. 23 is a diagram showing an example of an image displayed on the display unit in the third embodiment of the present invention.

FIG. 23 shows an example of an image displayed on the display unit 5 in Step S143. The display control unit 184 displays a 3D image PR20 and a tree structure T21 on the display unit 5. The same parts as those shown in FIG. 22 will not be described.

A user moves the point P21 and the point P22 to the "1st straight line" folder on the tree structure T21 by performing a drag-and-drop operation. At this time, the data-processing unit 187 saves a still image associated with each of the point P21 and the point P22 to the "1st straight line" folder. The data-processing unit 187 records the name (file path) of the folder in meta-data. In the example shown in FIG. 23, a still image having a file name "001.jpg" and a still image having a file name "002.jpg" move to the "1st straight line" folder. The point P21 corresponds to a camera coordinate of the still image having the file name "001.jpg." The point P22 corresponds to a camera coordinate of the still image having the file name "002.jpg." The display control unit 184 updates the tree structure T20 and displays the tree structure T21 on the display unit 5.

Figure 24:
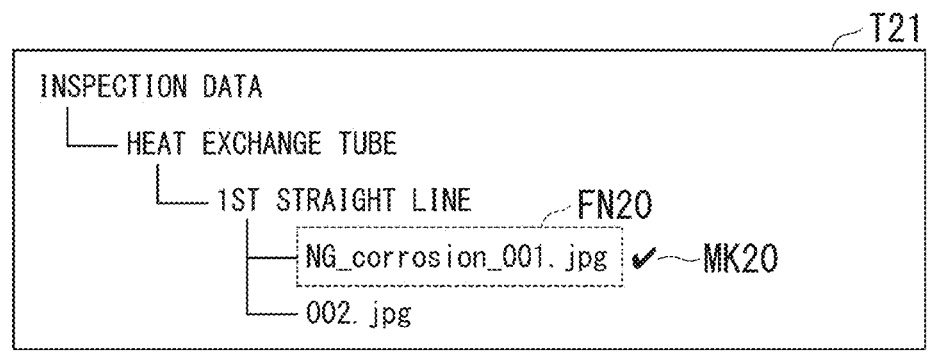
FIG. 24 is a diagram showing an example of a tree structure displayed on the display unit in the third embodiment of the present invention.

A user may perform a predetermined operation in the tree structure T21. FIG. 24 shows an example of a tree structure displayed on the display unit 5 when the predetermined operation is performed by the user. For example, the user changes a file name FN20 displayed in the tree structure T21. In the example shown in FIG. 24, the data-processing unit 187 changes the file name of the still image from "001.jpg" to "NG_corrosion_001.jpg" and changes meta-data of the still image.

For example, a user performs a predetermined operation at the position at which the file name FN20 is shown. At this time, the display control unit 184 displays a mark MK20. In addition, the data-processing unit 187 records, in the meta-data, information indicating that the still image is attached to a report.

A user may perform an operation of deleting a still image in the tree structure T20 or the tree structure T21. At this time, the data-processing unit 187 may delete the still image and may delete meta-data of the still image.

Step S121 and Step S122 shown in FIG. 14 may be executed instead of Step S106 and Step S107.

In the third embodiment, a user can easily edit various kinds of data included in meta-data by performing an operation using a GUI.

Modified Example of Third Embodiment

A modified example of the third embodiment of the present invention will be described. After meta-data are processed, the endoscope device 1 determines whether the content of the meta-data is consistent to a positional relationship between two or more point included in the 3D data. If the content of the meta-data is not consistent to the positional relationship, the endoscope device 1 outputs a warning.

Figure 25:
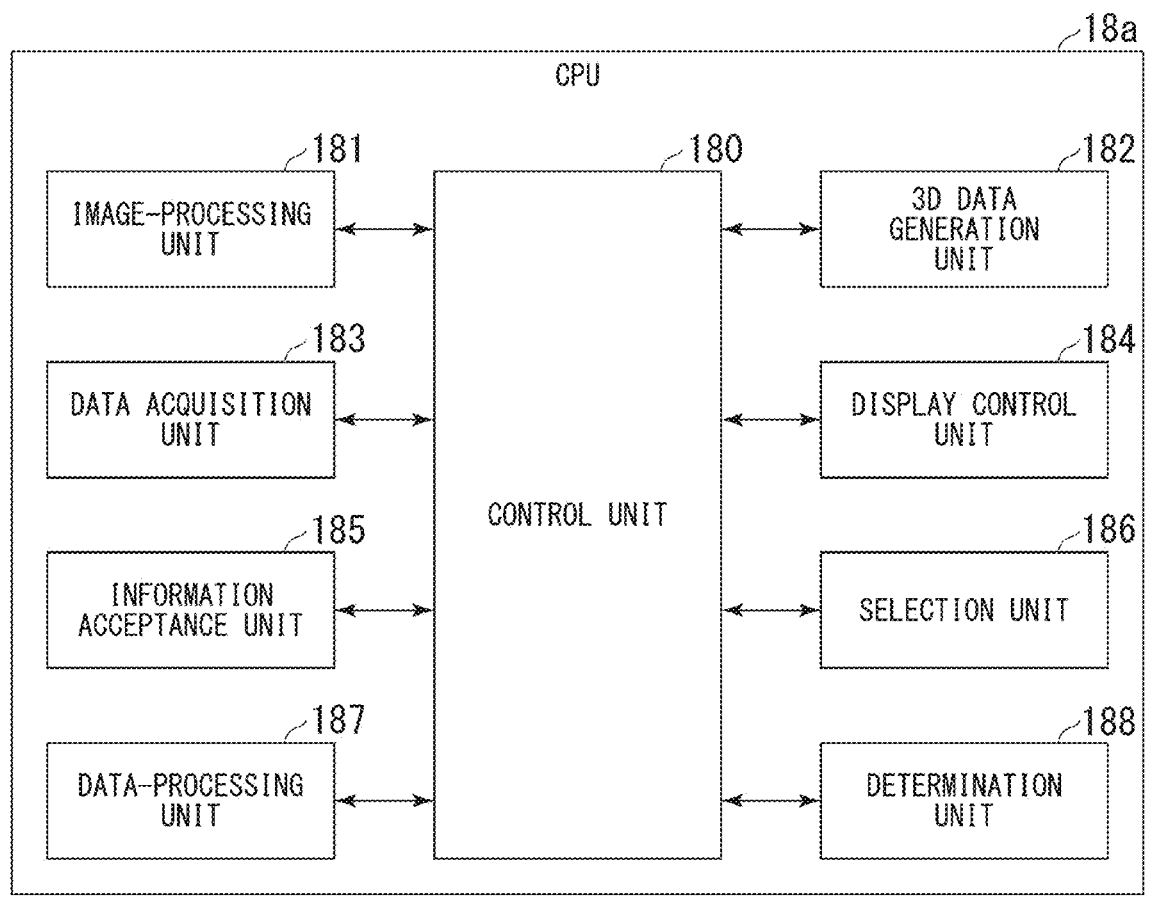
FIG. 25 is a block diagram showing a functional configuration of a CPU included in an endoscope device according to a modified example of the third embodiment of the present invention.

The CPU 18 shown in FIG. 6 is changed to a CPU 18a shown in FIG. 25. FIG. 25 shows a functional configuration of the CPU 18a. The CPU 18a has functional units including a control unit 180, an image-processing unit 181, a 3D data generation unit 182, a data acquisition unit 183, a display control unit 184, an information acceptance unit 185, a selection unit 186, a data-processing unit 187, and a determination unit 188. At least one of the blocks shown in FIG. 25 may be constituted by a different circuit from the CPU 18a. The same configuration as that shown in FIG. 6 will not be described.

Each unit shown in FIG. 25 may be constituted by at least one of a processor and a logic circuit. Each unit shown in FIG. 25 may include one or a plurality of processors. Each unit shown in FIG. 25 may include one or a plurality of logic circuits.

The selection unit 186 selects at least two positions included in two or more positions in a 3D space including an object in the position selection step. The data-processing unit 187 processes meta-data on the basis of the at least two positions in the processing step. The determination unit 188 determines whether the content of the meta-data processed in the processing step is consistent to a positional relationship between the at least two positions (determination step). When the determination unit 188 determines that the content is not consistent to the positional relationship, the display control unit 184 outputs a warning (warning output step).

The display control unit 184 functions as a warning output unit and displays a warning on the display unit 5. A method of outputting a warning is not limited to this. For example, the warning output unit of the CPU 18a may output sound data to a speaker and may cause the speaker to generate a sound indicating a warning.

Figure 26:
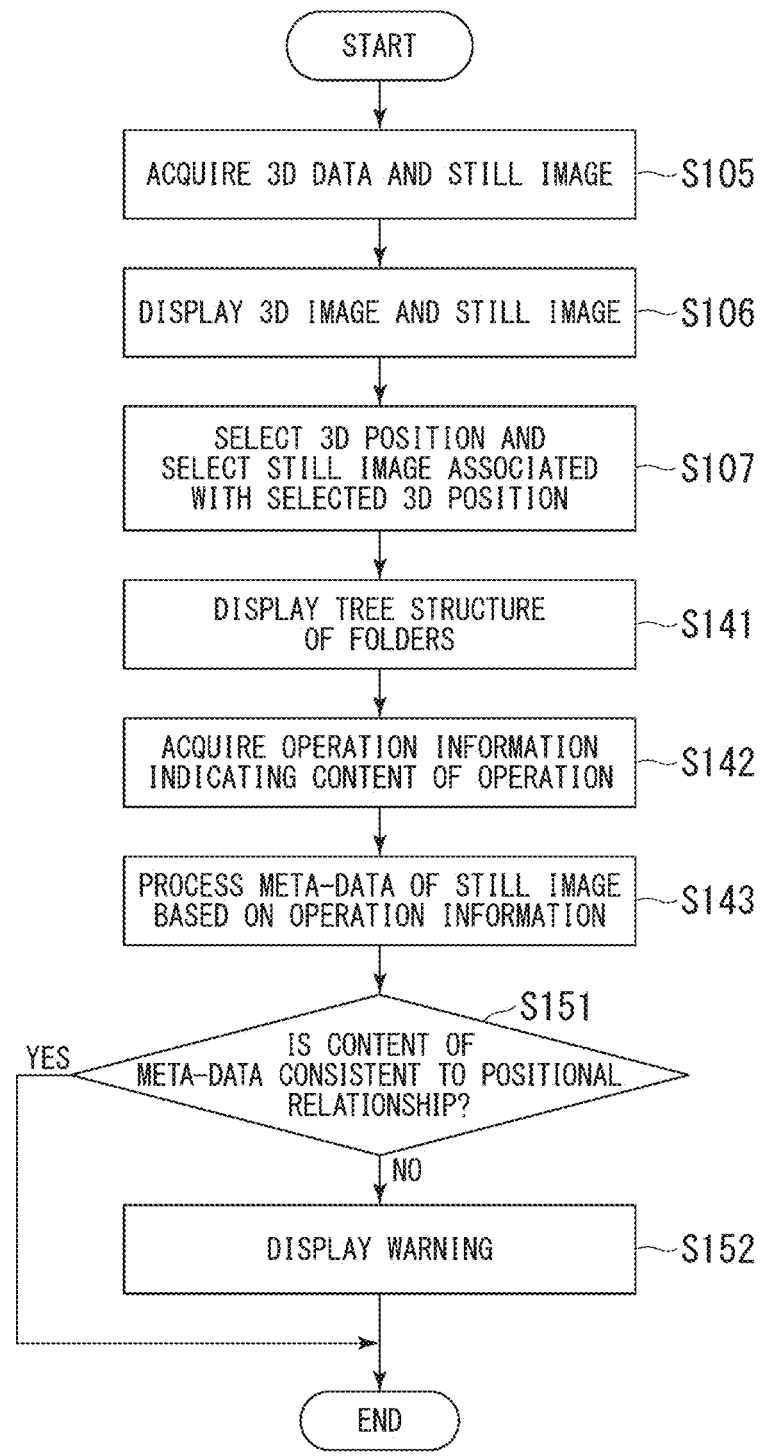
FIG. 26 is a flow chart showing a procedure of data processing in the modified example of the third embodiment of the present invention.

Data processing in the modified example of the third embodiment will be described by using FIG. 26. FIG. 26 shows a procedure of the data processing. FIG. 26 shows processing executed after the control unit 180 determines to complete the photography in Step S103 shown in FIG. 7. The same processing as that shown in FIG. 21 will not be described.

The selection unit 186 selects at least two of the two or more points included in the 3D data in Step S107. In this way, the selection unit 186 selects two or more 3D positions. Furthermore, the selection unit 186 selects two or more still images associated with the two or more 3D positions.

The data-processing unit 187 processes meta-data of the two or more still images in Step S143. The two or more still images are associated with the two or more 3D positions selected in Step S107.

After Step S143, the determination unit 188 determines whether the content of the meta-data is consistent to the positional relationship between the two or more points included in the 3D data (Step S151). Step S151 corresponds to the determination step.

When the determination unit 188 determines that the content of the meta-data is consistent to the positional relationship in Step S151, the data processing is completed. When the determination unit 188 determines that the content of the meta-data is not consistent to the positional relationship in Step S151, the display control unit 184 displays a warning on the display unit 5 (Step S152). Step S152 corresponds to the warning output step. When Step S152 is executed, the data processing is completed.

Figure 27:
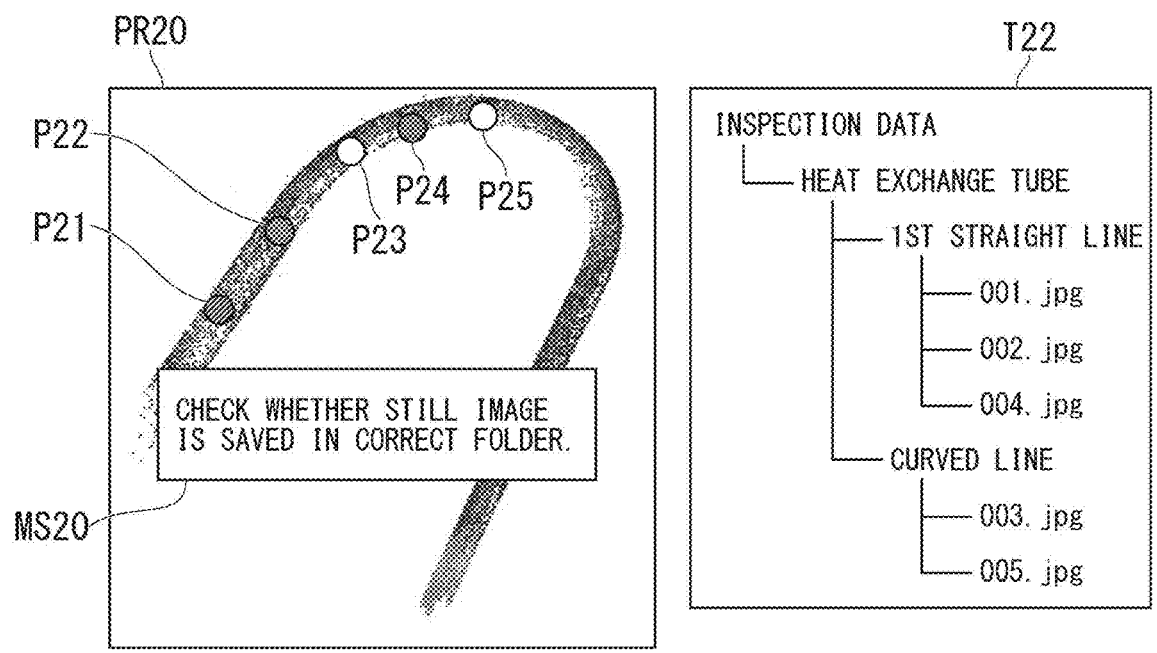
FIG. 27 is a diagram showing an example of an image displayed on a display unit in the modified example of the third embodiment of the present invention.

FIG. 27 shows an example of an image displayed on the display unit 5 in Step S152. The display control unit 184 displays a 3D image PR20 and a tree structure T22 on the display unit 5. The same parts as those shown in FIG. 22 will not be described.

The tree structure T22 indicates a hierarchical structure of an "inspection data" folder, a "heat exchange tube" folder, a "1st straight line" folder, and a "curved line" folder. The "curved line" folder is located under the "heat exchange tube" folder.

A user moves a point P21 and a point P22 to the "1st straight line" folder on the tree structure T22. Furthermore, the user moves a point P24 to the "1st straight line" folder. The data-processing unit 187 saves a still image associated with each of the point P21, the point P22, and the point P24 in the "1st straight line" folder. The data-processing unit 187 records the name (file path) of the folder in meta-data.

The user moves a point P23 and a point P25 to the "curved line" folder on the tree structure T22. The data-processing unit 187 saves a still image associated with each of the point P23 and the point P25 in the "curved line" folder. The data-processing unit 187 records the name (file path) of the folder in meta-data.

For example, the point P21 is close to the entrance of a subject, and the point P25 is far from the entrance. The still image associated with the point P24 is saved in the "1st straight line" folder. Since the point P24 is not in a straight part of the subject but is in a curved part, the still image needs to be saved in the "curved line" folder. In the example shown in FIG. 27, the determination unit 188 determines that the content of the meta-data is not consistent to the positional relationship. Hereinafter, a still image associated with each point will be referred to as "a still image at each point."

For example, the determination unit 188 executes the determination in Step S151 on the basis of the distance from the entrance of the subject to each point. The point P22 is the closest to the entrance among the point P22, the point P23, and the point P24. The point P23 is the second closest to the entrance, and the point P24 is the farthest from the entrance. The still image at the point P23 is saved in a different folder from that in which the still image at the point P22 is saved. The still image at the point P24 is saved in the same folder as that in which the still image at the point P22 is saved. The still image at the point P24 needs to be saved in the folder in which the still image at the point P23 is saved. Therefore, the determination unit 188 determines that the content of the meta-data is not consistent to the positional relationship.

The determination unit 188 may execute the determination in Step S151 on the basis of the distance between two camera positions. In the example shown in FIG. 27, the distance between the point P22 and the point P23 is less than the distance between the point P22 and the point P24. The determination unit 188 determines that the content of the meta-data is not consistent to the positional relationship by executing similar processing to that described above.

The display control unit 184 displays a message MS20 on the display unit 5. The message MS20 encourages a user to confirm whether a still image is saved in a correct folder.

Step S121 and Step S122 shown in FIG. 14 may be executed instead of Step S106 and Step S107.

Each aspect of the present invention may include the following modified example. Two or more still images are used as one or more still images generated by photographing an object. The selection unit 186 selects at least two positions included in two or more positions in a 3D space including an object in the position selection step (Step S107). The data-processing unit 187 processes meta-data on the basis of the at least two positions in the processing step (Step S143). The determination unit 188 determines whether the content of the meta-data processed in the processing step is consistent to a positional relationship between the at least two positions by executing the determination step (Step S151). When the determination unit 188 determines that the content is not consistent to the positional relationship, the display control unit 184 outputs a warning in the warning output step (Step S152).

When the content of meta-data is not consistent to the positional relationship in the modified example of the third embodiment, the endoscope device 1 outputs a warning. Therefore, a user can reliably edit various kinds of data included in the meta-data.

Fourth Embodiment

A fourth embodiment of the present invention will be described. The endoscope device 1 divides the two or more points included in the 3D data into two or more regions (segments) by executing segmentation processing. When a user selects one of the two or more segments, the endoscope device 1 processes meta-data associated with a still image of the segment. The endoscope device 1 includes the CPU 18 shown in FIG. 6.

The image-processing unit 181 divides (classifies) two or more positions in a 3D space including an object into two or more segments (groups) (division step). The image-processing unit 181 functions as a division unit. The selection unit 186 selects one of the two or more segments and selects a position included in the selected segment in the position selection step. The display control unit 184 displays the two or more segments on the display unit 5 (group display step).

Figure 28:
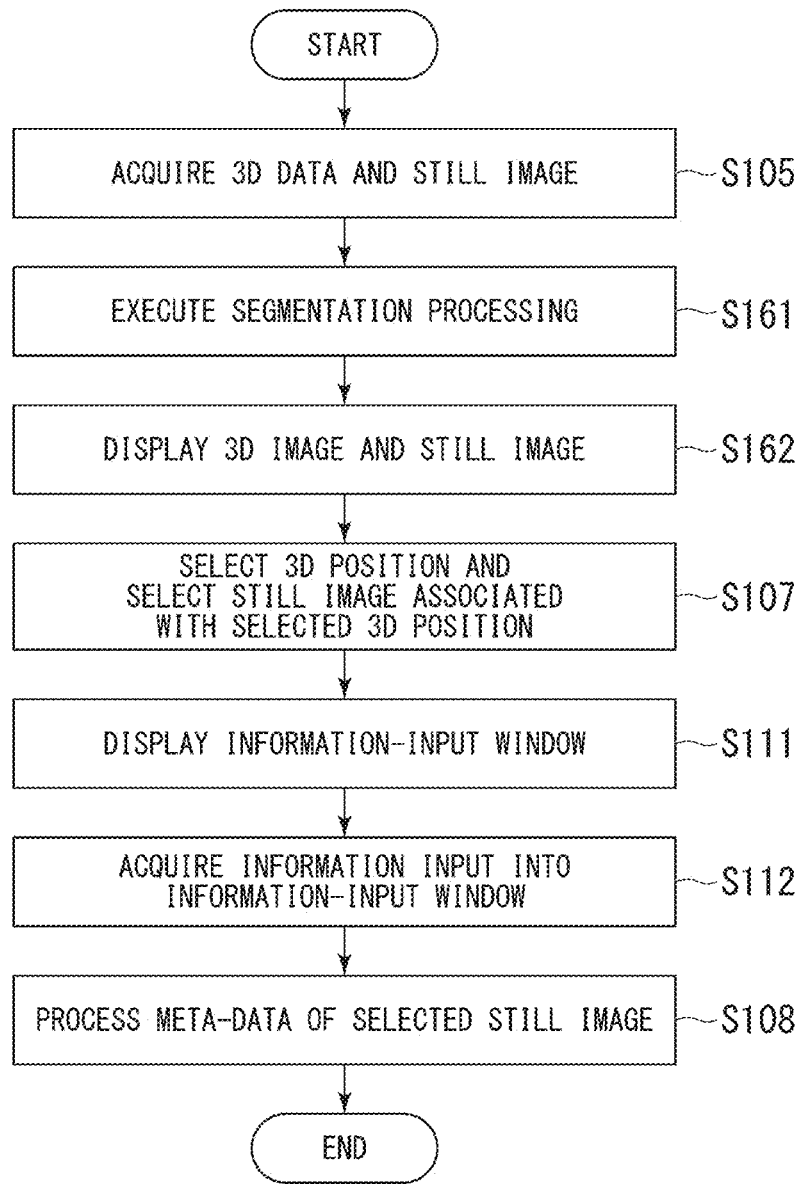
FIG. 28 is a flow chart showing a procedure of data processing in a fourth embodiment of the present invention.

Data processing in the fourth embodiment will be described by using FIG. 28. FIG. 28 shows a procedure of the data processing. FIG. 28 shows processing executed after the control unit 180 determines to complete the photography in Step S103 shown in FIG. 7. The same processing as that shown in FIG. 12 will not be described.

After Step S105, the image-processing unit 181 executes the segmentation processing. The image-processing unit 181 determines features of the 3D shape of a subject by using the 3D data. The image-processing unit 181 divides the two or more points included in the 3D data into two or more segments on the basis of the features. For example, the image-processing unit 181 allocates each of the two or more points to one of two or more segments by using Euclidean cluster extraction. In this way, the image-processing unit 181 divides a region of the 3D shape into two or more segments (Step S161). Step S161 corresponds to the division step.

Each of the two or more points is classified into any one of the two or more segments. Each of the two or more segments includes one or more points.

After Step S161, the display control unit 184 displays a 3D image on the display unit 5 on the basis of the 3D data and displays one or more still images on the display unit 5. At this time, the display control unit 184 displays the two or more segments in different colors (Step S162). Step S162 corresponds to the information display step and the group display step. After Step S162, Step S107 is executed.

Figure 29:
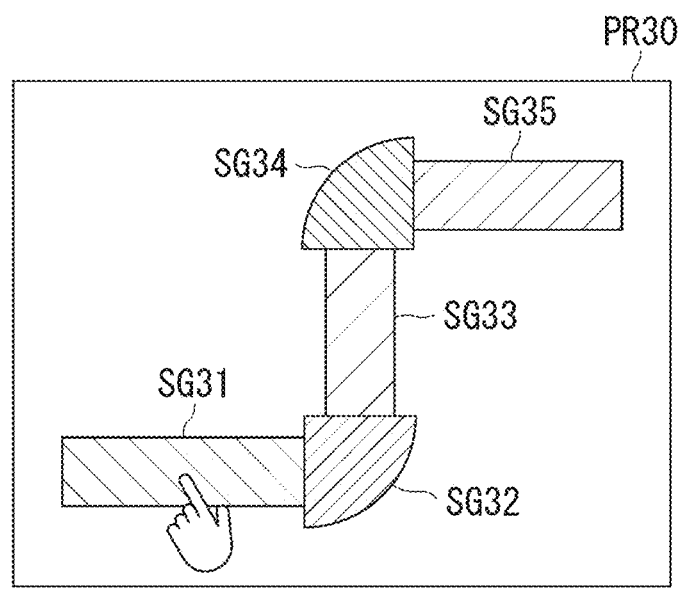
FIG. 29 is a diagram showing an example of an image displayed on a display unit in the fourth embodiment of the present invention.

FIG. 29 shows an example of an image displayed on the display unit 5 in Step S162. The display control unit 184 displays a 3D image PR30 on the display unit 5. The display control unit 184 displays a still image on the display unit 5, but the still image is not shown in FIG. 29.

The display control unit 184 displays a segment SG31, a segment SG32, a segment SG33, a segment SG34, and a segment SG35 on the display unit 5. Each segment is superimposed on the 3D image PR30. These regions are displayed in different colors. The display control unit 184 does not need to superimpose each segment on the 3D image PR30. The display control unit 184 may display each segment in a different region from that in which the 3D image PR30 is displayed.

A user selects any one of the segments SG31 to SG35 by operating the operation unit 4. In this way, the user selects a position on the 3D image PR30. Specifically, the user inputs a selection instruction for selecting one region into the endoscope device 1 by operating the operation unit 4.

In an example in which a cursor is displayed on a 3D image, the user moves the cursor to a position on an intended region and performs a click operation or the like. In an example in which the display unit 5 is constituted as a touch panel, the user touches a position on an intended region in the screen of the display unit 5.

The information acceptance unit 185 accepts the selection instruction. The selection instruction indicates one of the segments SG31 to SG35. In the example shown in FIG. 29, a user inputs the selection instruction for selecting the segment SG31 into the endoscope device 1.

The selection unit 186 identifies a 3D position corresponding to the position indicated by the selection instruction. In the example shown in FIG. 29, the selection unit 186 identifies a 3D position included in the segment SG31 on the basis of the selection instruction. Thereafter, the selection unit 186 selects a still image associated with the 3D position by using the method in the second embodiment.

In the example shown in FIG. 29, the selection unit 186 selects all the one or more still images associated with a 3D position included in the segment SG31. A user can easily select a 3D position.

Step S111 and Step S112 do not need to be executed. After Step S107 is executed, Step S108 may be executed without executing Step S111 or Step S112.

A user may perform an operation of surrounding a region on the 3D image by a line or the like by operating the operation unit 4. The image-processing unit 181 may set the region surrounded by a line or the like through the operation performed by the user as one segment. The display control unit 184 may display the segment in a predetermined color in the 3D image.

The endoscope device 1 may include the CPU 18a shown in FIG. 25. The determination unit 188 determines whether the content of the meta-data processed in Step S108 is consistent to the positional relationship between the two or more points included in the 3D data. For example, a still image A1 and a still image A2 are acquired in the segment SG31 shown in FIG. 29, and a still image B1 is acquired in the segment SG32 shown in FIG. 29. For example, the still image A1 is saved in a folder A, and the still image A2 and the still image B1 are saved in a folder B.

In the above-described example, the still image A1 and the still image A2 acquired in the segment SG31 are saved in the different folder A and folder B, respectively. In addition, the still image A2 and the still image B1 acquired in the different segment SG31 and segment SG32 are saved in one folder B. The still image A2 needs to be saved in the folder A in which the still image A1 is saved. Therefore, the determination unit 188 determines that the content of the meta-data is not consistent to the positional relationship. In such a case, the display control unit 184 may display a warning on the display unit 5.

Each aspect of the present invention may include the following modified example. The image-processing unit 181 divides two or more positions in a 3D space including an object into two or more groups (segments) in the division step (Step S161).

Each aspect of the present invention may include the following modified example. The selection unit 186 selects one of the two or more groups (segments) and selects a position included in the group in the position selection step (Step S107).

Each aspect of the present invention may include the following modified example. The division step (Step S161) is executed before at least one position is selected in the position selection step (Step S107). The display control unit 184 displays the two or more groups (segments) on the display unit 5 in the group display step (Step S162) before the at least one position is selected.

In the fourth embodiment, the endoscope device 1 divides the two or more points included in the 3D data into two or more segments. The endoscope device 1 processes meta-data associated with a still image of a segment selected by a user. Therefore, the endoscope device 1 can improve efficiency of work for processing meta-data.

A user can select one of two or more regions (segments) by performing a simple operation. Therefore, the user is less likely to select an incorrect region.

Fifth Embodiment

A fifth embodiment of the present invention will be described. There is a case in which two or more still images of a feature region are acquired in an inspection using an endoscope. For example, the feature region is a region in which there is damage. The composition of each of the two or more still images is different from that of the others. In a general example, a user selects one or more still images from the two or more still images. The selected still images are attached to a report.

The endoscope device 1 according to the fifth embodiment reduces burdens for selecting a still image of a feature region. The endoscope device 1 selects a still image in which a region selected by a user in a 3D image is seen. The endoscope device 1 processes meta-data associated with the selected still image. The endoscope device 1 includes the CPU 18 shown in FIG. 6.

The selection unit 186 selects a still image associated with at least one position selected in the position selection step among one or more still images (image selection step). Specifically, the selection unit 186 selects a feature region on the basis of an instruction input by a user and selects a still image associated with at least one position in the feature region. The display control unit 184 displays the selected still image on the display unit 5 (image display step). The data-processing unit 187 processes meta-data associated with the selected still image in the processing step.

Figure 30:
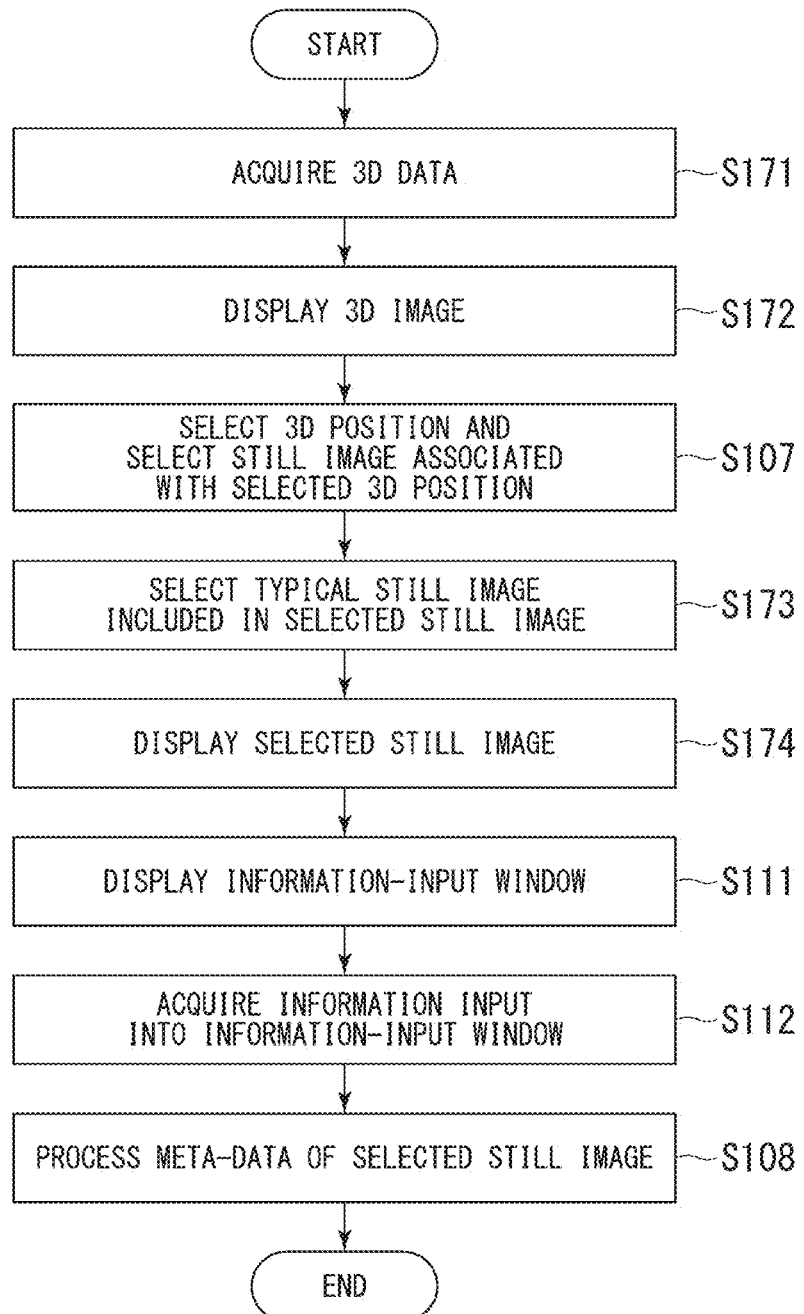
FIG. 30 is a flow chart showing a procedure of data processing in a fifth embodiment of the present invention.

Data processing in the fifth embodiment will be described by using FIG. 30. FIG. 30 shows a procedure of the data processing. FIG. 30 shows processing executed after the control unit 180 determines to complete the photography in Step S103 shown in FIG. 7. The same processing as that shown in FIG. 12 will not be described.

The data acquisition unit 183 accesses a recording medium in the PC 41 or the memory card 42 and acquires the 3D data from the recording medium or the memory card 42 (Step S171).

When a still image is processed, the data acquisition unit 183 acquires still images from the recording medium or the memory card 42. This processing is not shown in FIG. 30.

After Step S171, the display control unit 184 displays a 3D image on the basis of the 3D data on the display unit 5 (Step S172). Step S172 corresponds to the information display step.

After Step S172, the selection unit 186 selects at least one of the two or more points included in the 3D data in Step S107. In this way, the selection unit 186 selects one or more 3D positions. Furthermore, the selection unit 186 selects one or more still images associated with the one or more 3D positions.

After Step S107, the selection unit 186 selects one or more typical still images among the one or more still images selected in Step S107 (Step S173). Step S173 corresponds to the image selection step.

After Step S173, the display control unit 184 displays the one or more still images selected in Step S173 on the display unit 5 (Step S174). Step S174 corresponds to the image display step. After Step S174, Step S111 is executed.

Figure 31:
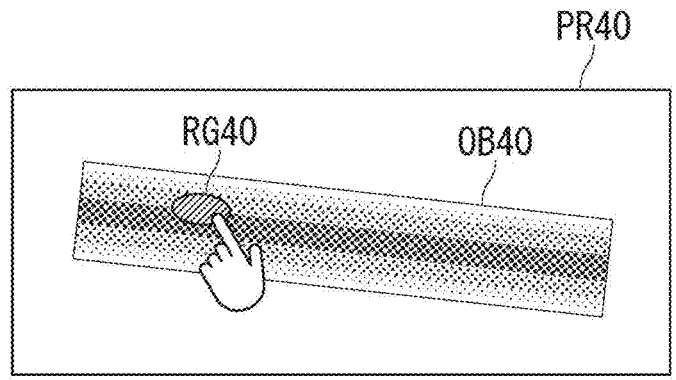
FIG. 31 is a diagram showing an example of an image displayed on a display unit in the fifth embodiment of the present invention.

FIG. 31 shows an example of an image displayed on the display unit 5 in Step S172. The display control unit 184 displays a 3D image PR40 on the display unit 5. The 3D image PR40 shows a 3D shape of a subject OB40. The subject OB40 is displayed as a 3D shape to which texture is attached. A feature region RG40 is on the surface of the subject OB40.

A user selects the feature region RG40 by operating the operation unit 4. Specifically, the user inputs a selection instruction for selecting a position on the 3D image PR40 into the endoscope device 1 by operating the operation unit 4. The information acceptance unit 185 accepts the selection instruction. The selection instruction indicates a position on the 3D image PR40.

The selection unit 186 identifies a 3D position corresponding to the position indicated by the selection instruction. Thereafter, the selection unit 186 selects one or more still images associated with the 3D position by using the method in the second embodiment. In this way, the selection unit 186 selects one or more still images in which the feature region RG40 selected by a user is seen.

The selection unit 186 selects one or more still images on the basis of a criterion set in advance. For example, the selection unit 186 calculates the size (area) of the feature region RG40 in each of the still images. The selection unit 186 selects one still image having the largest size. Alternatively, the selection unit 186 selects one or more still images each having the size larger than a predetermined size. The selection unit 186 may select one or more still images on the basis of the contrast or the like of each of the still images.

Figure 32:
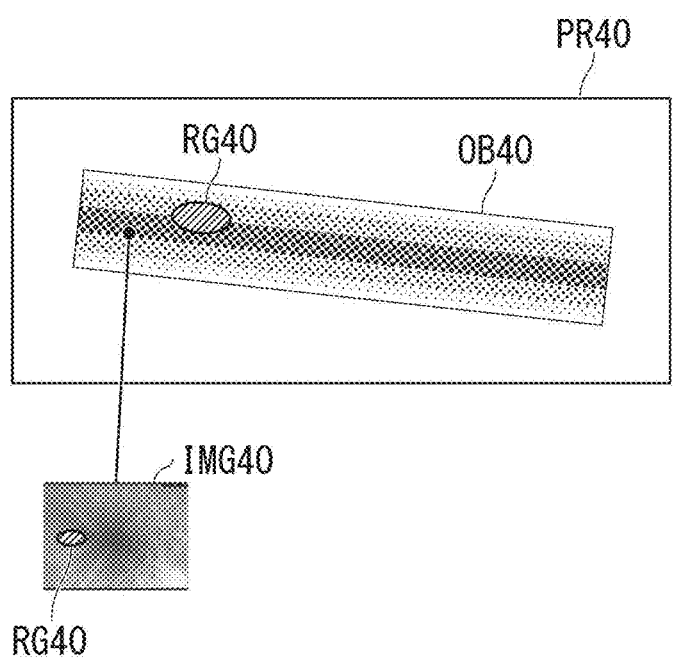
FIG. 32 is a diagram showing an example of an image displayed on the display unit in the fifth embodiment of the present invention.

FIG. 32 shows an example of an image displayed on the display unit 5 in Step S174. The same parts as those shown in FIG. 31 will not be described.

The display control unit 184 displays a still image IMG40 on the display unit 5. The still image IMG40 is the still image selected by the selection unit 186 in Step S173. A feature region RG40 is seen in the still image IMG40. A user can confirm whether a feature region is seen in a still image.

Step S105 and Step S106 shown in FIG. 7 may be executed instead of Step S171 and Step S172. A user may select a region in a still image by operating the operation unit 4. The selection unit 186 may identify 3D coordinates in the 3D data associated with the 2D coordinates of the region. The selection unit 186 may select one or more still images associated with the 3D coordinates by using the method in the second embodiment. Thereafter, Step S173 may be executed.

Step S111 and Step S112 do not need to be executed. After Step S174 is executed, Step S108 may be executed without executing Step S111 or Step S112.

Each aspect of the present invention may include the following modified example. The selection unit 186 selects a still image associated with at least one position selected in the position selection step (Step S107) among one or more still images in the image selection step (Step S107 and Step S173). The display control unit 184 displays the selected still image on the display unit 5 in the image display step (Step S174). The data-processing unit 187 processes meta-data associated with the selected still image in the processing step (Step S108). The above-described modified example may be applied to a first modified example of the fifth embodiment.

In the fifth embodiment, the endoscope device 1 selects a still image in which a feature region selected by a user is seen and processes meta-data associated with the selected still image. Therefore, the endoscope device 1 can improve efficiency of work for processing meta-data. The user can easily select a still image in which a feature region is seen.

First Modified Example of Fifth Embodiment

A first modified example of the fifth embodiment of the present invention will be described. In the above-described fifth embodiment, the endoscope device 1 selects a still image in which a region selected by a user is seen. In the first modified example of the fifth embodiment, the endoscope device 1 detects a feature region by executing image processing and selects a still image in which the feature region is seen. The endoscope device 1 includes the CPU 18 shown in FIG. 6.

Figure 33:
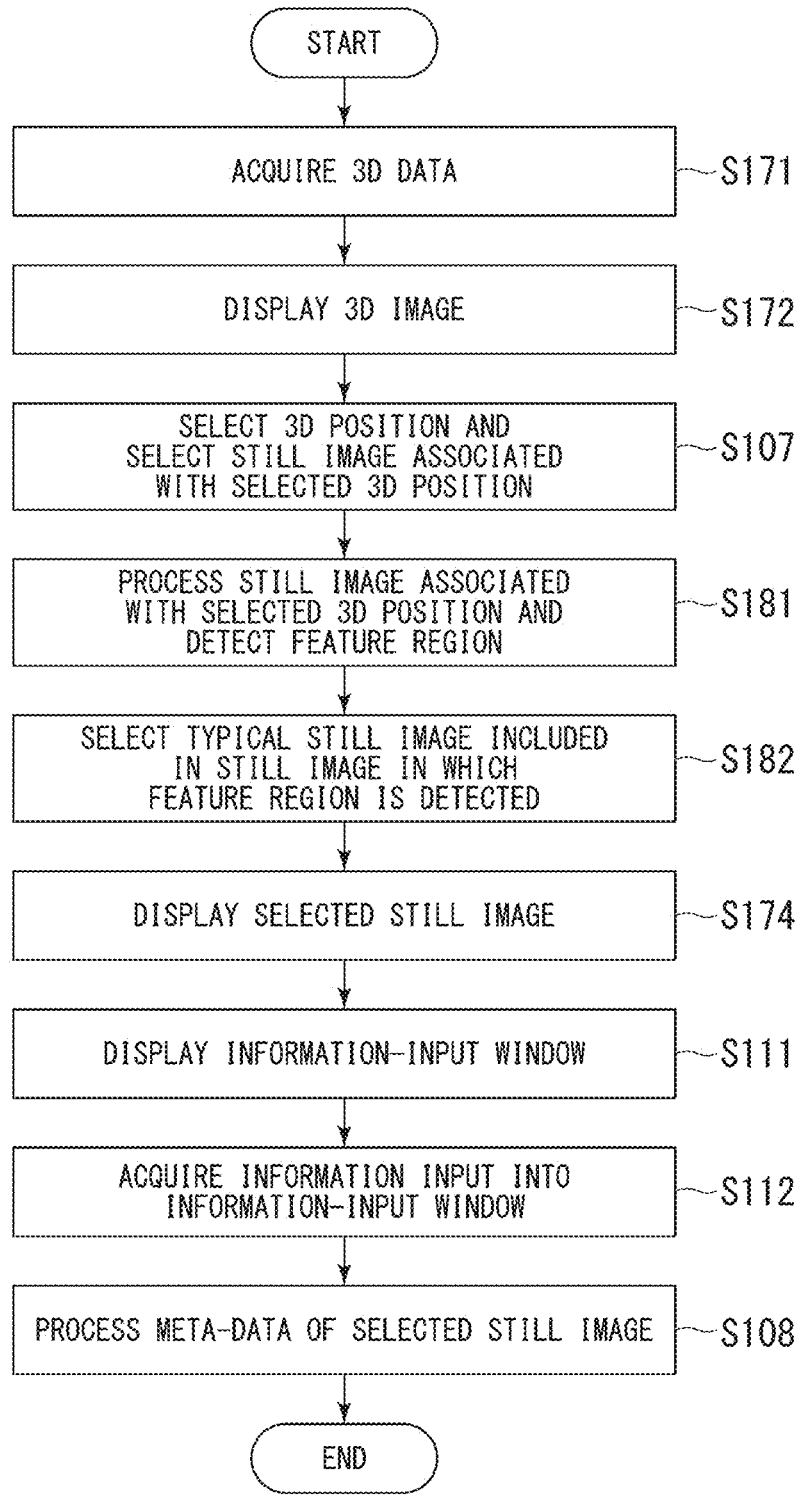
FIG. 33 is a flow chart showing a procedure of data processing in a first modified example of the fifth embodiment of the present invention.

Data processing in the first modified example of the fifth embodiment will be described by using FIG. 33. FIG. 33 shows a procedure of the data processing. FIG. 33 shows processing executed after the control unit 180 determines to complete the photography in Step S103 shown in FIG. 7. The same processing as that shown in FIG. 30 will not be described.

After Step S107, the image-processing unit 181 processes each of the one or more still images selected in Step S107 and detects a feature region (Step S181). For example, the image-processing unit 181 detects a region having a predetermined color or a predetermined shape as a feature region. Alternatively, the image-processing unit 181 compares a template image in which a typical feature region is seen with each of the still images and detects a similar region to the feature region in the template image as a feature region of the still image.

After Step S181, the selection unit 186 selects one or more typical still images of the one or more still images selected in Step S181 (Step S182). Step S182 corresponds to the image selection step. For example, the selection unit 186 selects one or more still images on the basis of the size or the like of the feature region. After Step S182, Step S174 is executed.

Step S111 and Step S112 do not need to be executed. After Step S174 is executed, Step S108 may be executed without executing Step S111 or Step S112.

In the first modified example of the fifth embodiment, the endoscope device 1 detects a feature region in a still image and selects a still image in which the feature region is seen. The endoscope device 1 processes meta-data associated with the selected still image. Therefore, the endoscope device 1 can improve efficiency of work for processing meta-data. A user does not need to perform work for selecting a still image.

Second Modified Example of Fifth Embodiment

A second modified example of the fifth embodiment of the present invention will be described. In an inspection using an endoscope, there is a case in which a user forgets to acquire a still image. When the user selects a position on a 3D image, the endoscope device 1 acquires a still image in which the position is seen. The endoscope device 1 includes the CPU 18 shown in FIG. 6.

Figure 34:
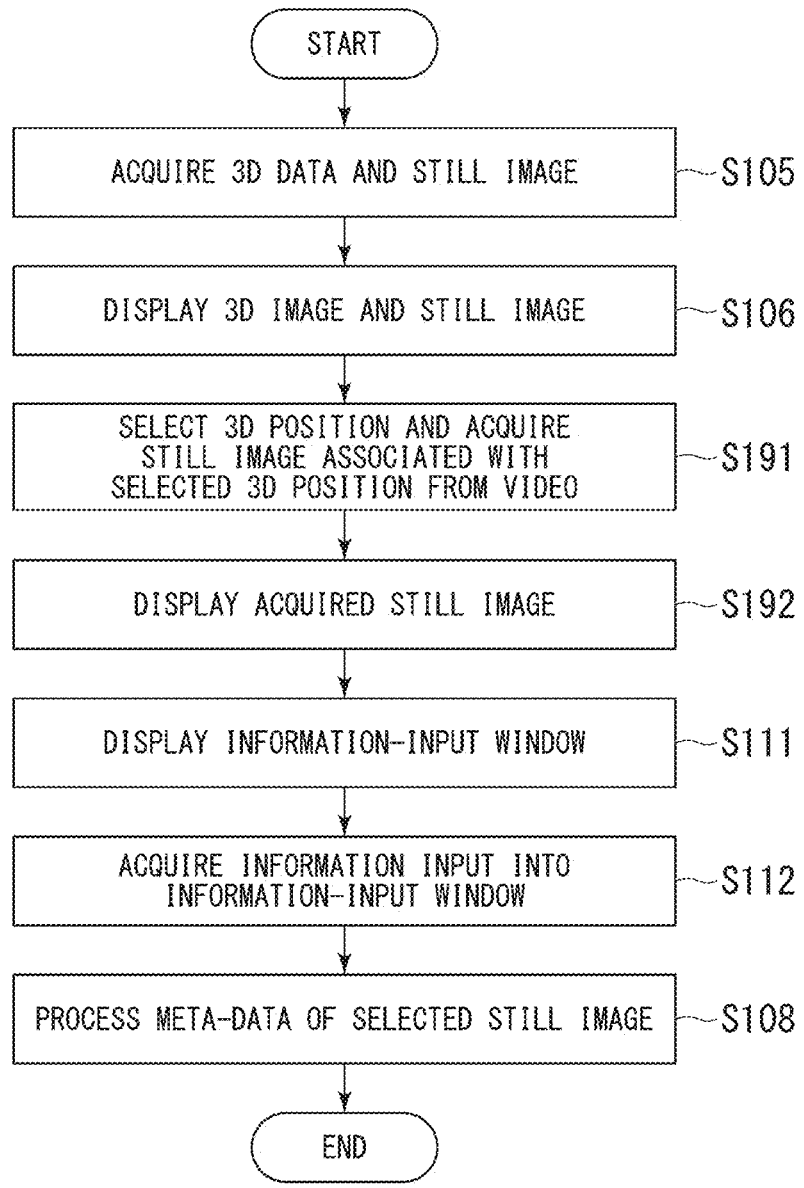
FIG. 34 is a flow chart showing a procedure of data processing in a second modified example of the fifth embodiment of the present invention.

Data processing in the second modified example of the fifth embodiment will be described by using FIG. 34. FIG. 34 shows a procedure of the data processing. FIG. 34 shows processing executed after the control unit 180 determines to complete the photography in Step S103 shown in FIG. 7. The same processing as that shown in FIG. 12 will not be described.

After Step S106, the selection unit 186 selects at least one of the two or more points included in the 3D data. In this way, the selection unit 186 selects one or more 3D positions. Furthermore, the selection unit 186 acquires one or more frames of a video associated with the one or more 3D positions as a still image (Step S191). Step S191 corresponds to the position selection step.

The 3D data include 2D coordinates of one or more points in each frame of a video used for generating the 3D data. Each set of 3D coordinates and each set of 2D coordinates are associated with each other in the 3D data. The selection unit 186 identifies 2D coordinates associated with the 3D coordinates of the selected 3D position. The selection unit 186 acquires a frame including the identified 2D coordinates as a still image.

The 3D data include a camera coordinate of a camera that acquires each frame of a video. The selection unit 186 may select one or more camera positions, each of which has a camera coordinate, as one or more 3D positions. The selection unit 186 may select one or more frames associated with the selected one or more camera positions as still images.

After Step S191, the display control unit 184 displays one or more still images acquired in Step S191 on the display unit 5 (Step S192). After Step S192, Step S111 is executed.

Figure 35:
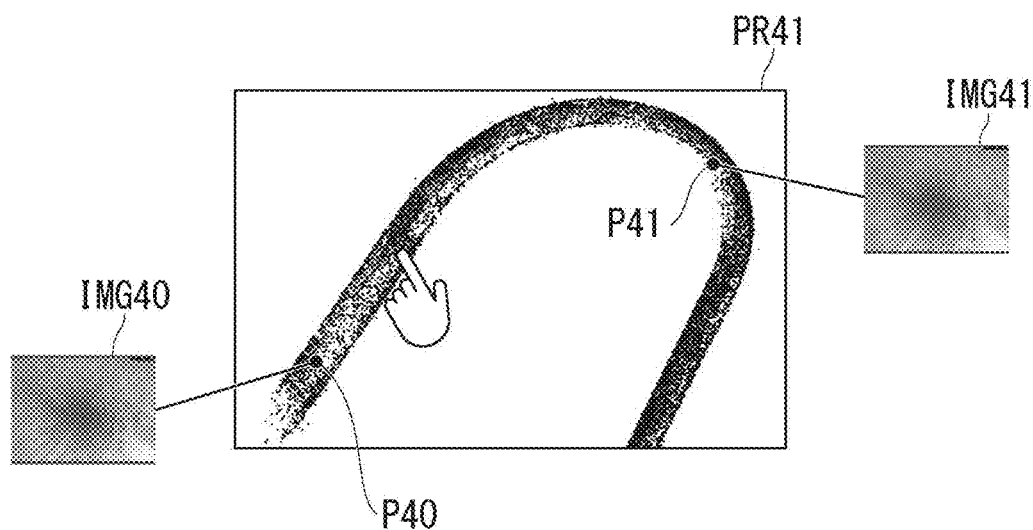
FIG. 35 is a diagram showing an example of an image displayed on a display unit in the second modified example of the fifth embodiment of the present invention.

FIG. 35 shows an example of an image displayed on the display unit 5 in Step S106. The display control unit 184 displays a 3D image PR41, a still image IMG40, and a still image IMG41 on the display unit 5. The display control unit 184 displays a point P40 and a point P41 on the display unit 5. Each point is superimposed on the 3D image PR41. A predetermined mark is displayed at the position of each point. Each point indicates the position of a camera that acquires a still image.

The point P40 indicates the position of the camera that acquires the still image IMG40. The point P41 indicates the position of the camera that acquires the still image IMG41.

A user confirms whether a still image has been acquired at a predetermined position. When the user determines that a new still image is necessary, the user inputs a selection instruction for selecting a position on the 3D image PR41 into the endoscope device 1 by operating the operation unit 4. The information acceptance unit 185 accepts the selection instruction. The selection instruction indicates a position on the 3D image PR41.

The selection unit 186 identifies a 3D position corresponding to the position indicated by the selection instruction. Thereafter, the selection unit 186 acquires one or more frames of a video associated with the 3D position as still images by using the method in the second embodiment.

There is a case in which the same inspection target is inspected twice or more. For example, an inspection target is inspected once a year. The selection unit 186 may select a camera position of a still image acquired in a previous inspection and may acquire one or more frames of a video associated with the camera position as still images.

Figure 36:
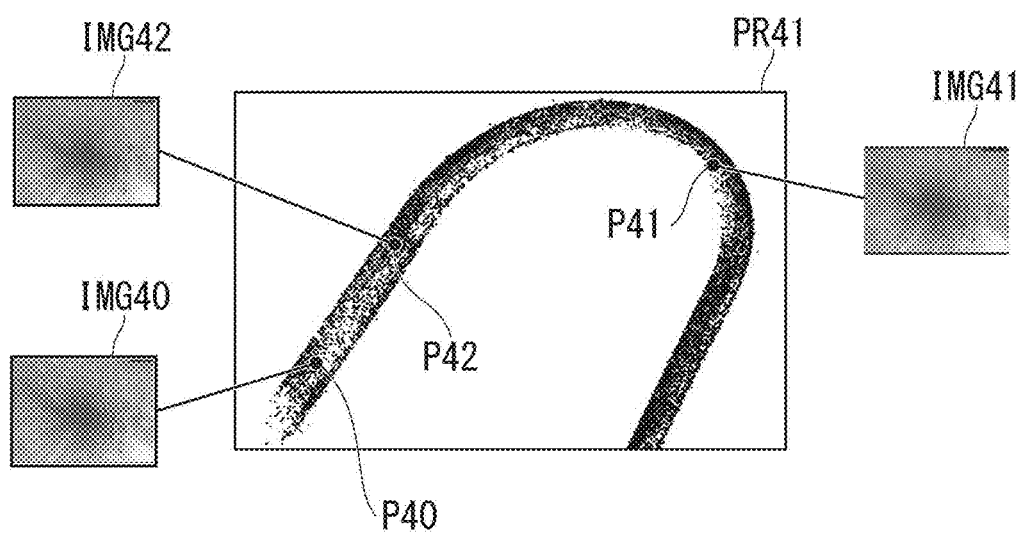
FIG. 36 is a diagram showing an example of an image displayed on the display unit in the second modified example of the fifth embodiment of the present invention.

FIG. 36 shows an example of an image displayed on the display unit 5 in Step S192. The same parts as those shown in FIG. 35 will not be described.

The display control unit 184 displays a still image IMG42 and a point P42. The still image IMG42 is the still image acquired in Step S191. The point P42 indicates the position of the camera that acquires the still image IMG42. A user can confirm whether a still image in which an intended region is seen has been acquired.

Step S111 and Step S112 do not need to be executed. After Step S192 is executed, Step S108 may be executed without executing Step S111 or Step S112.

Step S121 shown in FIG. 14 may be executed instead of Step S106.

The selection unit 186 may acquire two or more frames of a video associated with the one or more 3D positions selected in Step S191. The 3D data generation unit 182 may generate a still image by executing SfM using the two or more frames. The generated still image constitutes similar data to the 3D data.

In the second modified example of the fifth embodiment, the endoscope device 1 acquires a still image in which a region selected by a user in a 3D image is seen. The endoscope device 1 processes meta-data associated with the acquired still image. Even when a still image of an intended region has not been acquired in an inspection, the endoscope device 1 can acquire a still image of the region.

Third Modified Example of Fifth Embodiment

A third modified example of the fifth embodiment of the present invention will be described. The endoscope device 1 determines whether a still image of a segment set in advance has been acquired. When a still image of the segment has not been acquired, the endoscope device 1 acquires a still image of the segment. The endoscope device 1 includes the CPU 18a shown in FIG. 25.

The image-processing unit 181 divides (classifies) two or more positions in a 3D space including an object into two or more segments (groups). One of the two or more segments includes at least one of the two or more positions. The selection unit 186 selects the one of the two or more segments (group selection step). The determination unit 188 determines whether at least one of one or more still images is associated with at least one position included in the selected segment. When the determination unit 188 determines that the one or more still images are not associated with any of the at least one position included in the selected segment, the selection unit 186 acquires one or more frames of a video associated with the segment as still images.

There is a case in which a still image of a specific region is necessary for a report in an inspection using an endoscope. For example, the specific region is a corner of a pipe, which is vulnerable to an external force. Segment information indicating a corner is included in a program recorded on the ROM 13. The selection unit 186 identifies a segment indicating a corner on the basis of the segment information. The selection unit 186 determines whether a still image of the segment has been acquired.

Figure 37:
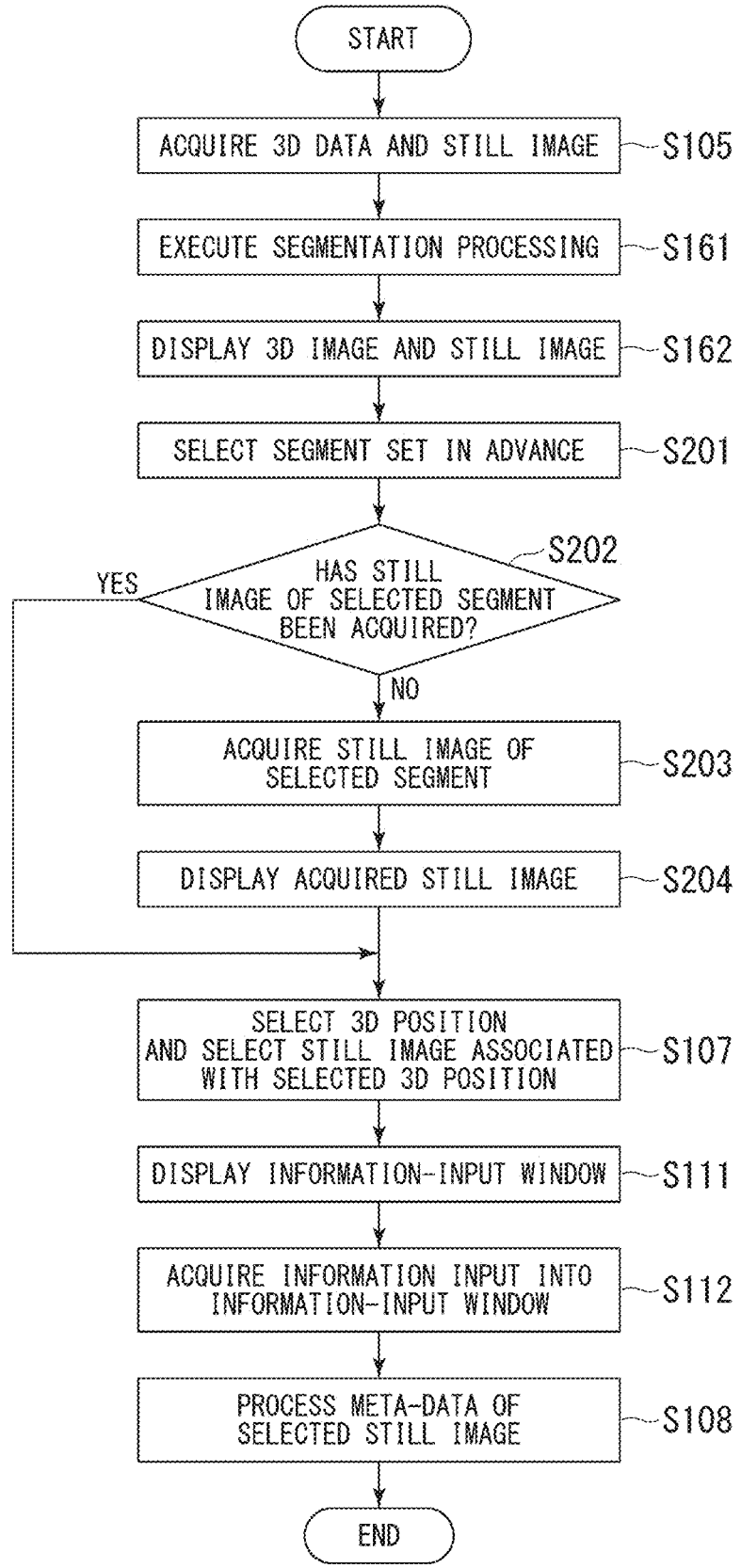
FIG. 37 is a flow chart showing a procedure of data processing in a third modified example of the fifth embodiment of the present invention.

Data processing in the third modified example of the fifth embodiment will be described by using FIG. 37. FIG. 37 shows a procedure of the data processing. FIG. 37 shows processing executed after the control unit 180 determines to complete the photography in Step S103 shown in FIG. 7. The same processing as that shown in FIG. 12 will not be described.

After Step S105, the image-processing unit 181 executes segmentation processing. In this way, the image-processing unit 181 divides a region of the 3D shape of a subject into two or more segments (Step S161). Step S161 is the same as that shown in FIG. 28.

After Step S161, the display control unit 184 displays a 3D image on the display unit 5 on the basis of the 3D data and displays one or more still images on the display unit 5. At this time, the display control unit 184 displays the two or more segments in different colors (Step S162). Step S162 is the same as that shown in FIG. 28.

After Step S162, the selection unit 186 selects one of the two or more segments. For example, the selection unit 186 selects a segment indicating a corner on the basis of the segment information. In this way, the selection unit 186 selects a segment set in advance (Step S201). Step S201 corresponds to the group selection step.

After Step S201, the determination unit 188 determines whether at least one of one or more still images is associated with at least one position included in the selected segment. In this way, the determination unit 188 determines whether a still image of the segment selected in Step S201 has been acquired (Step S202).

When at least one still image is associated with at least one position included in the selected segment, the determination unit 188 determines that a still image of the segment selected in Step S201 has been acquired. When all the one or more still images are not associated with any of the at least one position included in the selected segment, the determination unit 188 determines that a still image of the segment selected in Step S201 has not been acquired.

When the determination unit 188 determines that a still image of the segment selected in Step S201 has been acquired, Step S107 is executed. When the determination unit 188 determines that a still image of the segment selected in Step S201 has not been acquired, the selection unit 186 acquires one or more frames of a video associated with one or more 3D positions in the segment as still images (Step S203).

The 3D data include 2D coordinates of one or more points in each frame of a video used for generating the 3D data. Each set of 3D coordinates and each set of 2D coordinates are associated with each other in the 3D data. The selection unit 186 identifies 2D coordinates associated with the 3D coordinates of the selected 3D position. The selection unit 186 acquires a frame including the identified 2D coordinates as a still image.

After Step S203, the display control unit 184 displays the one or more still images acquired in Step S203 on the display unit 5 (Step S204). After Step S204, Step S107 is executed.

The selection unit 186 may select, in Step S107, at least one point included in the segment selected in Step S201. The selection unit 186 may select, in Step S107, at least one point included in a segment other than the segment selected in Step S201.

Step S111 and Step S112 do not need to be executed. After Step S107 is executed, Step S108 may be executed without executing Step S111 or Step S112.

In the third modified example of the fifth embodiment, when a still image of a segment set in advance has not been acquired, the endoscope device 1 acquires a still image of the segment. Even when a still image of an intended region has not been acquired in an inspection, the endoscope device 1 can acquire a still image of the region.

Fourth Modified Example of Fifth Embodiment

A fourth modified example of the fifth embodiment of the present invention will be described. The endoscope device 1 determines whether a still image of a segment set in advance has been acquired. When a still image of the segment has not been acquired, the endoscope device 1 outputs a warning. The endoscope device 1 includes the CPU 18a shown in FIG. 25.

The image-processing unit 181 divides (classifies) two or more positions in a 3D space including an object into two or more groups (segments). One of the two or more groups includes at least one of the two or more positions. The selection unit 186 selects the one of the two or more groups (group selection step). The determination unit 188 determines whether at least one of one or more still images is associated with at least one position included in the selected segment. When the determination unit 188 determines that the one or more still images are not associated with any of the at least one position included in the selected segment, the display control unit 184 outputs a warning (warning output step).

The display control unit 184 functions as a warning output unit and displays a warning on the display unit 5. A method of outputting a warning is not limited to this. For example, the warning output unit of the CPU 18a may output sound data to a speaker and may cause the speaker to generate a sound indicating a warning.

Figure 38:
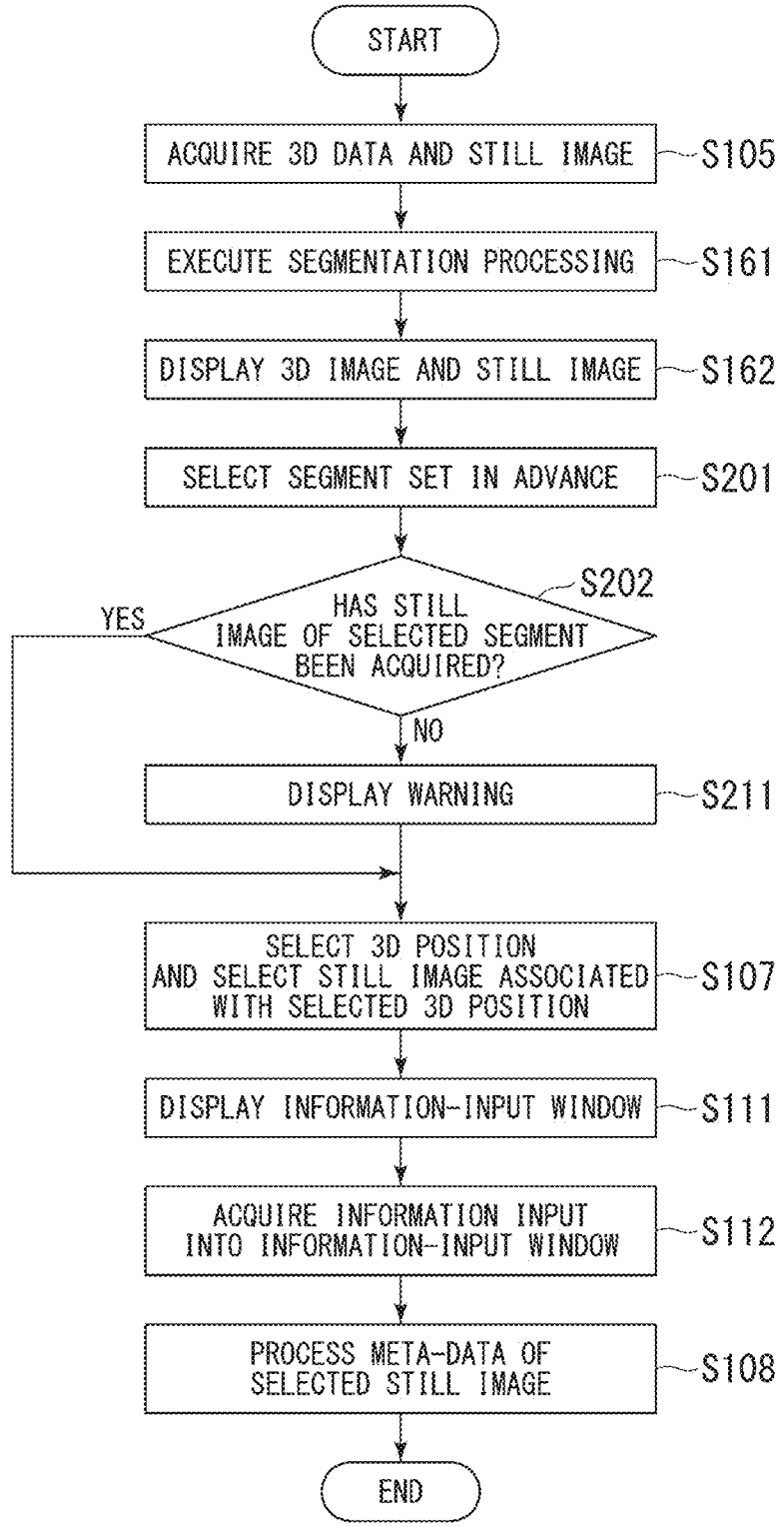
FIG. 38 is a flow chart showing a procedure of data processing in a fourth modified example of the fifth embodiment of the present invention.

Data processing in the fourth modified example of the fifth embodiment will be described by using FIG. 38. FIG. 38 shows a procedure of the data processing. FIG. 38 shows processing executed after the control unit 180 determines to complete the photography in Step S103 shown in FIG. 7. The same processing as that shown in FIG. 37 will not be described.

When the determination unit 188 determines that a still image of the segment selected in Step S201 has not been acquired, the e display control unit 184 displays a warning on the display unit 5 (Step S211). Step S211 corresponds to the warning output step. After Step S211, Step S107 is executed.

Step S203 and Step S204 shown in FIG. 37 may be executed after step S211 is executed.

After step S211, a user may input a selection instruction for selecting a position on the 3D image into the endoscope device 1 by operating the operation unit 4. The information acceptance unit 185 may accept the selection instruction. The selection instruction indicates a position on the 3D image.

The selection unit 186 may identify a 3D position corresponding to the position indicated by the selection instruction. Thereafter, the selection unit 186 may acquire one or more frames of a video associated with the 3D position as still images by using the method in the second embodiment.

Step S111 and Step S112 do not need to be executed. After Step S107 is executed, Step S108 may be executed without executing Step S111 or Step S112.

Each aspect of the present invention may include the following modified example. The image-processing unit 181 divides two or more positions in a 3D space including an object into two or more groups in the division step (Step S161). One of the two or more groups includes at least one of the two or more positions. The selection unit 186 selects the one of the two or more groups in the group selection step (Step S201). When one or more still images are not associated with any of the at least one position included in the selected group, the display control unit 184 outputs a warning in the warning output step (Step S211).

In the fourth modified example of the fifth embodiment, when a still image of a segment set in advance has not been acquired, the endoscope device 1 outputs a warning. When a still image of an intended region has not been acquired in an inspection, the endoscope device 1 can notify a user that a still image of the region has not been acquired.

Sixth Embodiment

A sixth embodiment of the present invention will be described. After meta-data are processed, the endoscope device 1 displays the content of the meta-data. A user inputs an instruction for correcting the meta-data into the endoscope device 1 by operating the screen of the display unit 5. The endoscope device 1 corrects the meta-data on the basis of the instruction. The endoscope device 1 includes the CPU 18 shown in FIG. 6.

The display control unit 184 displays the content of the meta-data processed in the data-processing step on the display unit 5 (data display step). The display control unit 184 displays an operation screen including the content of the meta-data on the display unit 5 in the data display step. The data-processing unit 187 corrects the meta-data on the basis of an operation of the operation screen (data correction step).

Figure 39:
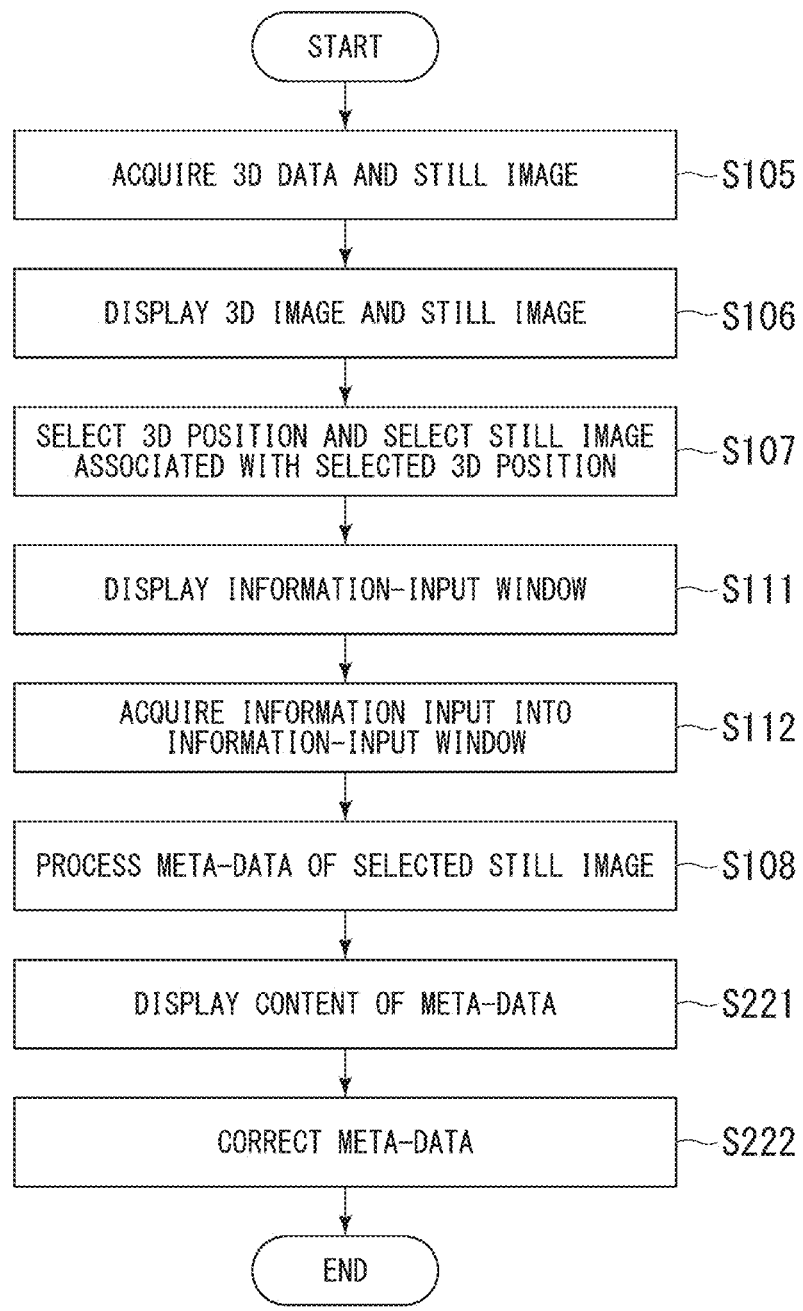
FIG. 39 is a flow chart showing a procedure of data processing in a sixth embodiment of the present invention.

Data processing in the sixth embodiment will be described by using FIG. 39. FIG. 39 shows a procedure of the data processing. FIG. 39 shows processing executed after the control unit 180 determines to complete the photography in Step S103 shown in FIG. 7. The same processing as that shown in FIG. 12 will not be described.

After Step S108, the display control unit 184 displays the content of the meta-data processed in Step S108 on the display unit 5. At this time, the display control unit 184 displays an operation screen including the content of the meta-data on the display unit 5 (Step S221). Step S221 corresponds to the data display step. A user can confirm whether the meta-data are processed in accordance with the intention of the user.

After Step S221, the data-processing unit 187 corrects the meta-data on the basis of an operation performed on the operation screen by a user (Step S222). Step S222 corresponds to the data correction step. When Step S222 is executed, the data processing is completed.

After the operation screen is displayed, a user inputs information for correction into the endoscope device 1 by operating the operation unit 4. The information acceptance unit 185 accepts the information input into the endoscope device 1. The data-processing unit 187 corrects the meta-data on the basis of the information accepted by the information acceptance unit 185. The display control unit 184 may display the content of the corrected meta-data on the display unit 5.

FIG. 40 shows an example of the information-input window displayed on the display unit 5 in Step S111. The information-input window W50 shown in FIG. 40 includes an item IT10, an item IT11, an item IT12, an item IT13, an item IT14, an item IT15, and an item IT16. Each of the items in the information-input window W50 is the same as each of the items in the information-input window W10 shown in FIG. 13.

Figure 41:
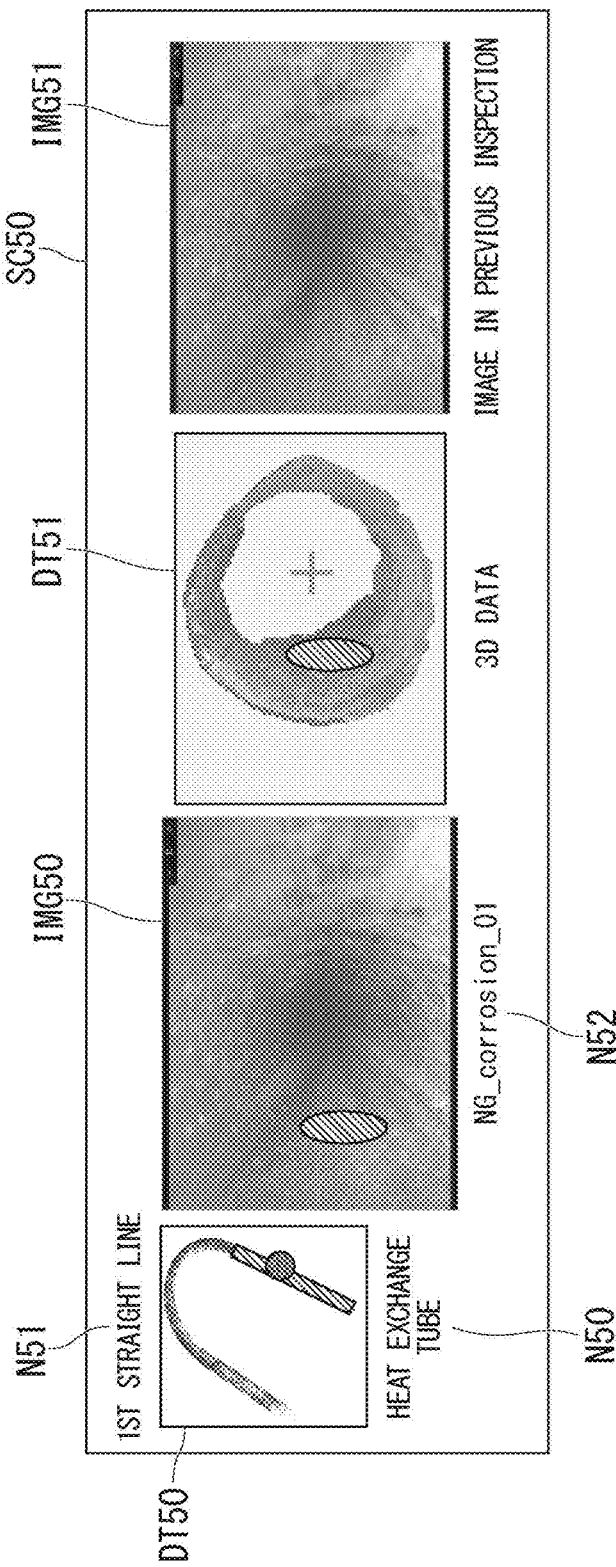
FIG. 41 is a diagram showing an example of an operation screen displayed on the display unit in the sixth embodiment of the present invention.

FIG. 41 shows an example of an operation screen displayed on the display unit 5 in Step S221. The display control unit 184 displays an operation screen SC50 on the display unit 5. The operation screen SC50 includes a 3D image DT50, a still image IMG50, a 3D image DT51, and a still image IMG51.

The 3D image DT50 corresponds to the 3D image displayed in Step S106. The still image IMG50 corresponds to the still image selected in Step S107. The 3D image DT51 indicates a 3D shape of an inspection target. The still image IMG51 corresponds to a still image acquired in a previous inspection.

The display control unit 184 displays a name N50 including a character string set to the item IT10 shown in FIG. 40 in the operation screen SC50. The name N50 indicates a name of the inspection target. The display control unit 184 displays a name N51 including a character string set to the item IT11 shown in FIG. 40 in the operation screen SC50. The name N51 indicates a name of a portion.

A user may correct the name N50 or the name N51 on the operation screen SC50 by performing an operation using a GUI. When the name N50 or the name N51 is corrected, the data-processing unit 187 moves a still image saved in a folder associated with the item IT11. The still image is saved in a folder having the corrected name N50 or the corrected name N51. When the name N50 or the name N51 is corrected, the data-processing unit 187 may correct a name of a folder associated with the item IT10 or the item IT11. The data-processing unit 187 corrects meta-data associated with the item IT10 or the item IT11.

The display control unit 184 displays a name N52 including both a character string set to the item IT12 shown in FIG. 40 and a character string set to the item IT13 shown in FIG. 40 in the operation screen SC50. The name N52 indicates the file name of the still image IMG50.

A user may correct the name N52 on the operation screen SC50 by performing an operation using a GUI. When the name N52 is corrected, the data-processing unit 187 corrects the file name of the still image IMG50 by correcting the file name recorded in the meta-data.

The image-processing unit 181 generates the 3D image DT50 by reducing the 3D image displayed in Step S106.

When information indicating that the 3D data are attached to a report is set to the item IT16 shown in FIG. 40, the 3D data generation unit 182 calculates 3D coordinates of two or more points on a subject by using at least two of two or more frames included in a video. The 3D data generation unit 182 generates 3D data including the 3D coordinates of the two or more points. The display control unit 184 displays the 3D image DT51 of the 3D data in the operation screen SC50.

The 3D data generation unit 182 generates 3D data of a wide region in Step S104. The 3D data generation unit 182 generates detailed 3D data of a narrow region in Step S108. At this time, the 3D data generation unit 182 uses a different algorithm from that used in Step S104. In this way, the endoscope device 1 can generate detailed 3D data of a region payed attention to by a user without lengthening a processing time for generating the 3D data in Step S104.

A user may perform an operation for changing the direction of a subject in the 3D image DT51. When the operation is performed, the display control unit 184 may change the direction. The user may perform an operation for changing the magnification ratio of the 3D image DT51. When the operation is performed, the display control unit 184 may change the magnification ratio.

When the information indicating that the 3D data are attached to a report is not set to the item IT16 shown in FIG. 40, the display control unit 184 does not need to display the 3D image DT51 in the operation screen SC50.

When information indicating that previous data are attached to a report is set to the item IT15 shown in FIG. 40, the display control unit 184 displays the still image IMG51 on the display unit 5. When the information indicating that previous data are attached to a report is not set to the item IT15 shown in FIG. 40, the display control unit 184 does not need to display the still image IMG51 on the display unit 5.

In general, data selected from a great deal of data are attached to a report in an inspection using an endoscope. A user can determine whether suitable data for a report is selected by checking the operation screen SC50. In addition, the user can confirm whether the state of the 3D image DT51 is suitable for a report.

The display control unit 184 may display a tree structure indicating a hierarchical structure of folders on the display unit 5. When the structure of a folder, the name of a folder, or the file name is corrected, the display control unit 184 may display a corrected tree structure on the display unit 5. A user may operate a tree structure by performing an operation using a GUI. When the tree structure is operated, the data-processing unit 187 may correct meta-data.

When correction of meta-data is unnecessary, Step S222 does not need to be executed.

Step S111 and Step S112 do not need to be executed. After Step S107 is executed, Step S108 may be executed without executing Step S111 or Step S112.

Step S121 and Step S122 shown in FIG. 14 may be executed instead of Step S106 and Step S107.

Each aspect of the present invention may include the following modified example. After meta-data are processed, the display control unit 184 displays an operation screen including the content of the processed meta-data on the display unit 5 in the data display step (Step S221).

Each aspect of the present invention may include the following modified example. The data-processing unit 187 corrects meta-data on the basis of an operation of the operation screen in the data correction step (Step S222).

In the sixth embodiment, after meta-data are processed, the endoscope device 1 displays the content of the meta-data. A user can check the content.

The endoscope device 1 corrects meta-data on the basis of an operation performed on the operation screen by a user. The user can easily correct various kinds of data included in the meta-data by performing an operation on the operation screen.

Seventh Embodiment

A seventh embodiment of the present invention will be described. A user selects a time range in a video. The endoscope device 1 selects one or more frames of two or more frames used for generating the 3D data as still images. Time points at which the still images are acquired are included in the time range selected by the user. The endoscope device 1 processes meta-data of the selected still images. The endoscope device 1 includes the CPU 18 shown in FIG. 6.

Each frame of a video is associated with time information indicating a time point at which each frame is generated. The selection unit 186 selects the time information and selects at least one position on the basis of the selected time information in the position selection step.

The CPU 18 executes the data processing shown in FIG. 7. The selection unit 186 executes the following processing in Step S107.

A user inputs a selection instruction for selecting a time range in a video into the endoscope device 1 by operating the operation unit 4. The information acceptance unit 185 accepts the selection instruction. The selection instruction indicates the time range.

The 3D data include 2D coordinates of a point in each frame. Since a still image is the same as a frame, 2D coordinates of a point in the still image are the same as those of a point in the frame. Therefore, the 3D data include 2D coordinates of a point in a still image. Each frame and a still image are associated with 3D coordinates included in the 3D data. Each frame and a still image include the time information. The time information of each frame and the time information of a still image are associated with 3D coordinates included in the 3D data.

The selection unit 186 identifies a range of the 3D data corresponding to the time range indicated by the selection instruction. Specifically, the selection unit 186 identifies one or more frames associated with the time information indicating a time point included in the time range. The selection unit 186 identifies 3D coordinates in the 3D data associated with 2D coordinates of a point in the one or more frames. In addition, the selection unit 186 selects a still image associated with the time information indicating a time point included in the time range.

Figure 42:
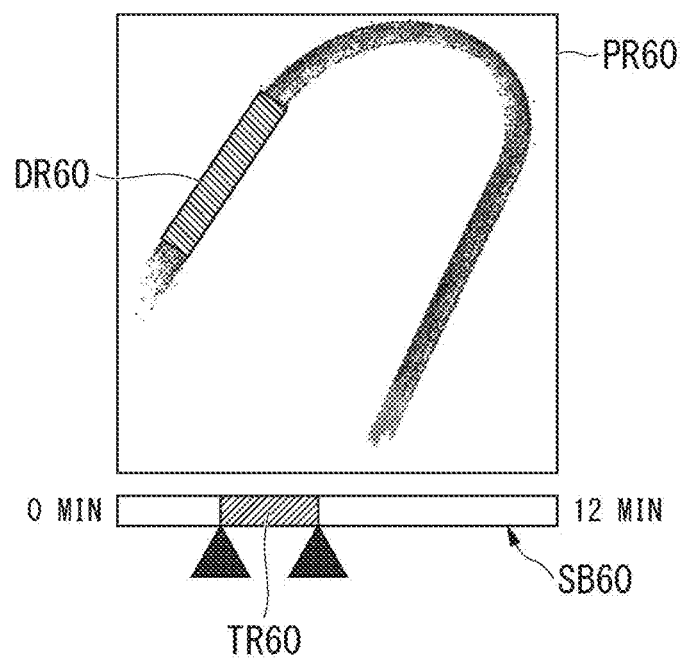
FIG. 42 is a diagram showing an example of an image displayed on a display unit in a seventh embodiment of the present invention.
Figure 43:
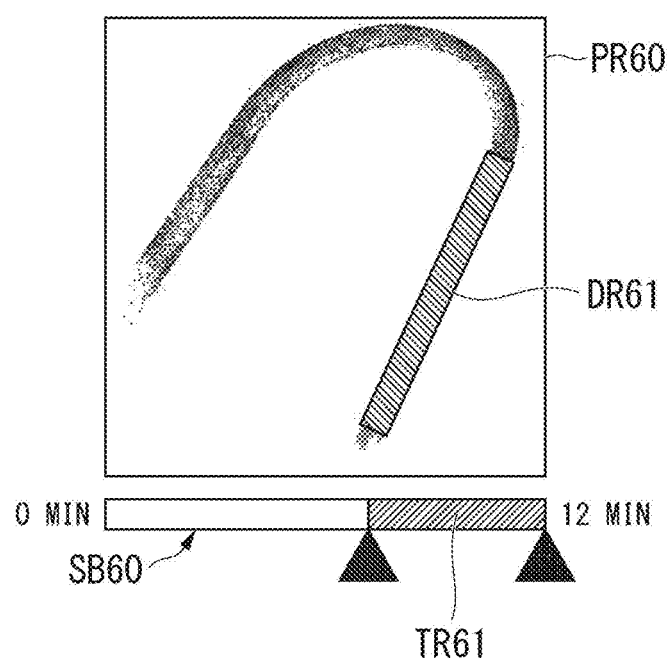
FIG. 43 is a diagram showing an example of an image displayed on the display unit in the seventh embodiment of the present invention.

FIG. 42 and FIG. 43 show examples of an image displayed on the display unit 5 in Step S106. The display control unit 184 displays a 3D image PR60 and a seek-bar SB60 on the display unit 5. The seek-bar SB60 is associated with the time information of two or more frames used for generating the 3D data. A user selects a time range on the seek-bar SB60 by performing an operation using a GUI.

In the example shown in FIG. 42, a user selects a time range TR60. The selection unit 186 identifies a range of the 3D data corresponding to the time range TR60. The display control unit 184 superimposes the identified range DR60 on the 3D image PR60.

In the example shown in FIG. 43, a user selects a time range TR61. The selection unit 186 identifies a range of the 3D data corresponding to the time range TR61. The display control unit 184 superimposes the identified range DR61 on the 3D image PR60.

As described above, the display control unit 184 displays, on the display unit 5, range information indicating a range in the 3D data corresponding to a time range in a video. The range information corresponds to the range DR60 and the range DR61. A user can check a range of the 3D data associated with a still image.

Each aspect of the present invention may include the following modified example. Each of two or more positions in a 3D space including an object is associated with at least one of two or more images. The two or more images are included in a video generated by photographing an object. Each of the two or more images is associated with time information indicating a time point at which each of the two or more images is generated. The selection unit 186 selects the time information and selects at least one position on the basis of the selected time information in the position selection step (Step S107).

In the seventh embodiment, the endoscope device 1 selects a still image on the basis of a time range selected by a user. The endoscope device 1 processes meta-data of the selected still image. Therefore, the endoscope device 1 can improve efficiency of work for processing meta-data. The user can correctly select a range of the 3D data corresponding to a time range in a video by selecting the time range.

Eighth Embodiment

An eighth embodiment of the present invention will be described. An endoscope device according to the eighth embodiment generates position data corresponding to the 3D data by using sensor information generated by a different sensor from the imaging device 28.

Figure 44:
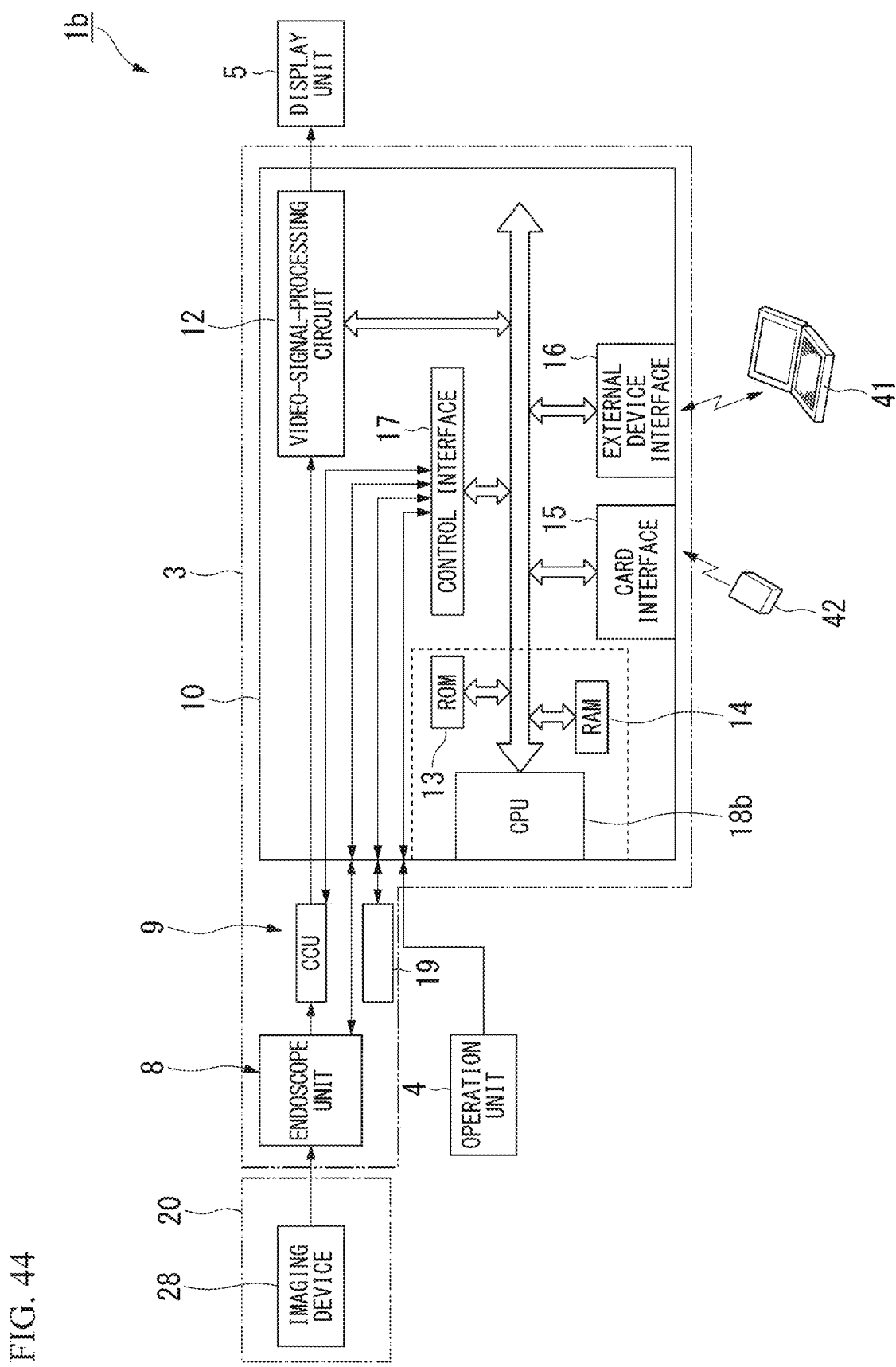
FIG. 44 is a block diagram showing an internal configuration of an endoscope device according to an eighth embodiment of the present invention.

The endoscope device 1 shown in FIG. 5 is changed to an endoscope device 1*b* shown in FIG. 44. FIG. 44 shows an internal configuration of the endoscope device 1*b*. The same configuration as that shown in FIG. 5 will not be described.

The endoscope device 1*b* includes a sensor 19 in addition to the configurations shown in FIG. 5. The sensor 19 is different from an image sensor. The sensor 19 includes one or more sensors. For example, the sensor 19 includes at least one of a rotary encoder, a gyro sensor, and an acceleration sensor. A gyro sensor, and an acceleration sensor are disposed in the distal end 20 of the insertion unit 2.

The sensor 19 periodically measures a physical quantity and periodically generates sensor information indicating the physical quantity. The sensor 19 generates the sensor information at a predetermined sampling rate. The sensor 19 outputs the sensor information to the control interface 17. The sensor information is output from the control interface 17 to a CPU 18*b*.

Hereinafter, an example in which the sensor 19 is a rotary encoder will be described. Two rollers are disposed so as to locate the insertion unit 2 therebetween. The two rollers are in contact with the insertion unit 2. The two rollers rotate as the insertion unit 2 moves. The sensor 19 determines the amount of rotation of at least one of the two rollers, thus determining the length (distance) of the insertion unit 2 inserted into a space in an inspection target. The sensor 19 generates length information indicating the determined length as the sensor information.

Figure 45:
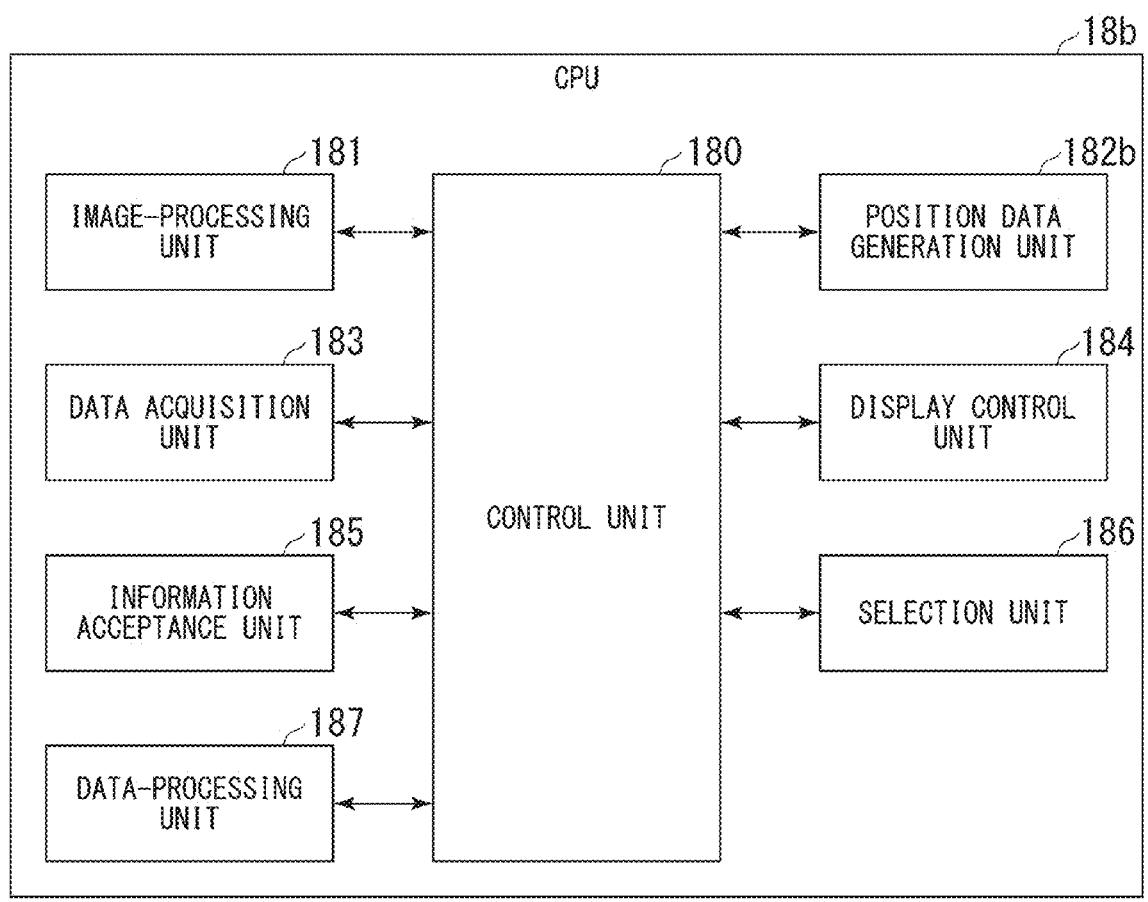
FIG. 45 is a block diagram showing a functional configuration of a CPU included in the endoscope device according to the eighth embodiment of the present invention.

The CPU 18 shown in FIG. 5 is changed to the CPU 18*b*. FIG. 45 shows a functional configuration of the CPU 18*b*. The CPU 18*b* has functional units including a control unit 180, an image-processing unit 181, a position data generation unit 182*b*, a data acquisition unit 183, a display control unit 184, an information acceptance unit 185, a selection unit 186, and a data-processing unit 187. At least one of the blocks shown in FIG. 45 may be constituted by a different circuit from the CPU 18*b*. The same configuration as that shown in FIG. 6 will not be described.

Each unit shown in FIG. 45 may be constituted by at least one of a processor and a logic circuit. Each unit shown in FIG. 45 may include one or a plurality of processors. Each unit shown in FIG. 45 may include one or a plurality of logic circuits.

The information acceptance unit 185 accepts the sensor information (length information) output from the sensor 19. The position data generation unit 182*b* generates position data on the basis of the sensor information. The position data indicate two or more positions in a 3D space including an object.

Figure 46:
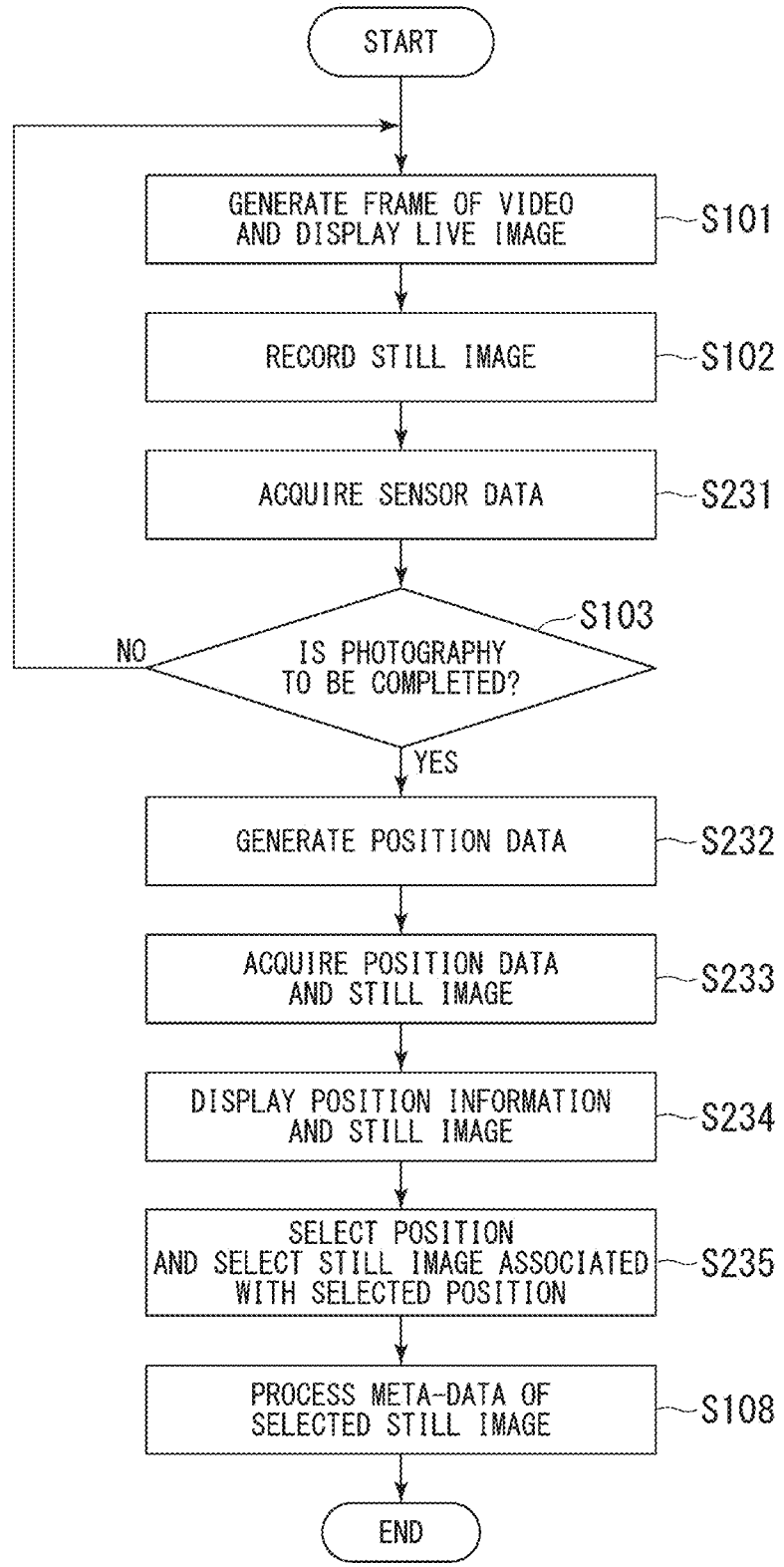
FIG. 46 is a flow chart showing a procedure of data processing in the eighth embodiment of the present invention.

Data processing in the eighth embodiment will be described by using FIG. 46. FIG. 46 shows a procedure of the data processing. The same processing as that shown in FIG. 7 will not be described.

After Step S102, the information acceptance unit 185 accepts the sensor information output from the sensor 19 (Step S231). After Step S231, Step S103 is executed.

When the control unit 180 determines to complete the photography in Step S103, the position data generation unit 182*b* generates position data by using the sensor information. The position data generation unit 182*b* records the position data in a recording medium in the PC 41 or the memory card 42 (Step S232).

The sensor information indicates the length of the insertion unit 2 inserted into a space in an inspection target. For example, a first part of the insertion unit 2 is inserted into the space, and a second part of the insertion unit 2 is not inserted into the space. At this time the sensor information indicates the length of the first part. Alternatively, the sensor information indicates the distance by which the insertion unit 2 proceeds in the space. The length or the distance corresponds to the position of a subject of which an image is acquired by a camera. The position data include data indicating positions of two or more points. The data correspond to the length or the distance indicated by the sensor information. The data correspond to the coordinate data C1, the coordinate data C2, and the coordinate data C3 shown in FIG. 2.

For example, time information is attached to the sensor information. The time information indicates a time point at which the sensor information is generated. Time information indicating a time point of the photography is attached to a still image. The sensor information and the still image are associated with each other by the time information. One position indicated by the position data corresponds to a piece of the sensor information. Therefore, the still image is associated with the one position.

After Step S232, the data acquisition unit 183 accesses a recording medium in the PC 41 or the memory card 42 and acquires the position data and still images from the recording medium or the memory card 42 (Step S233).

After Step S233, the display control unit 184 displays an image including position information on the display unit 5 on the basis of the position data and displays one or more still images on the display unit 5 (Step S234). Step S234 corresponds to the information display step.

Figure 47:
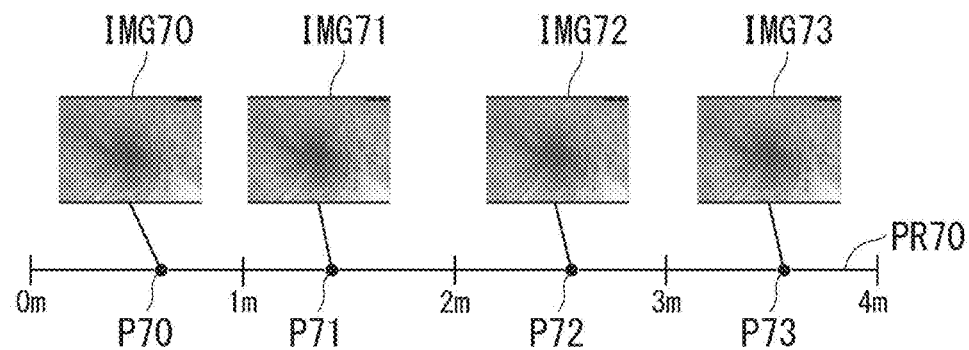
FIG. 47 is a diagram showing an example of an image displayed on a display unit in the eighth embodiment of the present invention.

FIG. 47 shows an example of an image displayed on the display unit 5 in Step S234. The display control unit 184 displays an image of position information PR70, a still image IMG70, a still image IMG71, a still image IMG72, and a still image IMG73 on the display unit 5. The position information PR70 includes a point P70, a point P71, a point P72, and a point P73. A predetermined mark is displayed at the position of each point. Each point indicates the position of a camera that acquires a still image. The position data include data indicating the position of each point.

The distance from a reference position to each point corresponds to the length indicated by the sensor information. For example, the reference position is indicated by the sensor information acquired when the photography is started.

The point P70 indicates the position of the camera that acquires the still image IMG70. The point P71 indicates the position of the camera that acquires the still image IMG71. The point P72 indicates the position of the camera that acquires the still image IMG72. The point P73 indicates the position of the camera that acquires the still image IMG73. In the image displayed on the display unit 5, each of the point P70, the point P71, the point P72, and the point P73 is connected to the still image by a line. Therefore, a user can figure out a position at which each still image is acquired.

After Step S234, the selection unit 186 selects at least one of two or more positions included in the position data. Furthermore, the selection unit 186 selects one or more still images associated with the at least one position (Step S235). Step S235 corresponds to the position selection step. After Step S235, Step S108 is executed.

A still image is associated with a position indicated by the position data. When one or more positions indicated by the position data are selected, the selection unit 186 selects one or more still images associated with the one or more positions.

For example, a user selects the point P70 and the point P71 shown in FIG. 47 by operating the operation unit 4. Specifically, the user inputs a selection instruction for selecting the point P70 and the point P71 into the endoscope device 1b by operating the operation unit 4. The information acceptance unit 185 accepts the selection instruction. The selection instruction indicates the point P70 and the point P71.

The selection unit 186 identifies the point P70 and the point P71 corresponding to the positions indicated by the selection instruction. The selection unit 186 selects the still image IMG70 associated with the point P70 and the still image IMG71 associated with the point P71.

The sensor 19 may be an acceleration sensor disposed in the distal end 20 of the insertion unit 2. The sensor 19 may determine the direction of gravity applied to the distal end 20 and may generate direction information indicating the determined direction as the sensor information. The relative direction of the sensor 19 to the distal end 20 does not change. When the relative direction of the distal end 20 to the direction of gravity changes, the direction information output from the sensor 19 changes. The position data generation unit 182b generates the position data on the basis of the direction information.

The sensor 19 may be a gyro sensor disposed in the distal end 20 of the insertion unit 2. The sensor 19 may determine an angular velocity generated by movement of the distal end 20 and may generate angular velocity information indicating the determined angular velocity as the sensor information. The relative direction of the sensor 19 to the distal end 20 does not change. When the direction of the distal end 20 changes, the angular velocity information output from the sensor 19 changes. The angular velocity information indicates the change of the direction of the distal end 20. The position data generation unit 182b generates the position data on the basis of the angular velocity information.

For example, the position data generation unit 182b detects the change of the direction of the distal end 20 on the basis of the direction information or the angular velocity information. When the endoscope bends, the direction of the distal end 20 changes. For example, the position data include the number of times the endoscope bends and include information indicating a position at which a still image is acquired. A user can determine a portion at which a still image is acquired in a pipe by checking the number of times the endoscope bends.

The endoscope device 1b may include the CPU 18 shown in FIG. 6 or the CPU 18a shown in FIG. 25 instead of the CPU 18b. The image-processing unit 181 may detect a corner of a pipe and may determine a direction in which the endoscope bends by processing a 2D image acquired by the imaging device 28. The 3D data generation unit 182 may generate the 3D data on the basis of both the sensor information generated by a rotary encoder and the direction determined by the image-processing unit 181.

When the insertion unit 2 is inserted into a space in an inspection target, a user inputs a bending instruction for bending the insertion unit 2 into the endoscope device 1b by operating the operation unit 4. The information acceptance unit 185 accepts the bending instruction. The bending instruction indicates a direction (bending direction) in which the insertion unit 2 bends. The control unit 180 executes control for bending the insertion unit 2 in the bending direction indicated by the bending instruction. The 3D data generation unit 182 may generate the 3D data on the basis of both the sensor information generated by a rotary encoder and the bending direction.

The sensor 19 may include an acceleration sensor or a gyro sensor in addition to a rotary encoder. The sensor information output from the rotary encoder indicates the length or the distance. The sensor information output from the acceleration sensor or the gyro sensor indicates the change of the direction of the endoscope. The 3D data generation unit 182 may generate the 3D data on the basis of both the sensor information output from the rotary encoder and the sensor information output from the acceleration sensor or the gyro sensor.

The sensor 19 may include an acceleration sensor in addition to a gyro sensor. The sensor information output from the acceleration sensor indicates the acceleration of the endoscope. The 3D data generation unit 182 may calculate the amount of change of the position of the endoscope on the basis of the acceleration. The 3D data generation unit 182 may generate the 3D data on the basis of both the amount of change and the sensor information output from the gyro sensor.

The 3D data generation unit 182 may generate, in Step S104, the 3D data by using one or more 2D images acquired in a previous inspection. In such a case, a position at which a still image is acquired may be indicated by the distance from the entrance of a pipe to the position. The 3D data generation unit 182 identifies a point in the 3D data. The point is the distance away from the entrance. In this way, the 3D data generation unit 182 can identify a 3D position corresponding to a position at which a still image is acquired. A position at which a still image is acquired may be indicated by the distance from a corner of a pipe to the position. The 3D data generation unit 182 may detect a feature region such as damage by processing the one or more 2D images. A position at which a still image is acquired may be indicated by the distance from the feature region to the position. The 3D data generation unit 182 can associate a position at which a still image is acquired and a point included in the 3D data in a previous inspection with each other by using the above-described methods.

The 3D data generation unit 182 may generate the 3D data by using one or more 2D images generated by a drone. The 3D data generation unit 182 may generate the 3D data by using one or more 2D images generated by a computed tomography (CT) device or a magnetic-resonance-imaging (MRI) device.

Each aspect of the present invention may include the following modified example. One or more still images are generated by the imaging device 28 (image sensor). The imaging device 28 is disposed in the distal end 20 of the insertion unit 2 capable of being inserted into a 3D space including an object. The position data are generated on the basis of sensor information generated by a sensor other than the image sensor.

Each aspect of the present invention may include the following modified example. The sensor 19 other than the image sensor is an acceleration sensor. The acceleration sensor is disposed in the distal end 20, determines the direction of gravity applied to the distal end 20, and generates direction information indicating the determined direction as the sensor information. The position data are generated on the basis of the direction information.

Each aspect of the present invention may include the following modified example. The sensor 19 other than the image sensor is a gravity sensor. The gravity sensor is disposed in the distal end 20, determines the direction of gravity applied to the distal end 20, and generates direction information indicating the determined direction as the sensor information. The position data are generated on the basis of the direction information.

Each aspect of the present invention may include the following modified example. The sensor 19 other than the image sensor is a gyro sensor. The gyro sensor is disposed in the distal end 20, determines the angular velocity generated by movement of the distal end 20, and generates angular velocity information indicating the determined angular velocity as the sensor information. The position data are generated on the basis of the angular velocity information.

Each aspect of the present invention may include the following modified example. The insertion unit 2 bends on the basis of an instruction indicating a bending direction. The position data are generated on the basis of the sensor information and the bending direction.

In the eighth embodiment, the endoscope device 1*b* generates the position data by using the sensor information generated by the sensor 19 and displays the position information on the basis of the position data. A user can intuitively figure out the position of an inspection target in the position information and can easily select the position. The endoscope device 1*b* processes meta-data associated with a still image of a position selected by the user. Therefore, the endoscope device 1*b* can improve the efficiency of work for processing the meta-data.

Ninth Embodiment

A ninth embodiment of the present invention will be described. The endoscope device 1 generates two-dimensional data (2D data) corresponding to the 3D data by using a 2D image generated by the imaging device 28. The endoscope device 1 includes the CPU 18*b* shown in FIG. 45.

The position data generation unit 182*b* generates 2D data including 2D coordinates of two or more points on a subject in one or more 2D images of the subject. The 2D data include 2D coordinates of two or more points. The 2D data may include 2D coordinates of three or more points. The 2D data include an X-coordinate and a Y-coordinate of each point. The 2D data correspond to the position data. The 2D coordinates included in the 2D data correspond to the coordinate data C1, the coordinate data C2, and the coordinate data C3 shown in FIG. 2.

Figure 48:
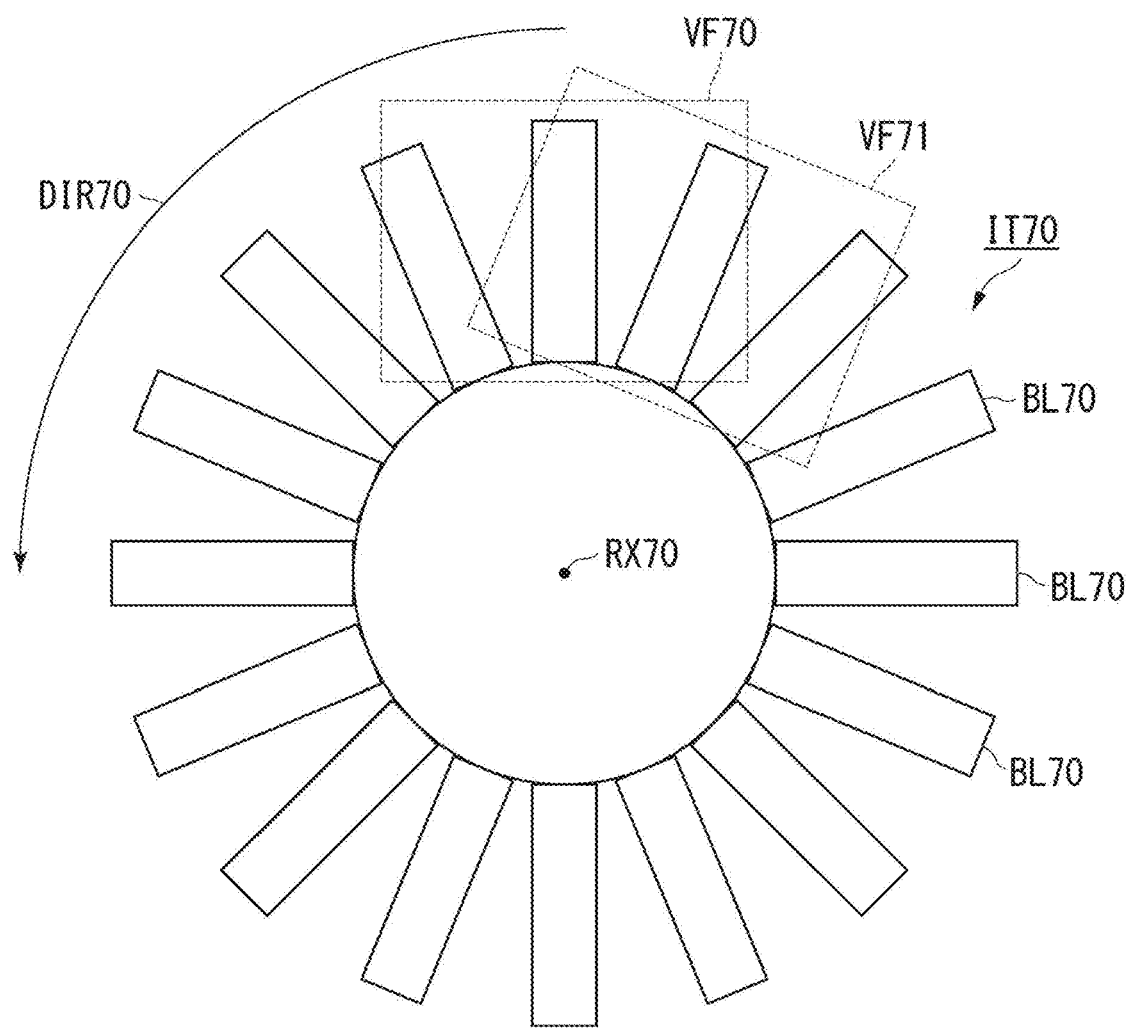
FIG. 48 is a diagram showing an example of an inspection target in a ninth embodiment of the present invention.

FIG. 48 schematically shows an example of an inspection target. The inspection target IT70 shown in FIG. 48 is an aircraft engine. The inspection target IT70 includes many blades BL70. When the inspection target IT70 is rotating in the direction DIR70 around the rotation axis RX70, the imaging device 28 captures images of the blades BL70 and sequentially acquires two or more 2D images. For example, the imaging device 28 acquires a 2D image of the visual field VF70 and then acquires a 2D image of the visual field VF71. The imaging device 28 continues to acquire 2D images until the inspection target IT70 rotates at least once.

The position data generation unit 182*b* combines two or more 2D images. In this way, the position data generation unit 182*b* generates a 2D image in which all the blades BL70 are seen. The position data generation unit 182*b* generates 2D data including 2D coordinates of two or more points in the generated 2D image.

The position data generation unit 182*b* generates 2D data by using one or more frames of a video. In a case in which the entire inspection target is seen in one frame, the position data generation unit 182*b* may generate 2D data by using the frame. A still image is the same as a frame of a video. A still image is associated with 2D coordinates of one or more points included in the 2D data.

Figure 49:
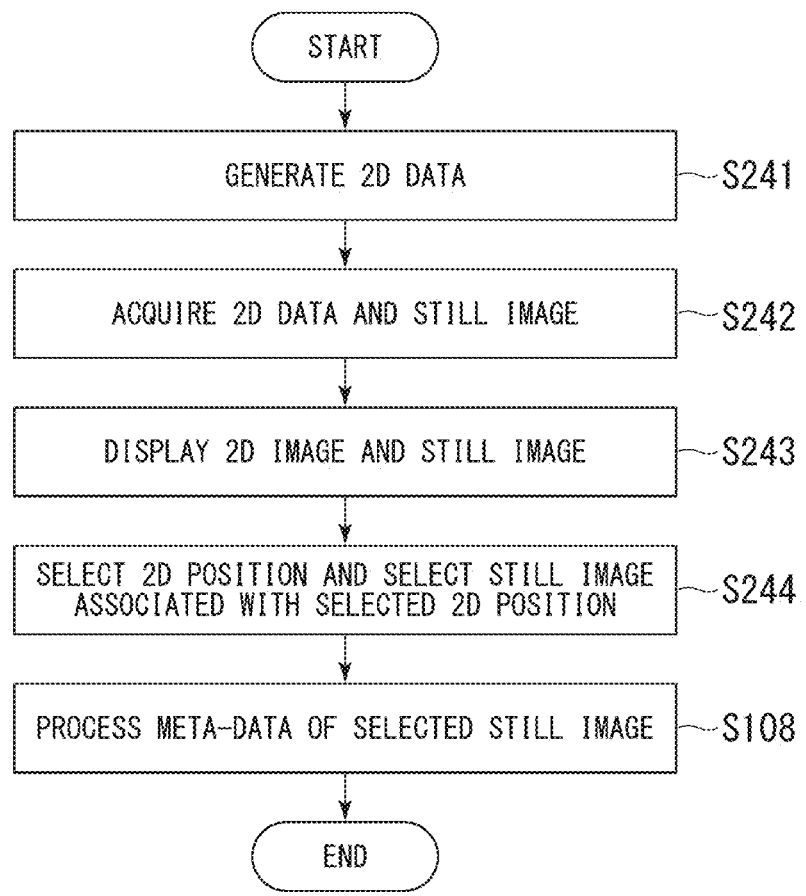
FIG. 49 is a flow chart showing a procedure of data processing in the ninth embodiment of the present invention.

Data processing in the ninth embodiment will be described by using FIG. 49. FIG. 49 shows a procedure of the data processing. FIG. 49 shows processing executed after the control unit 180 determines to complete the photography in Step S103 shown in FIG. 7. The same processing as that shown in FIG. 7 will not be described.

When the control unit 180 determines to complete the photography in Step S103, the position data generation unit 182*b* generates 2D data including 2D coordinates of two or more points on a subject on the basis of one or more 2D images of the subject. The position data generation unit 182*b* records the 2D data on a recording medium in the PC 41 or on the memory card 42 (Step S241).

After Step S241, the data acquisition unit 183 accesses a recording medium in the PC 41 or the memory card 42 and acquires the 2D data and still images from the recording medium or the memory card 42 (Step S242).

After Step S242, the display control unit 184 displays a 2D image on the display unit 5 on the basis of the 2D data and displays one or more still images on the display unit 5 (Step S243). Step S243 corresponds to the information display step. Each pixel of the 2D image is associated with 2D coordinates included in the 2D data.

After Step S243, the selection unit 186 selects at least one of the two or more points included in the 2D data. In this way, the selection unit 186 selects one or more 2D positions. Furthermore, the selection unit 186 selects one or more still images associated with the one or more 2D positions (Step S244). Step S244 corresponds to the position selection step. After Step S244, Step S108 is executed.

In the ninth embodiment, the endoscope device 1 generates 2D data including 2D coordinates of two or more points and displays a 2D image on the basis of the 2D data. A user can intuitively figure out the position of an inspection target in the 2D image and can easily select the position. The endoscope device 1 processes meta-data associated with a still image of a position selected by the user. Therefore, the endoscope device 1 can improve the efficiency of work for processing the meta-data.

Tenth Embodiment

A tenth embodiment of the present invention will be described. The endoscope device 1 automatically processes meta-data and notifies a user of a processing result. The endoscope device 1 includes the CPU 18 shown in FIG. 6.

The display control unit 184 displays position information indicating a positional relationship between two or more positions in a 3D space including an object on the display unit 5 on the basis of the 3D data (information display step). The selection unit 186 selects at least one position included in the two or more positions (position selection step). The data-processing unit 187 processes meta-data (processing step). The display control unit 184 displays at least one position selected by the selection unit 186 on the display unit 5 (position display step).

Figure 50:
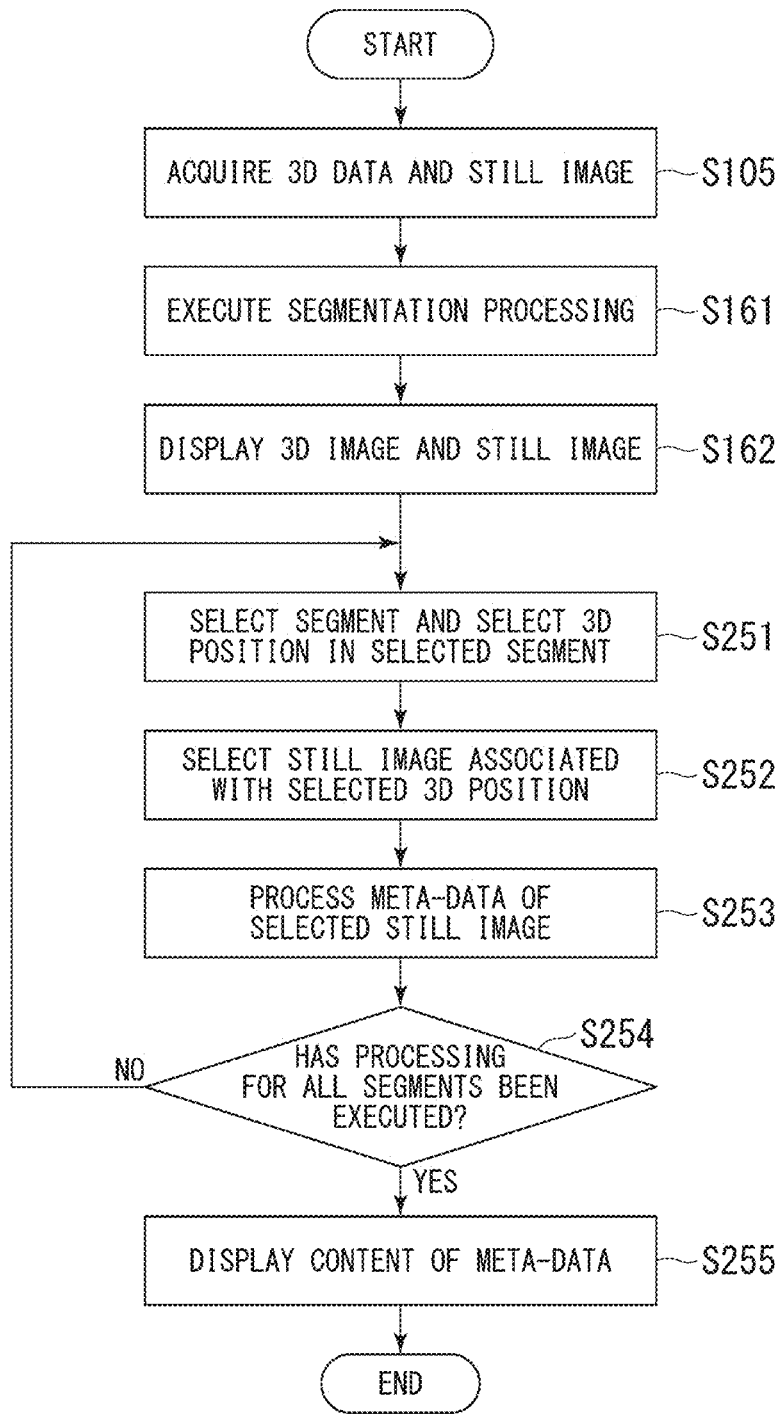
FIG. 50 is a flow chart showing a procedure of data processing in a tenth embodiment of the present invention.

Data processing in the tenth embodiment will be described by using FIG. 50. FIG. 50 shows a procedure of the data processing. FIG. 50 shows processing executed after the control unit 180 determines to complete the photography in Step S103 shown in FIG. 7. The same processing as that shown in FIG. 7 will not be described.

After Step S105, the image-processing unit 181 executes segmentation processing. In this way, the image-processing unit 181 divides a region of the 3D shape of a subject into two or more segments (Step S161). Step S161 is the same as that shown in FIG. 28.

After Step S161, the display control unit 184 displays a 3D image on the display unit 5 on the basis of the 3D data and displays one or more still images on the display unit 5. At this time, the display control unit 184 displays the two or more segments in different colors (Step S162). Step S162 is the same as that shown in FIG. 28. Step S162 corresponds to the information display step and the position display step.

After Step S162, the selection unit 186 selects one of the two or more segments. The selection unit 186 selects a 3D position included in the selected segment (Step S251). Step S251 corresponds to the position selection step.

After Step S251, the selection unit 186 selects a still image associated with the 3D position selected in Step S251 by using the method in the second embodiment (Step S252). In a case in which two or more still images are associated with a 3D position included in one segment, the two or more still images are selected. The two or more still images may be associated with different 3D positions in the same segment.

After Step S252, the data-processing unit 187 processes meta-data of the still image selected in Step S252 (Step S253). Step S253 corresponds to the data-processing step.

For example, the data-processing unit 187 generates a folder in a recording medium in the PC 41 or in the memory card 42 for each segment. The data-processing unit 187 saves the still image selected in Step S252 in the folder. One or more still images are saved in one folder. The data-processing unit 187 records the name (file path) of the folder in meta-data.

After Step S253, the control unit 180 determines whether Steps S251 to S253 have been executed in all the segments (Step S254).

When the control unit 180 determines that Steps S251 to S253 have not been executed in one or more segments, Step S251 is executed. At this time, a segment, which has not been processed in the processing until the last time, is selected.

When the control unit 180 determines that Steps S251 to S253 have been executed in all the segments, the display control unit 184 displays the content of the meta-data processed in Step S253 on the display unit 5 (Step S255). A user can confirm whether the meta-data are processed in accordance with the intention of the user. When Step S255 is executed, the data processing is completed.

Figure 51:
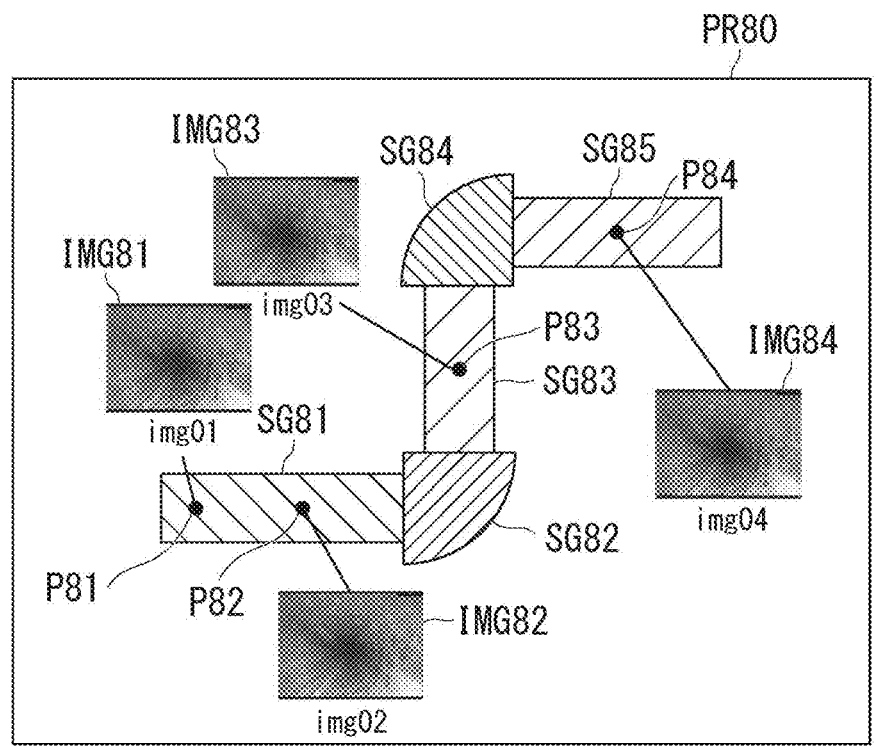
FIG. 51 is a diagram showing an example of an image displayed on a display unit in the tenth embodiment of the present invention.

FIG. 51 shows an example of an image displayed on the display unit 5 in Step S162. The image is also displayed on the display unit 5 in Step S255. The display control unit 184 displays a 3D image PR80 on the display unit 5. The display control unit 184 displays a segment SG81, a segment SG82, a segment SG83, a segment SG84, and a segment SG85 on the display unit 5. Each segment is superimposed on the 3D image PR80. These regions are displayed in different colors. The display control unit 184 does not need to superimpose each segment on the 3D image PR80. The display control unit 184 may display each segment in a different region from that in which the 3D image PR80 is displayed.

The display control unit 184 displays a still image IMG81, a still image IMG82, a still image IMG83, and a still image IMG84 on the display unit 5. The display control unit 184 displays a point P81, a point P82, a point P83, and a point P84 on the display unit 5. Each point is superimposed on the 3D image PR80. A predetermined mark is displayed at the position of each point. Each point indicates the position of a camera that acquires a still image.

The point P81 indicates the position of the camera that acquires the still image IMG81. The point P82 indicates the position of the camera that acquires the still image IMG82. The point P83 indicates the position of the camera that acquires the still image IMG83. The point P84 indicates the position of the camera that acquires the still image IMG84. In the image displayed on the display unit 5, each of the point P81, the point P82, the point P83, and the point P84 is connected to the still image by a line. Therefore, a user can figure out a position at which each still image is acquired.

The still image IMG81 has a file name "img01.jpg" and is associated with the point P81 in the segment SG81. The still image IMG82 has a file name "img02.jpg" and is associated with the point P82 in the segment SG81. The still image IMG83 has a file name "img03.jpg" and is associated with the point P83 in the segment SG83. The still image TMG84 has a file name "img04.jpg" and is associated with the point P84 in the segment SG85. A character string included in the file name of each still image is displayed near each still image.

Figure 52:
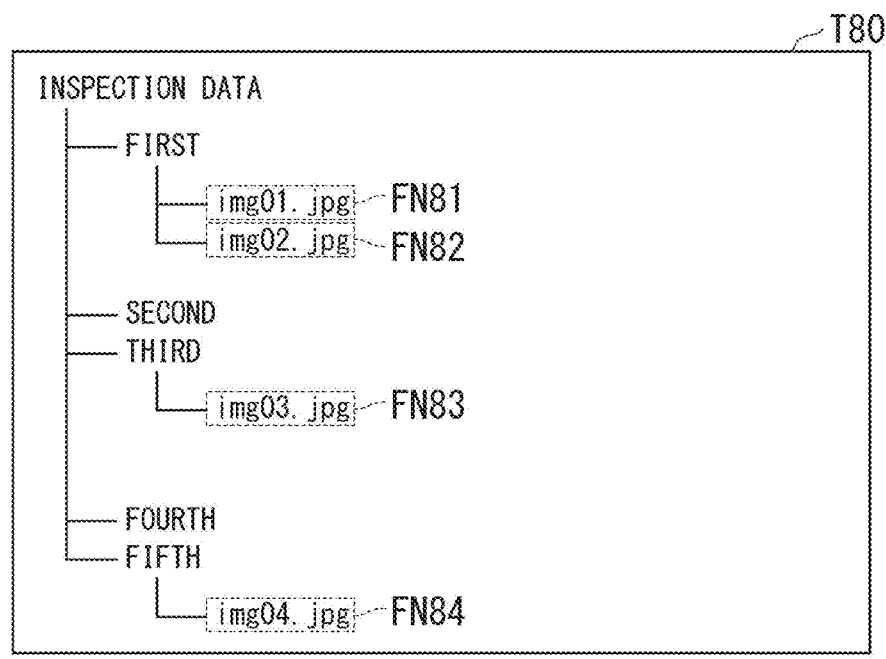
FIG. 52 is a diagram showing an example of an image displayed on the display unit in the tenth embodiment of the present invention.

FIG. 52 shows an example of an image displayed on the display unit 5 in Step S255. The display control unit 184 displays a tree structure T80 on the display unit 5. The display control unit 184 displays the 3D image PR80 shown in FIG. 51 on the display unit 5, but the 3D image PR80 is not shown in FIG. 52.

The tree structure T80 indicates a hierarchical structure of an "inspection data" folder, a "first" folder, a "second" folder, a "third" folder, a "fourth" folder, and a "fifth" folder. The "inspection data" folder is the top folder. The "first" folder, the "second" folder, the "third" folder, the "fourth" folder, and the "fifth" folder are located under the "inspection data" folder. The name of each folder is displayed on the tree structure T80.

The "first" folder is associated with the segment SG81 shown in FIG. 51. The data-processing unit 187 saves the still image IMG81 and the still image IMG82 in the "first" folder. The still image IMG81 and the still image IMG82 are associated with a 3D position in the segment SG81. The file name FN81 of the still image IMG81 and the file name FN82 of the still image IMG82 are displayed in the "first" folder.

The "second" folder is associated with the segment SG82 shown in FIG. 51. Since no still image is associated with a 3D position in the segment SG82, no still image is saved in the "second" folder.

The "third" folder is associated with the segment SG83 shown in FIG. 51. The data-processing unit 187 saves the still image IMG83 in the "third" folder. The still image IMG83 is associated with a 3D position in the segment SG83. The file name FN83 of the still image IMG83 is displayed in the "third" folder.

The "fourth" folder is associated with the segment SG84 shown in FIG. 51. Since no still image is associated with a 3D position in the segment SG84, no still image is saved in the "fourth" folder.

The "fifth" folder is associated with the segment SG85 shown in FIG. 51. The data-processing unit 187 saves the still image IMG84 in the "fifth" folder. The still image IMG84 is associated with a 3D position in the segment SG85. The file name FN84 of the still image IMG84 is displayed in the "fifth" folder.

A user understands a relationship between each segment and each folder in advance. Each folder may have a name corresponding to the color of each segment. The user checks the camera position of each still image and the folder in which each still image is saved by referring to the 3D image PR80 and the tree structure T80.

The segment SG81 is associated with the "first" folder. The user confirms that the still image IMG81 and the still image IMG82 are associated with the segment SG81 by referring to the 3D image PR80. The still image IMG81 has the file name "img01.jpg." The still image IMG82 has the file name "img02.jpg." The user confirms that the file name FN81 of the still image IMG81 and the file name FN82 of the still image IMG82 are displayed in the "first" folder by referring to the tree structure T80.

The segment SG83 is associated with the "third" folder. The user confirms that the still image IMG83 is associated with the segment SG83 by referring to the 3D image PR80. The still image IMG83 has the file name "img03.jpg." The user confirms that the file name FN83 of the still image IMG83 is displayed in the "third" folder by referring to the tree structure T80.

The segment SG85 is associated with the "fourth" folder. The user confirms that the still image IMG84 is associated with the segment SG85 by referring to the 3D image PR80. The still image IMG84 has the file name "img04.jpg." The user confirms that the file name FN84 of the still image IMG84 is displayed in the "fourth" folder by referring to the tree structure T80.

The user can confirm whether each still image is saved in a folder prepared for each segment by performing the above-described work. Since meta-data are automatically processed, the amount of work performed by The user is reduced.

The data-processing unit 187 may change the file name of the still image in Step S253. For example, the data-processing unit 187 may add a character string corresponding to each segment to the file name of the still image.

The data-processing unit 187 may process the still image in Step S253 and may detect a predetermined region seen in the still image. For example, the predetermined region is damage or a corner. When the predetermined region is detected, the data-processing unit 187 may associate meta-data indicating the type of the region with the still image.

The endoscope device 1 may include a rotary encoder. The rotary encoder generates length information indicating the length of the insertion unit 2 inserted into a space in an inspection target. The data-processing unit 187 may associate the length information with the still image as meta-data in Step S253.

After Step S255, the data-processing unit 187 may correct the meta-data by executing similar processing to Step S222 shown in FIG. 39.

Step S162 may be executed after any one of Step S251, Step S252, and Step S253 is executed. Step S162 may be executed after Step S255 is executed.

A data-processing method according to each aspect of the present invention includes the information display step (Step S162), the position selection step (Step S251), the processing step (Step S253), and the position display step (Step S162). The display control unit 184 displays position information indicating a positional relationship between two or more positions in a 3D space including an object on the display unit 5 on the basis of position data in the information display step. The position data indicate the two or more positions. The selection unit 186 selects at least one position included in the two or more positions in the position selection step. The data-processing unit 187 processes meta-data in the processing step. The meta-data are associated with a still image. The still image is included in one or more still images generated by photographing the object and is associated with the at least one selected position. The display control unit 184 displays the at least one selected position on the display unit 5 in the position display step.

In the tenth embodiment, the endoscope device 1 automatically processes meta-data and displays the content of the processed meta-data. Therefore, the endoscope device 1 can improve the efficiency of work for processing the meta-data. Since the content of the processed meta-data is displayed, a user can check the content of the automatically processed meta-data.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A data-processing method performed by one or more processors, the data-processing method comprising:

controlling a display to display position information indicating a positional relationship between two or more positions related to an object in a three-dimensional space including the object on the basis of pieces of position data each indicating corresponding one of the two or more positions;

selecting at least one position included in the two or more positions after the position information is displayed; and executing batch-processing of pieces of meta-data associated with a plurality of still images, wherein the plurality of still images is included in a group of still images generated by photographing the object and is associated with the position data of the at least one selected position, and wherein the position data indicate three-dimensional coordinates corresponding to a position in the three-dimensional space, two-dimensional coordinates corresponding to a position on a two-dimensional image, or a distance from a reference position in the three-dimensional space.

2. The data-processing method according to claim 1, further comprising:

controlling the display to display the group of still images associated with the position data of the at least one selected position;

selecting the plurality of still images included in the group of still images displayed; and executing the batch-processing of the pieces of meta-data associated with the plurality of still images.

3. The data-processing method according to claim 1, wherein the two or more positions include a first position at which a first still image included in the group of still images is acquired, and wherein selecting the at least one position comprises selecting the first position.

4. The data-processing method according to claim 1, further comprising controlling the display to display a user interface including one or more items on the display, wherein, in executing the batch-processing of the pieces of meta-data associated with the plurality of still images, when a content of at least one item included in the one or more items is input into the user interface, executing the batch-processing of the pieces of meta-data on the basis of the content.

5. The data-processing method according to claim 1, further comprising controlling the display to display an operation screen including a content of the batch-processed pieces of meta-data after the pieces of meta-data are batch-processed.

6. The data-processing method according to claim 5, further comprising correcting the pieces of meta-data on the basis of an operation of the operation screen.

7. The data-processing method according to claim 1, wherein the plurality of still images correspond to one or more frames of a video generated by photographing the object.

8. The data-processing method according to claim 1, wherein the plurality of still images visualize three-dimensional coordinates of two or more points, and wherein the three-dimensional coordinates of the two or more points are calculated by applying structure from motion (SfM) to two or more images generated by photographing the object.

9. The data-processing method according to claim 1, wherein a flag is attached to at least one frame included in two or more frames included in a video generated by photographing the object, and wherein the at least one frame to which the flag is attached among the two or more frames are selected as the one or more still images.

10. The data-processing method according to claim 1, wherein the two or more positions do not include a second position at which a second still image included in the one or more still images is acquired, wherein selecting the at least one position included in the two or more positions after the position information is displayed comprises the second position, and wherein the meta-data processed are associated with the second still image acquired at the selected second position.

11. The data-processing method according to claim 1, wherein the group of still images are generated by a first device, and wherein the position data are generated by a second device different from the first device.

12. The data-processing method according to claim 1, wherein the position data are generated by applying simultaneous localization and mapping (SLAM) to two or more images generated by photographing the object.

13. The data-processing method according to claim 1, wherein the group of still images are generated by an image sensor, wherein the image sensor is disposed in a distal end of an insertion unit configured to be inserted into the three-dimensional space, and wherein the position data are generated on the basis of sensor information generated by a sensor other than the image sensor.

14. The data-processing method according to claim 13, wherein the sensor other than the image sensor is a rotary encoder, wherein the rotary encoder is configured to:
  determine a length of the insertion unit inserted into the three-dimensional space; and
  generate length information indicating the determined length as the sensor information, and wherein the position data are generated on the basis of the length information.

15. The data-processing method according to claim 13, wherein the sensor other than the image sensor is an acceleration sensor, wherein the acceleration sensor is disposed in the distal end of the insertion unit and is configured to:
  determine a direction of gravity applied to the distal end of the insertion unit; and
  generate direction information indicating the determined direction as the sensor information, and wherein the position data are generated on the basis of the direction information.

16. The data-processing method according to claim 13, wherein the sensor other than the image sensor is a gyro sensor, wherein the gyro sensor is disposed in the distal end of the insertion unit and is configured to:
  determine an angular velocity generated by movement of the distal end of the insertion unit; and
  generate angular velocity information indicating the determined angular velocity as the sensor information, and wherein the position data are generated on the basis of the angular velocity information.

17. The data-processing method according to claim 1, further comprising:

selecting the plurality of still images associated with the at least one selected position among the group of still images;

controlling the display to display the plurality of still images selected; and executing the batch-processing of the meta-data associated with the plurality of still images selected.

18. The data-processing method according to claim 1, further comprising dividing the two or more positions into two or more groups.

19. The data-processing method according to claim 18,
wherein one of the two or more groups includes at least one of the two or more positions, and
wherein the data-processing method further comprises:
selecting the one of the two or more groups; and
outputting a warning when the one or more processors determine that the group of still images are not associated with at least one position included in the selected group.

20. The data-processing method according to claim 1,
wherein selecting the at least one position included in the two or more positions after the position information is displayed comprises selecting at least a first position and a second position included in the two or more positions,
wherein executing the batch-processing of the pieces of meta-data associated with the plurality of still image comprises executing the batch-processing of the pieces of meta-data associated with a first still image associated with the first position and a second still image associated with the second position,
wherein the group of still images include the first still image and the second still image, and
wherein the data-processing method further comprises:
determining whether a content of the pieces of meta-data processed is consistent to a positional relationship between the at least two positions; and
outputting a warning when a determination is made that the content is not consistent to the positional relationship.

21. The data-processing method according to claim 1,
wherein each of the two or more positions is associated with at least one of two or more images included in a video generated by photographing the object,
wherein each of the two or more images is associated with time information indicating a time point at which each of the two or more images is generated, and
wherein the data-processing method further comprises selecting the time information and selecting the at least one position on the basis of the selected time information.

22. A data-processing method performed by one or more processors, the data-processing method comprising:
controlling a display to display position information indicating a positional relationship between two or more positions related to an object in a three-dimensional space including the object on the basis of pieces of position data each indicating corresponding one of the two or more positions;
selecting at least one position included in the two or more positions; and
executing batch-processing of pieces of meta-data associated with a plurality of still images,
wherein the plurality of still image is included in a group of still images generated by photographing the object and is associated with the position data of the at least one selected position, and
wherein the position data indicate three-dimensional coordinates corresponding to a position in the three-dimensional space, two-dimensional coordinates corresponding to a position on a two-dimensional image, or a distance from a reference position in the three-dimensional space; and
controlling the display to display the at least one selected position on the display.

23. A data-processing device comprising:
one or more processors configured to:
control a display to display position information indicating a positional relationship between two or more positions related to an object in a three-dimensional space including the object on the basis of pieces of position data each indicating corresponding one of the two or more positions;
select at least one position included in the two or more positions after the position information is displayed; and
execute batch-processing of pieces of meta-data associated with a plurality of still images,
wherein the plurality of still images is included in a group of still images generated by photographing the object and is associated with the position data of the at least one selected position, and
wherein the position data indicate three-dimensional coordinates corresponding to a position in the three-dimensional space, two-dimensional coordinates corresponding to a position on a two-dimensional image, or a distance from a reference position in the three-dimensional space.

24. A non-transitory computer-readable recording medium storing a program that causes a computer to at least execute:
controlling a display to display position information indicating a positional relationship between two or more positions related to an object in a three-dimensional space including the object on the basis of pieces of position data each indicating corresponding one of the two or more positions;
selecting at least one position included in the two or more positions after the position information is displayed; and
executing batch-processing of pieces of meta-data associated with a plurality of still images,
wherein the plurality of still images is included in a group of still images generated by photographing the object and is associated with the position data of the at least one selected position, and
wherein the position data indicate three-dimensional coordinates corresponding to a position in the three-dimensional space, two-dimensional coordinates corresponding to a position on a two-dimensional image, or a distance from a reference position in the three-dimensional space.

* * * * *